(12) United States Patent
Kamada et al.

(10) Patent No.: US 10,908,348 B2
(45) Date of Patent: Feb. 2, 2021

(54) LIGHTING DEVICE, DISPLAY DEVICE, AND TELEVISION DEVICE

(71) Applicant: SHARP KABUSHIKI KAISHA, Sakai (JP)

(72) Inventors: Kentaro Kamada, Sakai (JP); Keitaro Matsui, Sakai (JP); Masanobu Harada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 380 days.

(21) Appl. No.: 15/762,462

(22) PCT Filed: Sep. 23, 2016

(86) PCT No.: PCT/JP2016/077977
§ 371 (c)(1),
(2) Date: Mar. 22, 2018

(87) PCT Pub. No.: WO2017/051852
PCT Pub. Date: Mar. 30, 2017

(65) Prior Publication Data
US 2020/0241195 A1 Jul. 30, 2020

(30) Foreign Application Priority Data

Sep. 24, 2015 (JP) .................................. 2015-186819
Sep. 24, 2015 (JP) .................................. 2015-186930

(51) Int. Cl.
*G02B 6/00* (2006.01)
*F21V 8/00* (2006.01)
*H05B 45/345* (2020.01)

(52) U.S. Cl.
CPC .......... *G02B 6/0068* (2013.01); *G02B 6/0026* (2013.01); *G02B 6/0083* (2013.01); *H05B 45/345* (2020.01)

(58) Field of Classification Search
CPC ... G02B 6/0026; G02B 6/0068; H05B 45/345
See application file for complete search history.

(56) References Cited

U.S. PATENT DOCUMENTS

| 7,240,000 B2 | 7/2007 | Harada |
| 2003/0135376 A1 | 7/2003 | Harada |

(Continued)

FOREIGN PATENT DOCUMENTS

| CN | 104503137 A | 4/2015 | |
| EP | 3012686 A1 * | 4/2016 | ........... G02B 6/0055 |

(Continued)

*Primary Examiner* — Karabi Guharay
(74) *Attorney, Agent, or Firm* — ScienBiziP, P.C.

(57) ABSTRACT

A backlight unit includes LEDs, a light guide plate, a wavelength converter, and an LED controller. The LEDs include end-side LEDs arranged at ends in the direction of arrangement and a center LED arranged at the center in the direction of arrangement. The light guide plate includes a light entering end surface and a light exiting plate surface. The light entering end surface extends along the direction of arrangement. The wavelength converter extends along the direction of arrangement and is interposed among the LEDs and the light entering end surface. The wavelength converter includes a phosphor configured to wavelength-convert the light from the LEDs. The LED controller is configured to control the amount of light emitted by each LED per unit time such that the amount of light emitted by at least one of the end-side LEDs than the amount of light emitted by the center LED.

6 Claims, 35 Drawing Sheets

(56) References Cited

U.S. PATENT DOCUMENTS

| | | |
|---|---|---|
| 2008/0284315 A1 | 11/2008 | Tasumi et al. |
| 2013/0271961 A1 | 10/2013 | Nakamura |
| 2016/0341875 A1 | 11/2016 | Chang et al. |
| 2017/0168217 A1* | 6/2017 | Li .................. G02B 6/0068 |
| 2017/0261180 A1 | 9/2017 | Nakamura |
| 2018/0196311 A1* | 7/2018 | Wu .............. G02F 1/133603 |

FOREIGN PATENT DOCUMENTS

| | | |
|---|---|---|
| JP | 3114805 B2 | 12/2000 |
| JP | 2003-218952 A | 7/2003 |
| JP | 2013-218952 A | 10/2013 |
| JP | 2014-225379 A | 12/2014 |
| WO | 2013/145978 A1 | 10/2013 |

* cited by examiner

LIGHTING DEVICE, DISPLAY DEVICE, AND TELEVISION DEVICE

TECHNICAL FIELD

The present invention relates to a lighting device, a display device, and a television device.

BACKGROUND ART

A backlight described in Patent Document 1 described below has been known as an example of a backlight used for a typical liquid crystal display device. A planar light source as the backlight described in Patent Document 1 includes LEDs configured to emit blue light, a wavelength converter including a fluorescent substance excited by light emission from the LEDs to emit fluorescent light, and a light guide plate provided through the LEDs and the wavelength converter and configured to take in, through an end surface thereof, synthesized light of the light emitted from the LEDs and the light emitted from the fluorescent substance to release the light from a light emission observation surface side.

A backlight described in Patent Document 2 is configured such that an elongated phosphor tube is arranged among LEDs and an end surface (a light entering surface) of a light guide plate to which light enters. When primary light (e.g., blue light) output from the LEDs is supplied to the phosphor tube, part of the light excites quantum dot phosphors in the phosphor tube, and the remaining light is transmitted through the phosphor tube. When the quantum dot phosphors are excited by the primary light, the quantum dot phosphors release secondary light (e.g., green light and red light) with a wavelength different from that of the primary light. That is, the quantum dot phosphors have the function of wavelength-converting the primary light into the secondary light. The secondary light released from the phosphor tube is mixed with the primary light having transmitted through the phosphor tube, and as a result, white light exits from the phosphor tube.

Patent Document

Patent Document 1: Japanese Patent No. 3114805
Patent Document 2: Japanese Unexamined Patent Publication No. 2014-225379

Problem to be Solved by the Invention

The wavelength converter disclosed in Patent Document 1 extends along a length direction of an end surface of the light guide plate. Ends of the wavelength converter in the length direction include regions in which the phosphors are not disposed. As a frame size of the backlight is reduced, the regions of the wavelength converter in which the phosphors are not disposed are more likely to overlap the LEDs. Light rays from the LEDs may enter the ends of the end surfaces of the light guide plate in the length direction without wavelength-converted by the phosphors resulting in uneven brightness.

In Patent Document 2, an end portion of the phosphor tube in a length direction is also made of a material (e.g., glass) containing no quantum dot phosphor and exhibiting light transmittance. Thus, when the primary light is supplied from the LED to the end portion of the phosphor tube, the primary light is directly transmitted through the end portion without wavelength conversion. That is, light with a high primary light existence ratio exits from the end portion of the phosphor tube toward the light guide plate. Then, the light enters into the light guide plate through the light entering surface thereof to propagate in the light guide plate, and then, exits from a front plate surface of the light guide plate. Of planar light output from the lighting device, light output from an area linearly extending from the end portion of the phosphor tube in the light guide plate along the light output direction of the LED is more likely to be colored in the color of the primary light of the light source than light output from other areas when the light with a high primary light existence ratio exits from the light guide plate while propagating in the light guide plate as described above.

DISCLOSURE OF THE PRESENT INVENTION

The present invention has been made in view of the above-described circumstances, and an object of the present invention is to reduce occurrence of color unevenness.

Means for Solving the Problem

A lighting device of the present invention includes light sources, a light guide plate, at least one wavelength converter, and a light source controller. The light sources are arranged in line. The light sources include end-side light sources arranged at ends in the direction of arrangement of the light sources and a center light source arranged at the center in the direction of arrangement. The light guide plate includes a light entering end surface through which light from the light sources enters and a light exiting plate surface through which the light exits. The light entering end surface is at least a section of an outer peripheral end surface to extend along the direction of arrangement. The light exiting plate surface is one of plate surfaces. The wavelength converter extends along the direction of arrangement and is interposed among the multiple light sources and the light entering end surface. The wavelength converter includes a phosphor configured to wavelength-convert the light from the light sources. The light source controller is configured to control the amount of light emitted by each of the light sources per unit time such that the amount of light emitted by one of the end-side light sources is less than the amount of light emitted by the center light source.

With this configuration, the light emitted from the light sources is wavelength-converted by the phosphor contained in the wavelength converter interposed among the light sources and the light entering end surface. The light then enters the light guide plate through the light entering end surface and travels through the light guide plate. Thereafter, the light exits through the light exiting plate surface. The wavelength converter extends along the direction of arrangement of the light sources, but the region provided with no phosphor is formed at the edge of the wavelength converter in the length direction thereof. With advancement of frame-size reduction of the lighting device, a position relationship in which the region of the wavelength converter provided with no phosphor overlaps with the end-side light source is easily brought. Due to such a relationship, the light from the end-side light source may enter the light guide plate through an end portion of the light entering end surface in the length direction without wavelength conversion by the phosphor. In response, the amount of light emitted by each light source per unit time is controlled by the light source controller such that the amount of light emitted by at least one of the end-side light sources is per unit time is less than that of light emitted by the center light source. Thus, the amount of light supplied from the end-side light source to the end portion of the wavelength converter in the length direction is less than the amount of light supplied from the center light source to a center portion in the length direction. Thus, even when the region not provided with the phosphor is formed at the edge of the wavelength converter in the length direction, and the position relationship in which such a region overlaps with the end-side light source is brought, the amount of light supplied from the end-side light source to the end portion of the wavelength converter in the length direction is decreased, and therefore, the amount of light entering the light guide plate through the light entering end surface without wavelength conversion by the phosphor is also decreased. Thus, a difference is less likely to be produced between the color tone of light entering the light guide plate through the end portion of the light entering end surface in the length direction and the color tone of light entering through a center portion of the light entering end surface in the length direction. Even with advancement of frame-size reduction, color unevenness is less likely to occur in the light output from the light exiting plate surface.

The lighting device of the present invention includes, as a different aspect, a wavelength conversion member, a light source line, and a light guide plate. The wavelength conversion member includes a first wavelength converter, a housing, and a non-wavelength-converter portion. The first wavelength converter contains a first phosphor to release secondary light when excited by primary light in a predetermined wavelength region. The secondary light is in another wavelength region different from the predetermined wavelength region. The housing has an elongated shape and light transmissivity. The housing holds the first wavelength converter to surround the first wavelength converter. The non-wavelength-converter portion is an end portion of the housing in the longitudinal direction thereof. The light source line includes a line of light sources arranged to face the wavelength conversion member. The light sources include a reference color light source and a mixed color light source. The reference color light source faces the first wavelength converter to emit the primary light toward the first wavelength converter. The mixed color light source faces the non-wavelength-converter portion to emit primary color light and complementary color light in a complementary color to a reference color of the primary light toward the non-wavelength-converter portion. The light guide plate includes a light entering surface through which the light emitted by each light source in the light source line enters via the wavelength conversion member disposed in a clearance between the light source line and the light entering surface and a light exiting surface through which the light entering through the light entering surface exits.

With the above-described configuration, the light exits from an area linearly extending from the end portion of the wavelength conversion member along the light output direction of the light source is less likely to be colored in the color of the primary light emitted by the light source than the light exiting from other area.

For solving the above-described problem, a display device of the present invention includes any of the above-described lighting devices and a display panel configured to display an image by means of light emitted from the lighting device. According to the display device with such a configuration, color unevenness is less likely to occur in the light from the lighting device, and therefore, displaying can be realized with high display quality.

For solving the above-described problem, a television device of the present invention includes the above-described display device. According to such a television device, high display quality of the display device is provided, and therefore, displaying of a television image can be realized with high display quality.

Advantageous Effect of the Invention

According to the present invention, occurrence of color unevenness can be reduced.

BEST MODE FOR CARRYING OUT THE INVENTION

First Embodiment

Figure 2:
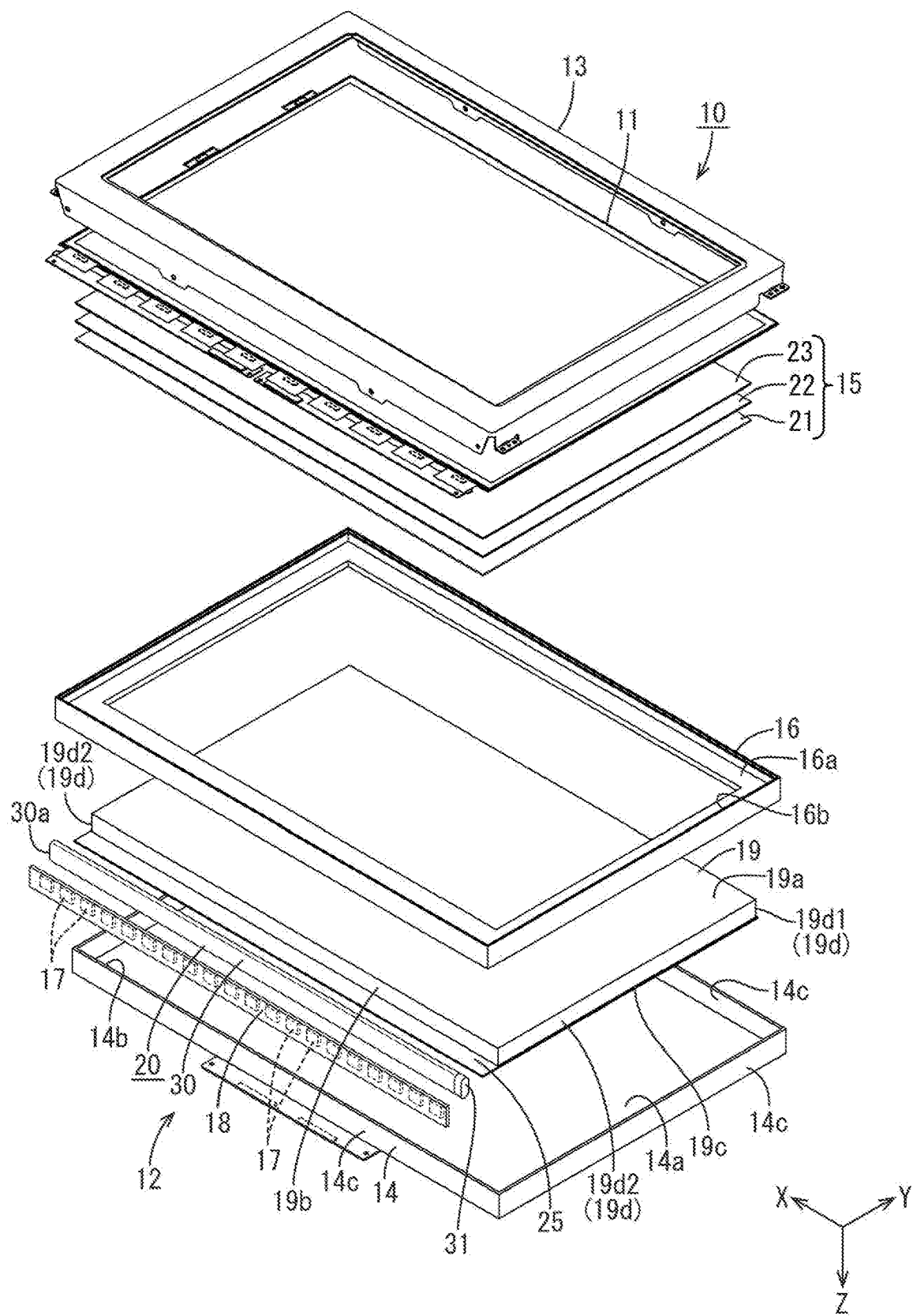
FIG. 2 is an exploded perspective view of an outline configuration of a liquid crystal display device provided at the television device.
Figure 3:
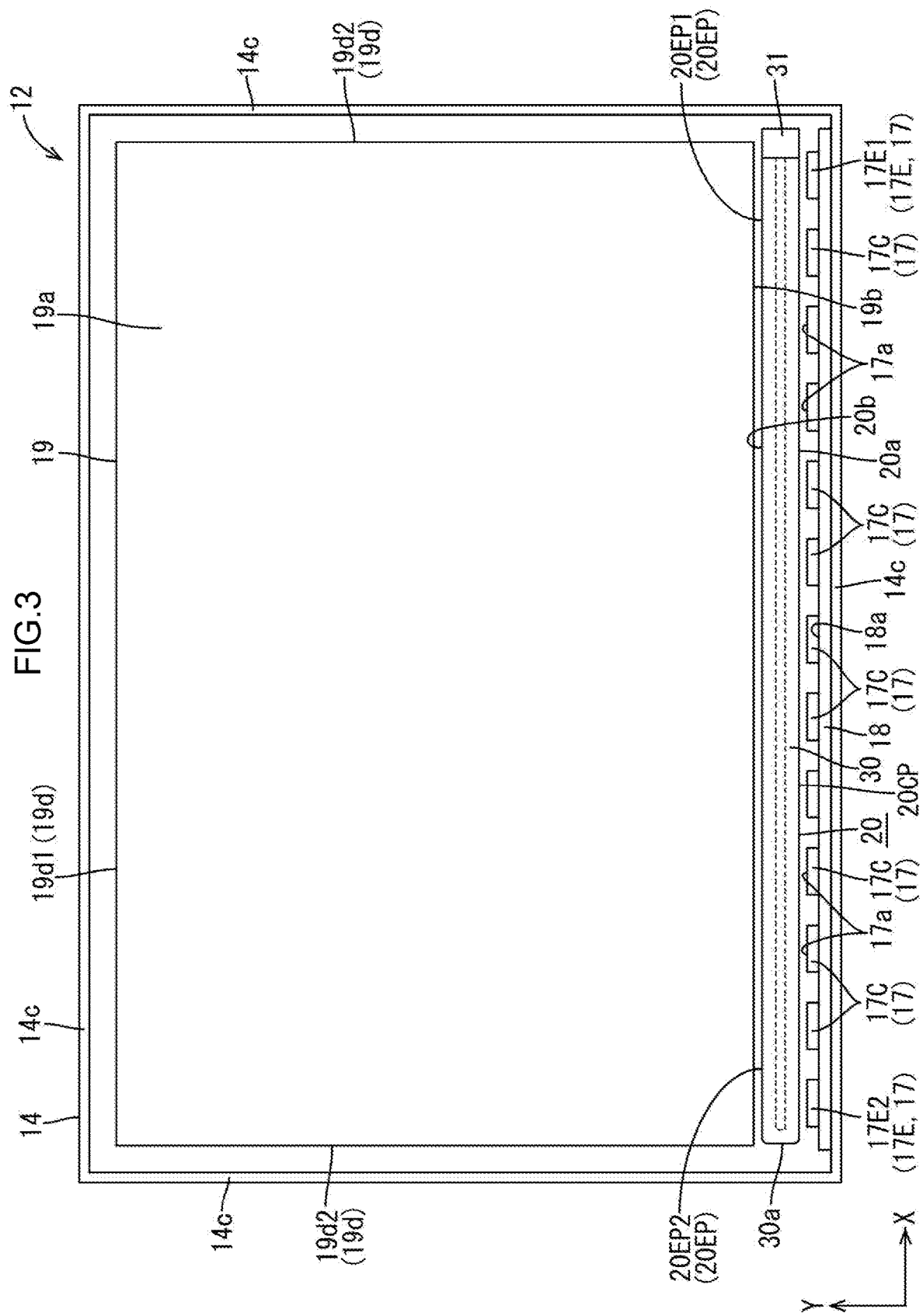
FIG. 3 is a plan view of a chassis, an LED substrate, and a light guide plate forming a backlight unit provided at the liquid crystal display device.
Figure 4:
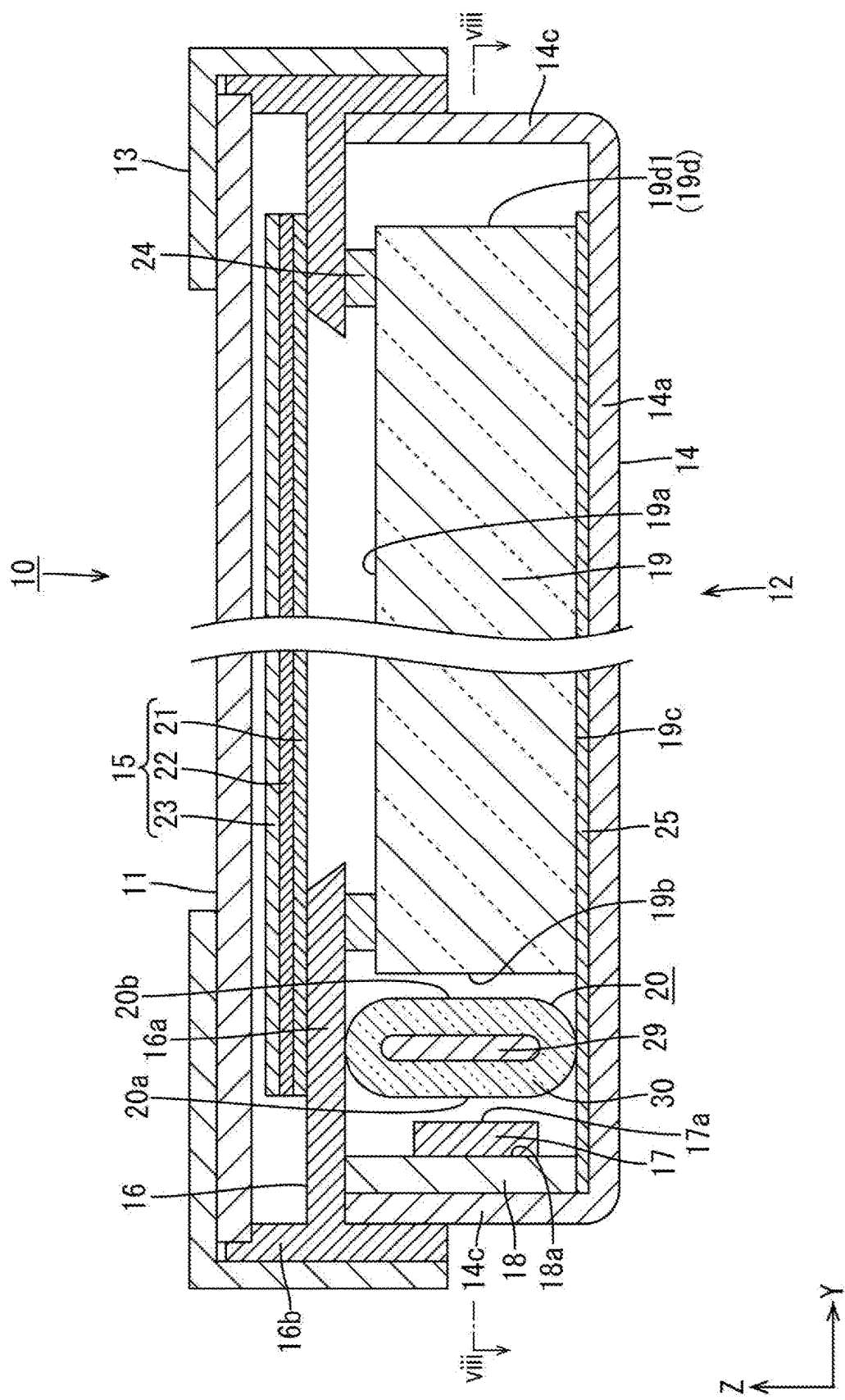
FIG. 4 is a sectional view of a sectional configuration of the liquid crystal display device along a short-side direction.
Figure 5:
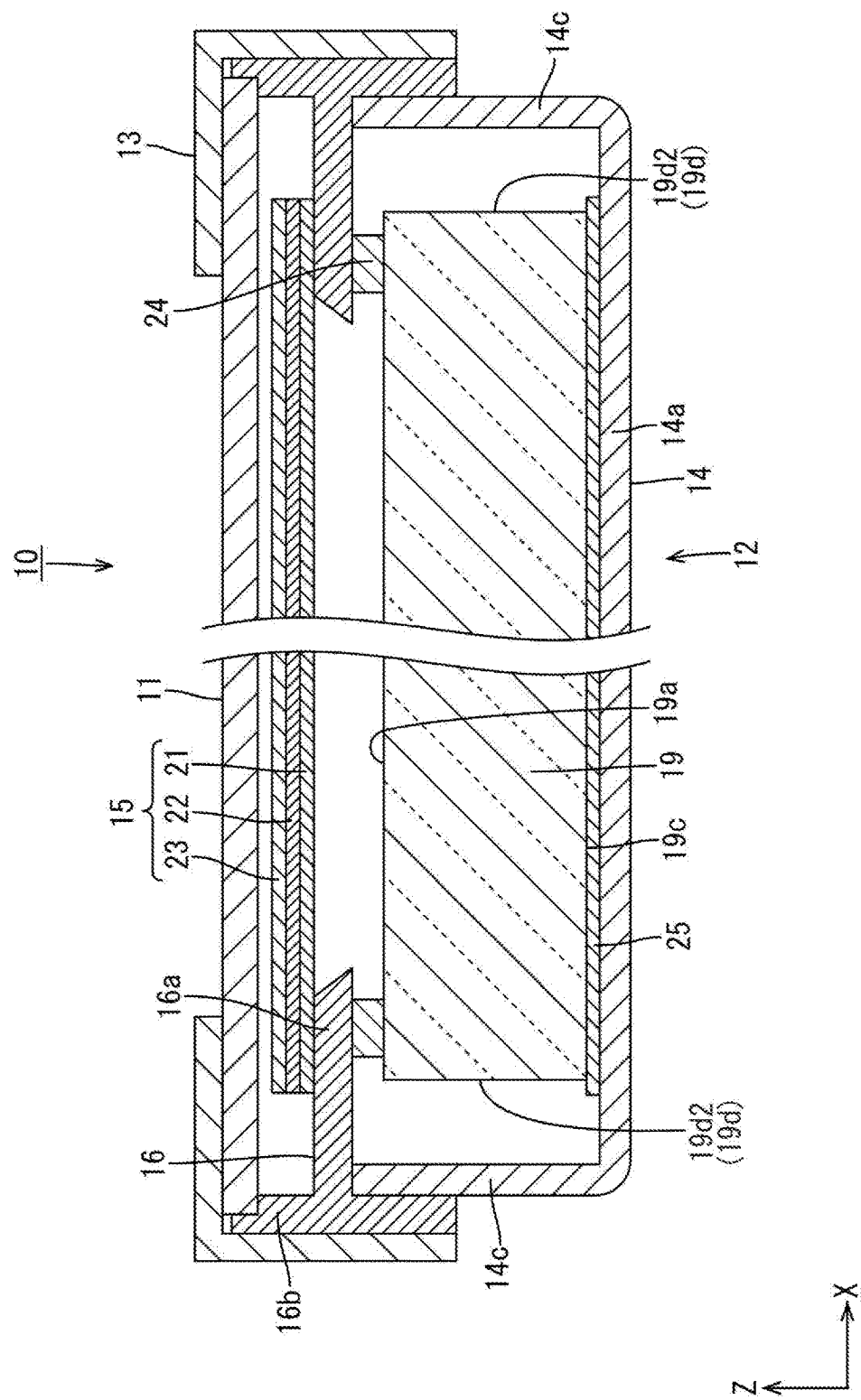
FIG. 5 is a sectional view of a sectional configuration of the liquid crystal display device along a long-side direction.

A first embodiment of the present invention will be described with reference to FIGS. 1 to 11. In the present embodiment, a backlight unit 12 and a liquid crystal display device 10 and a television device 10TV using the backlight unit 12 will be described by way of example. Moreover, in the present embodiment, the method for a wavelength converter 20 included in the backlight unit 12 will be also described by way of example. Note that an X-axis, a Y-axis, and a Z-axis are illustrated in some of the drawings, and are each illustrated as corresponding directions in the drawings. Moreover, an upper side as viewed in, e.g., FIGS. 4 and 5 is a front side, and a lower side as viewed in, e.g., FIGS. 4 and 5 is a back side.

Figure 1:
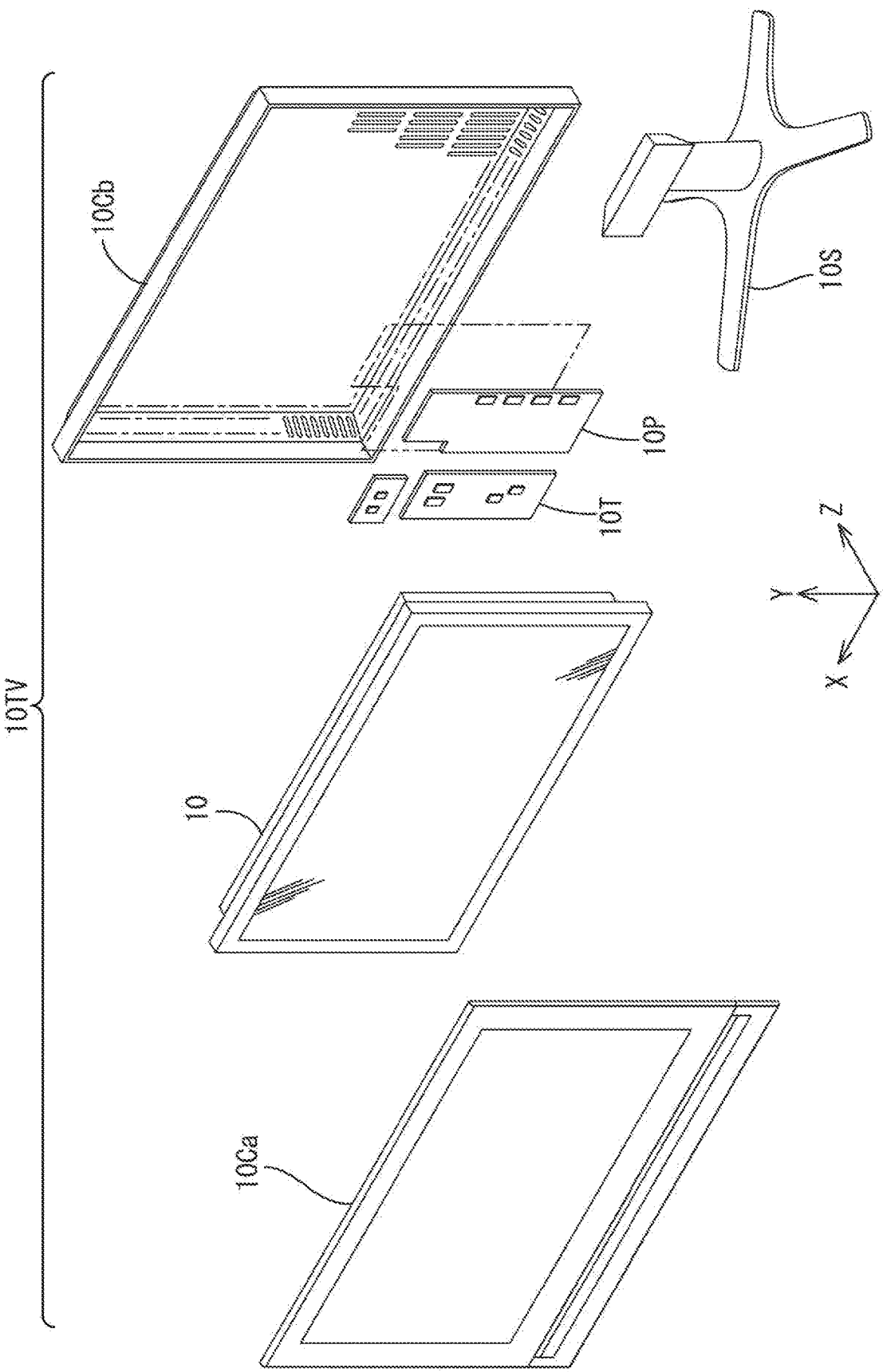
FIG. 1 is an exploded perspective view of an outline configuration of a television device according to a first embodiment of the present invention.

As illustrated in FIG. 1, the television device 10TV according to the present embodiment includes the liquid crystal display device 10, both of front and back cabinets 10Ca, 10Cb housing the liquid crystal display device 10 to sandwich the liquid crystal display device 10, a power source 10P, a tuner (a device) 10T configured to receive a television signal, and a stand 10S. The liquid crystal display device (a display device) 10 is entirely formed in a horizontally-elongated (longitudinal) quadrangular (rectangular) shape, and is housed in a portrait orientation. As illustrated in FIG. 2, the liquid crystal display device 10 includes a liquid crystal panel 11 as a display panel configured to display an image, and the backlight unit (a lighting device) 12 as an external light source configured to supply light for displaying to the liquid crystal panel 11. These components are integrally held by a frame-shaped bezel 13 etc.

Next, the liquid crystal panel 11 and the backlight unit 12 forming the liquid crystal display device 10 will be sequentially described. Of these components, the liquid crystal panel (the display panel) 11 is in a horizontally-elongated quadrangular shape as viewed in the plane, and is configured such that a pair of glass substrates is bonded with a predetermined gap and a liquid crystal layer (not shown) containing liquid crystal molecules as a substance with optical properties changeable according to electric field application is sealed between both glass substrates. On the inside of one glass substrate (an array substrate, an active matrix substrate), switching elements (e.g., TFTs) each connected to source lines and gate lines perpendicular to each other and pixel electrodes each arranged in quadrangular regions surrounded by the source lines and the gate lines and connected to the switching elements are arranged in a matrix as viewed in the plane, and an alignment film etc. are also provided. On the inside of the other glass substrate (a counter substrate, a CF substrate), a color filter configured such that, e.g., color sections of red (R), green (G), and blue (B) are arranged in a predetermined array in a matrix as viewed in the plane is provided, and a light blocking layer (a black matrix) arranged in a grid pattern among the color sections, a solid counter electrode facing the pixel electrodes, an alignment film, etc. are also provided. Note that a polarizing plate is arranged on the outside of each glass substrate. Moreover, the long-side direction of the liquid crystal panel 11 is coincident with an X-axis direction, the short-side direction of the liquid crystal panel 11 is coincident with a Y-axis direction, and the thickness direction of the liquid crystal panel 11 is coincident with a Z-axis direction.

As illustrated in FIG. 2, the backlight unit 12 includes a substantially box-shaped chassis 14 having a light output portion 14b opening toward the outside on the front side (a liquid crystal panel 11 side, a light output side), and multiple optical members (optical sheets) 15 arranged to cover the light output portion 14b of the chassis 14. Further, LEDs 17 as light sources, an LED substrate 18 on which the LEDs 17 are mounted, a light guide plate 19 configured to guide light from the LEDs 17 to the optical members 15 (the liquid crystal panel 11), the wavelength converter 20 interposed among the LEDs 17 and the light guide plate 19 to wavelength-convert the light from the LEDs 17, and a frame 16 configured to hold the light guide plate 19 etc. from the front side and receive the optical members 15 from the back side are provided in the chassis 14. The LED substrate 18 is arranged at one (the near side as viewed in FIGS. 2 and 3, the left side as viewed in FIG. 4) of both long-side end portions of the backlight unit 12, and each LED 17 mounted on the LED substrate 18 is eccentrically located closer to one long-side end portion of the liquid crystal panel 11. As described above, the backlight unit 12 according to the present embodiment is of a one-sided light entering edge light type (a side light type) such that the light of the LEDs 17 enters to the light guide plate 19 only from one side. Subsequently, each component of the backlight unit 12 will be described in detail.

The chassis 14 is made of metal. As illustrated in FIGS. 2 and 3, the chassis 14 includes, as in the liquid crystal panel 11, a bottom portion 14a in a horizontally-elongated quadrangular shape, and side portions 14c each standing from outer ends of the sides of the bottom portion 14a. The chassis 14 is entirely formed in a substantially shallow box shape opening toward the front side. The chassis 14 (the bottom portion 14a) is configured such that the long-side direction thereof is coincident with the X-axis direction (the horizontal direction) and the short-side direction thereof is coincident with the Y-axis direction (the vertical direction). Moreover, the frame 16 and the bezel 13 can be fixed to the side portions 14c.

As illustrated in FIG. 2, the optical member 15 is, as in the liquid crystal panel 11 and the chassis 14, in a horizontally-elongated quadrangular shape as viewed in the plane. The optical members 15 cover the light output portion 14b of the chassis 14, and are interposed between the liquid crystal panel 11 and the light guide plate 19. That is, it can be said that the optical members 15 are arranged on an outlet side in a light output path with respect to the LEDs 17. Each optical member 15 is in a sheet shape, and three optical members 15 in total are provided. Specifically, the optical members 15 include a microlens sheet 21 configured to provide isotropic light collection action to light, a prism sheet 22 configured to provide anisotropic light collection action to light, and a reflection type polarizing sheet 23 configured to polarize and reflect light. As illustrated in FIGS. 4 and 5, the optical members 15 are configured such that the microlens sheet 21, the prism sheet 22, and the reflection type polarizing sheet 23 are stacked on each other in this order from the back side and outer edge portions of these sheets are placed on the front side of the frame 16. That is, the microlens sheet 21, the prism sheet 22, and the reflection type polarizing sheet 23 forming the optical members 15 face the light guide plate 19 with a clearance corresponding to the frame 16 (specifically, a later-described frame-shaped portion 16a) on the front side, i.e., on the light output side.

As illustrated in FIG. 2, the frame 16 has the horizontally-elongated frame-shaped portion (a picture-frame-shaped portion, a frame-shaped support portion) 16a extending along outer peripheral edge portions of the light guide plate 19 and the optical members 15, and the frame-shaped portion 16a holds and supports, from the front side, the outer peripheral edge portion of the light guide plate 19 across the entire circumference thereof. The frame-shaped portion 16a of the frame 16 is interposed between the optical member 15 (the microlens sheet 21) and the light guide plate 19, and receives and supports the outer peripheral edge portions of the optical members 15 from the back side. With this configuration, the optical members 15 are held at positions apart from the light guide plate 19 with the clearance corresponding to the frame-shaped portion 16a. Moreover, a buffer material 24 made of, e.g., poron (registered trademark) is provided on the surface of the frame-shaped portion 16a of the frame 16 on the back side (a light guide plate 19 side). The buffer material 24 is in a frame shape extending across the entire circumference of the frame-shaped portion 16a. Further, the frame 16 has a crystal liquid panel support portion 16b protruding from the frame-shaped portion 16a toward the front side to support an outer peripheral edge portion of the liquid crystal panel 11 from the back side.

Next, the LEDs 17 and the LED substrate 18 on which the LEDs 17 are mounted will be described. As illustrated in FIGS. 3 and 4, the LEDs 17 are of a so-called top-emitting type such that the LEDs 17 are surface-mounted on the LED substrate 18 and light emission surfaces 17a of the LEDs 17 face the opposite side of the LED substrate 18. These LEDs 17 are blue LEDs configured to emit monochromatic blue light. Specifically, the blue light emitted from the LEDs 17 is partially wavelength-converted into green light and red light by the wavelength converter 20 described later in detail, and the output light of the backlight unit 12 shows a substantially white color by additive color mixing of the wavelength-converted green and red light (secondary light) and the blue light (primary light) of the LEDs 17.

Figure 6:
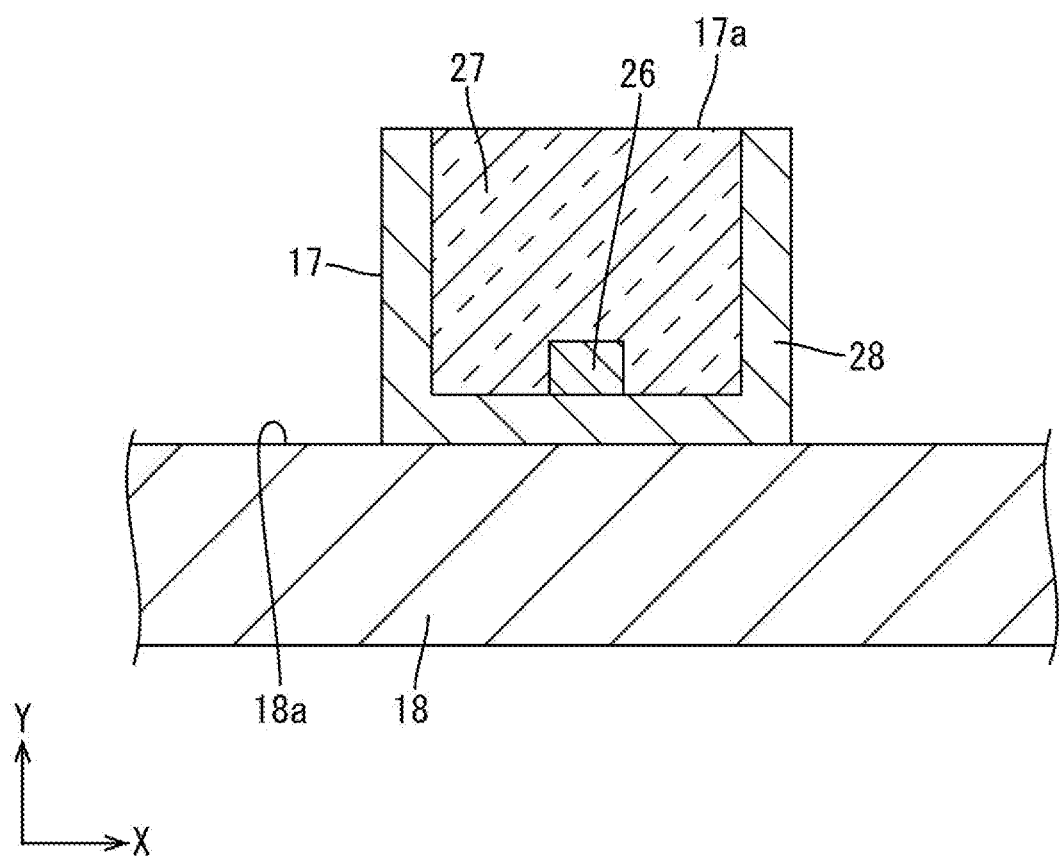
FIG. 6 is a sectional view of an LED and the LED substrate.

Specifically, each LED 17 includes, as illustrated in FIG. 6, a blue LED element (a blue light emitting element, a blue LED chip) 26 as a light source, a sealing material 27 configured to seal the blue LED element 26, and a case (a housing body, a housing) 28 housing the blue LED element 26 and filled with the sealing material 27. The blue LED element 26 is, for example, a semiconductor made of a semiconductor material such as InGaN, and is configured to emit, by voltage application in a forward direction, monochromatic blue light with a wavelength within a blue wavelength region (about 420 nm to about 500 nm). That is, the light emitted from the LEDs 17 is monochromatic light in the same color as that of the light emitted from the blue LED element 26. The blue LED element 26 is, via a not-shown lead frame, connected to a wiring pattern on the LED substrate 18 arranged outside the case 28. At the step of manufacturing the LED 17, an internal space of the case 28 housing the blue LED element 26 is filled with the sealing material 27, and in this manner, the blue LED element 26 and the lead frame are sealed and protected. The sealing material 27 is made of a substantially transparent thermoset resin material (e.g., an epoxy resin material and a silicone resin material). Thus, the monochromatic blue light emitted from the blue LED element 26 is directly used as the light emitted from the LED 17. The case 28 is made of a synthetic resin material (e.g., a polyamide-based resin material) or a ceramic material forming a surface with excellent light reflectivity and showing a white color. The case 28 is entirely formed in a cylindrical shape with a bottom, the cylindrical shape opening toward a light emission surface 17a. The blue LED element 26 is arranged on a bottom surface of the case 28. Moreover, the above-described lead frame penetrates a peripheral wall of the case 28, and therefore, the blue LED element 26 is connected to the wiring pattern of the LED substrate 18.

As illustrated in FIGS. 3 and 4, the LED substrate 18 is in an elongated plate shape extending along the long-side direction (the X-axis direction, the longitudinal direction of a light entering end surface 19b of the light guide plate 19) of the chassis 14, and is housed in the chassis 14 in a posture such that a plate surface of the LED substrate 18 is parallel with the X-axis direction and the Z-axis direction, i.e., the plate surface of the LED substrate 18 is perpendicular to plate surfaces of the liquid crystal panel 11 and the light guide plate 19 (the optical members 15). That is, the LED substrate 18 is in a posture such that the long-side direction (the length direction) of the plate surface thereof is coincident with the X-axis direction, the short-side direction (the width direction) of the plate surface thereof is coincident with the Z-axis direction, and the plate thickness direction perpendicular to the plate surface is coincident with the Y-axis direction. The LED substrate 18 is interposed between the light guide plate 19 and one of the long-side side portions 14c of the chassis 14, and is housed in the chassis 14 from the front side along the Z-axis direction. The LED substrate 18 is attached in a form such that the plate surface on the opposite side of a mounting surface 18a on which the LEDs 17 are mounted contacts an inner surface of the long-side side portion 14c of the chassis 14. Thus, the light emission surface 17a of each LED 17 mounted on the LED substrate 18 faces the later-described long-side end surface (the light entering end surface 19b) of the light guide plate 19, and the optical axis of each LED 17, i.e., a light traveling direction with highest emission intensity, is substantially coincident with the Y-axis direction (the direction parallel with the plate surface of the liquid crystal panel 11, the direction of arrangement of the LEDs 17 and the light guide plate 19, the normal direction of the light entering end surface 19b).

As illustrated in FIGS. 3 and 4, the LED substrate 18 is configured such that the inside of the LED substrate 18, i.e., the plate surface (the surface facing the light guide plate 19) of the LED substrate 18 facing the light guide plate 19 side, is formed as the mounting surface 18a on which the LEDs 17 with the above-described configuration are surface-mounted. The multiple LEDs 17 are, on the mounting surface 18a of the LED substrate 18, arranged in line (linearly) at predetermined intervals along the length direction (the X-axis direction) of the mounting surface 18a. That is, it can be said that the multiple LEDs 17 are intermittently arranged along the long-side direction (the length direction of the light entering end surface 19b) of the backlight unit 12 at one long-side end portion thereof. Thus, the direction of arrangement of the LEDs 17 is coincident with the length direction of the LED substrate 18 (the length direction of the light entering end surface 19b). An interval between adjacent ones of the LEDs 17 in the X-axis direction, i.e., the interval of array (the pitch of array) of the LEDs 17, is substantially constant. In other words, it can be said that the LEDs 17 are arrayed at equal pitches. The dimension of the LED 17 in the X-axis direction on the LED substrate 18 is greater than the interval of array of the LEDs 17, and specifically, is about 5 mm to 10 mm, for example. Moreover, a wiring pattern (not shown) extending along the X-axis direction, connecting the adjacent LEDs 17 in series across the group of LEDs 17, and made of a metal film (copper foil, etc.) is formed on the mounting surface 18a of the LED substrate 18. A not-shown terminal portion is formed at an end portion of the wiring pattern on the LED substrate 18, and a LED drive board (a light source drive board, a light source control board) LDB supplies drive power to the terminal portion via a not-shown wiring member (see FIG. 10). Note that a circuit configuration for driving the LEDs 17 will be described later again. The LED substrate 18 is of a one-sided mounting type such that only one surface of the plate surfaces is the mounting surface 18a. A base material of the LED substrate 18 is made of metal such as aluminum, and the above-described wiring pattern (not shown) is formed on the surface of the base material via an insulating layer. Note that an insulating material such as synthetic resin or ceramic can be used as the material used for the base material of the LED substrate 18.

The light guide plate 19 is made of a substantially transparent synthetic resin material (an acrylic resin material such as PMMA) exhibiting excellent light transmission. The index of refraction of the light guide plate 19 is, for example, about 1.49 which is sufficiently higher than that of air. As illustrated in FIGS. 2 and 3, the light guide plate 19 is, as in the liquid crystal panel 11 and the chassis 14, in a horizontally-elongated quadrangular shape as viewed in the plane, and is also in a plate shape having a greater thickness than that of the optical members 15. The long-side direction of a plate surface of the light guide plate 19 is coincident with the X-axis direction, the short-side direction of the plate surface of the light guide plate 19 is coincident with the Y-axis direction, and the plate thickness direction perpendicular to the plate surface is coincident with the Z-axis direction. As illustrated in FIGS. 4 and 5, the light guide plate 19 is arranged at a position right below the liquid crystal panel 11 and the optical members 15 in the chassis 14, and one (on the near side as viewed in FIGS. 2 and 3, on the left side as viewed in FIG. 4) of long-side end surfaces of an outer peripheral end surface of the light guide plate 19 faces each LED 17 on the LED substrate 18 arranged at one long-side end portion of the chassis 14. Thus, the direction of arrangement of the LEDs 17 (the LED substrate 18) and the light guide plate 19 is coincident with the Y-axis direction. Meanwhile, the direction of arrangement of the optical members 15 (the liquid crystal panel 11) and the light guide plate 19 is coincident with the Z-axis direction. Thus, both of these arrangement directions are perpendicular to each other. Moreover, the light guide plate 19 has the function of guiding light emitted from the LEDs 17 in the Y-axis direction and propagating the light in the light guide plate 19 while outputting the light upwardly to an optical member 15 side (the front side). The thickness (the dimension in the Z-axis direction) of the light guide plate 19 is greater than the height dimension (the dimension in the Z-axis direction) of the LED 17.

As illustrated in FIGS. 4 and 5, a front plate surface of both plate surfaces of the light guide plate 19 is formed as a light exiting plate surface (a light exiting surface) 19a configured to output internal light toward the optical members 15 and the liquid crystal panel 11. The outer peripheral end surface of the light guide plate 19 adjacent to the plate surfaces thereof includes a pair of long-side end surfaces elongated along the X-axis direction (the direction of arrangement of the LEDs 17, the long-side direction of the LED substrate 18, the long-side direction of the light guide plate 19) as the circumferential direction of the light guide plate 19, and a pair of short-side end surfaces elongated along the Y-axis direction (the direction of arrangement of the LEDs 17 and the light guide plate 19, the plate thickness direction of the LED substrate 18, the short-side direction of the light guide plate 19) as the circumferential direction of the light guide plate 19. Of both long-side end surfaces forming the outer peripheral end surface of the light guide plate 19, one long-side end surface (on the near side as viewed in FIGS. 2 and 3) faces the LEDs 17 (the LED substrate 18) with a predetermined space (an arrangement space of the later-described wavelength converter 20), and is formed as the light entering end surface (a light entering surface) 19b to which the light emitted from the LEDs 17 enters via the later-described wavelength converter 20. Since the light entering end surface 19b faces the LEDs 17, it can be said that the light entering end surface 19b is an LED-facing end surface (a light-source-facing end surface). The light entering end surface 19b is configured such that the length direction (the long-side direction), the width direction (the short-side direction), and the normal direction thereof are coincident respectively with the X-axis direction, the Z-axis direction, and the Y-axis direction, and is formed as the surface substantially perpendicular to the light exiting plate surface 19a. On the other hand, part (the other long-side end surface and the pair of short-side end surfaces) of the above-described outer peripheral end surface of the light guide plate 19 other than the light entering end surface 19b is formed as a non-light-entering end surface 19d to which no light emitted from the LEDs 17 is directly input. The non-light-entering end surface 19d does not face the LEDs 17, and therefore, it can be also said that the non-light-entering end surface 19d is a non-LED-facing end surface (a non-light-source-facing end surface). The non-light-entering end surface 19d includes the other long-side end surface of the above-described outer peripheral end surface of the light guide plate 19, i.e., a non-light-input opposite end surface 19d1 formed by the opposite end surface of the above-described light entering end surface 19b, and a pair of non-light-input-side end surfaces 19d2 formed by the pair of short-side end surfaces adjacent to the light entering end surface 19b and the non-light-input opposite end surface 19*d*1. Note that in the present embodiment, the non-LED-facing end surface has been described as the "non-light-entering end surface 19*d*," but does not mean that no light enters at all. For example, in a case where light having leaked to the outside from the non-light-entering end surface 19*d* once returns due to reflection by the side portion 14*c* of the chassis 14, such returned light might be input to the non-light-entering end surface 19*d*.

As illustrated in FIGS. 4 and 5, a reflection sheet (a reflection member) 25 is arranged to overlap with the back side of the light guide plate 19, i.e., the opposite plate surface 19*c* on the opposite side of the light exiting plate surface 19*a*. The reflection sheet 25 is made of synthetic resin (e.g., foamed PET) forming a surface with excellent light reflectivity and showing a white color. The reflection sheet 25 is configured to reflect the light reaching the opposite plate surface 19*c* after having propagated in the light guide plate 19, thereby outputting the light upwardly to the front side, i.e., the light exiting plate surface 19*a*. The reflection sheet 25 is arranged to cover the substantially entire area of the opposite plate surface 19*c* of the light guide plate 19. The reflection sheet 25 extends to an area overlapping with the LED substrate 18 (the LEDs 17) as viewed in the plane, and is arranged such that the LED substrate 18 (the LEDs 17) is sandwiched between such an extended portion and the frame-shaped portion 16*a* of the frame 16 on the front side. With this configuration, the light from the LEDs 17 is reflected by the extended portion of the reflection sheet 25, and therefore, can be efficiently input to the light entering end surface 19*b*. A light reflection pattern (not shown) including a light reflector configured to reflect the light in the light guide plate 19 toward the light exiting plate surface 19*a* to prompt light output from the light exiting plate surface 19*a* is formed on the opposite plate surface 19*c* of the light guide plate 19. The light reflector forming this light reflection pattern includes many light reflection dots. The distribution density of the dots varies according to a distance from the light entering end surface 19*b* (the LEDs 17). Specifically, a greater distance from the light entering end surface 19*b* (a smaller distance to the non-light-input opposite end surface 19*d*1) in the Y-axis direction results in a higher distribution density of the light reflection dots forming the light reflector. Conversely, a smaller distance to the light entering end surface 19*b* (a greater distance from the non-light-input opposite end surface 19*d*1) results in a lower distribution density. This controls such that the light emitted from the light exiting plate surface 19*a* shows uniform distribution in a plane.

Figure 7:
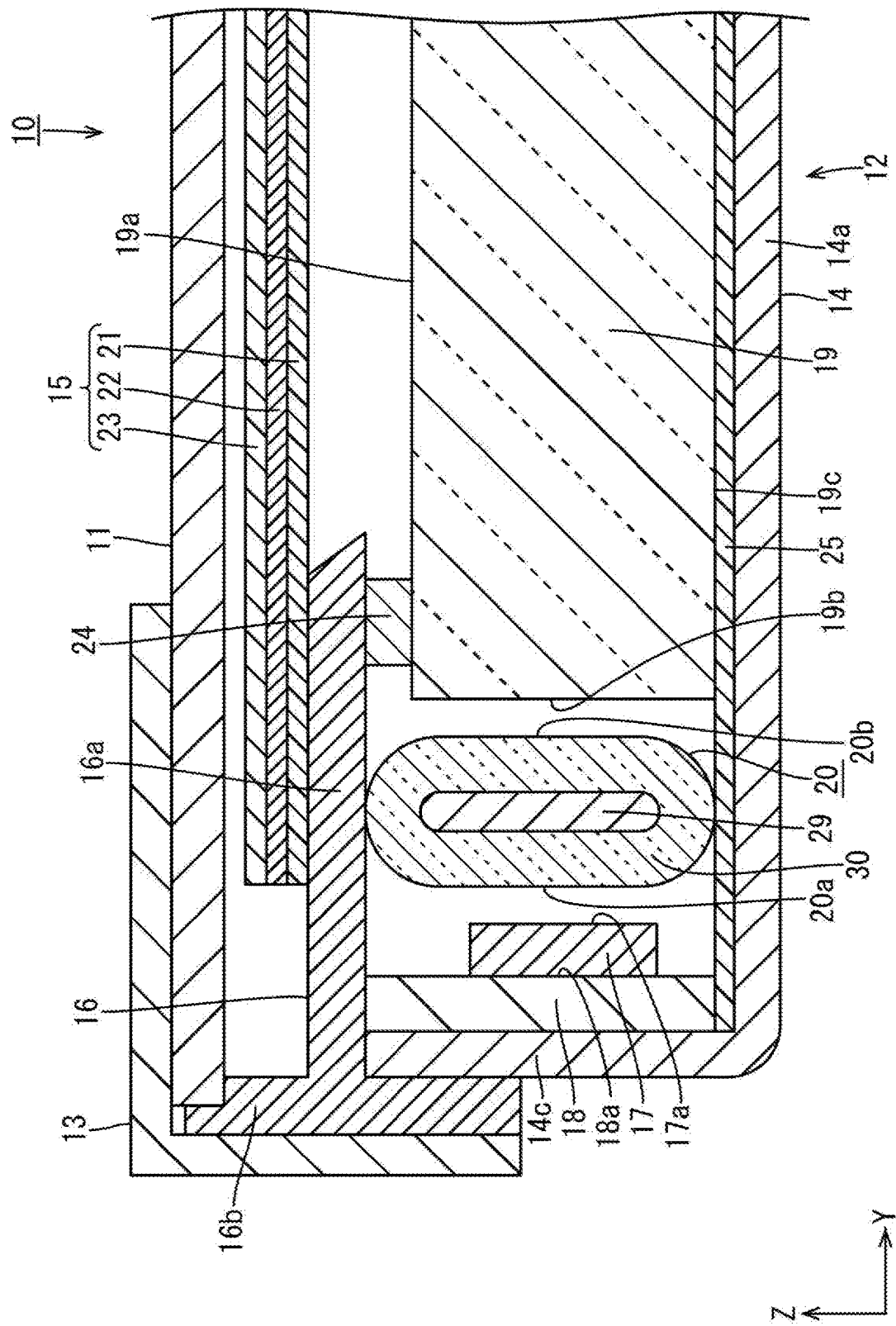
FIG. 7 is an enlarged view of FIG. 4.
Figure 8:
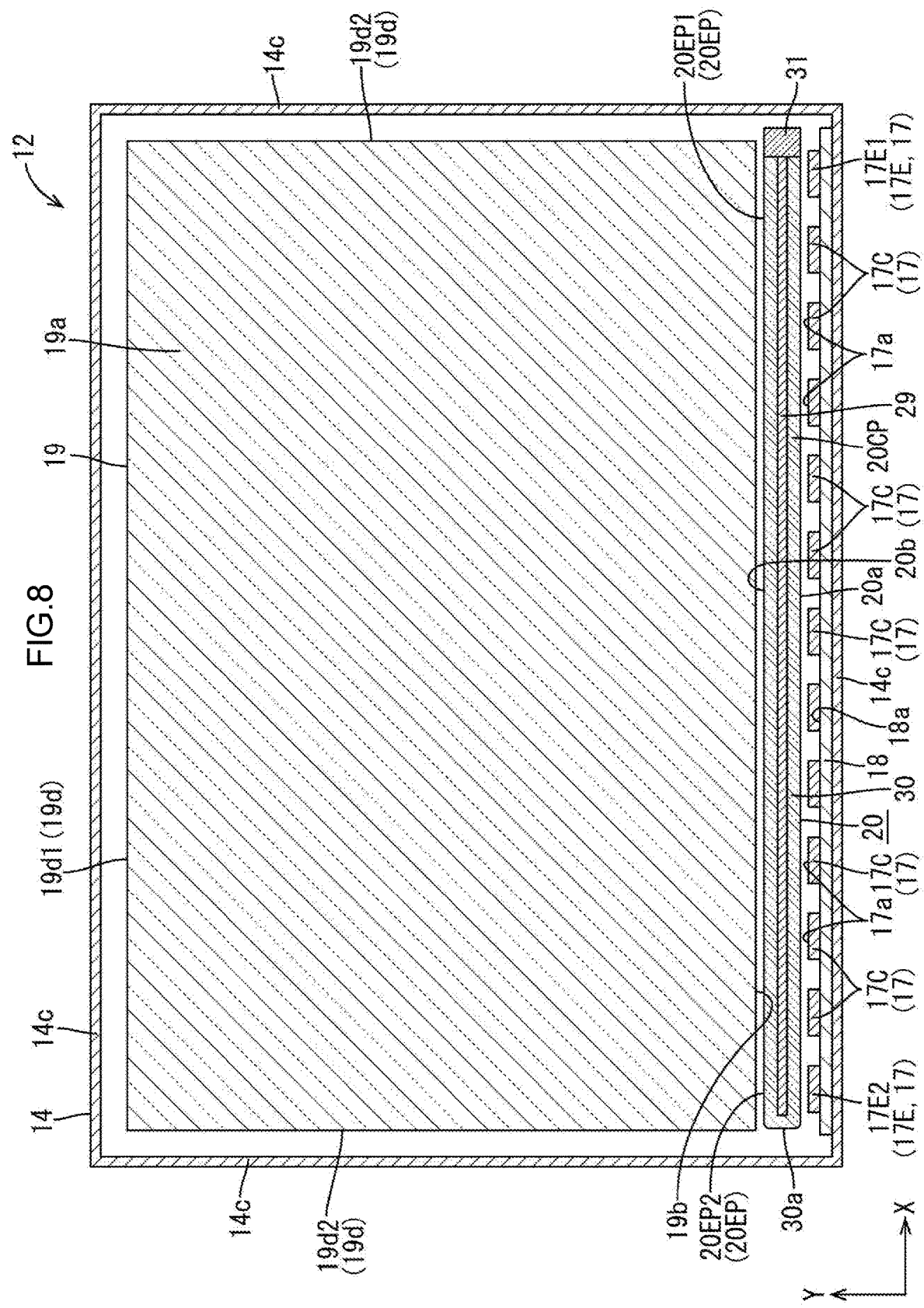
FIG. 8 is a sectional view of FIG. 4 along a viii-viii line.

The wavelength converter 20 will be described in detail. As illustrated in FIGS. 7 and 8, the wavelength converter 20 has phosphors (wavelength conversion substances) configured to wavelength-convert the light (the primary light) emitted from the LEDs 17 into the light (the secondary light) with other wavelengths, and is interposed among the LEDs 17 and the light entering end surface 19*b* of the light guide plate 19. The wavelength converter 20 is held in the above-described posture by a not-shown holding unit. The wavelength converter 20 extends in the length direction (the X-axis direction) of the light entering end surface 19*b* of the light guide plate 19, and is arranged to face the light entering end surface 19*b* across the substantially entire length thereof while facing all of the LEDs 17 mounted on the LED substrate 18. The wavelength converter 20 is configured such that a section along the direction perpendicular to the length direction (the extension direction, the X-axis direction) of the wavelength converter 20 is in a substantially vertically-elongated oval shape, the length dimension (the dimension in the X-axis direction) of the wavelength converter 20 is greater than the long-side dimension (the length dimension of the light entering end surface 19*b*) of the light guide plate 19, and the height dimension (the dimension in the Z-axis direction) of the wavelength converter 20 is greater than the thickness dimension (the width dimension of the light entering end surface 19*b*) of the light guide plate 19. The wavelength converter 20 has substantially flat outer surfaces along the X-axis direction and the Z-axis direction. The outer surface of the wavelength converter 20 facing the light emission surface 17*a* of each LED 17 is formed as a light entering surface 20*a* parallel with the light emission surface 17*a* such that the light from the light emission surface 17*a* enters to the light entering surface 20*a*. On the other hand, the outer surface of the wavelength converter 20 facing the light entering end surface 19*b* of the light guide plate 19 is formed as a light exiting surface 20*b* parallel with the light entering end surface 19*b* such that the light exits from the light exiting surface 20*b* to the light entering end surface 19*b*. The wavelength converter 20 is arranged such that an inner end position thereof is outside an inner end position of the frame-shaped portion 16*a* of the frame 16 in the width direction (the Y-axis direction) of the wavelength converter 20. That is, the wavelength converter 20 is arranged such that the entire area thereof overlaps with the frame-shaped portion 16*a* of the frame 16 as viewed in the plane, and therefore, e.g., a situation where a user of the liquid crystal display device 10 directly views the wavelength converter 20 from the front side is less caused. According to such a configuration, the light emitted from the LEDs 17 is wavelength-converted in the course of transmitting through the wavelength converter 20 interposed among the LEDs 17 and the light entering end surface 19*b* of the light guide plate 19, and then, enters to the light entering end surface 19*b* to propagate in the light guide plate 19. Thereafter, the light exits from the light exiting plate surface 19*a*. The wavelength converter 20 is interposed among the LEDs 17 and the light entering end surface 19*b* of the light guide plate 19, and therefore, it is preferable because a manufacturing cost is reduced with a less usage of the phosphors as compared to a case where a wavelength converter is formed in a sheet shape and is arranged to overlap with a light exiting plate surface 19*a* or an opposite plate surface 19*c* of a light guide plate 19.

As illustrated in FIGS. 7 and 8, the wavelength converter 20 has a phosphor containing portion 29 containing the phosphors (the wavelength conversion substances) for wavelength-converting the light from the LEDs 17, a container (a capillary) 30 extending along the X-axis direction as the length direction of the light entering end surface 19*b* to house the phosphor containing portion 29, and sealing members 31 configured to seal end portions of the container 30 in the X-axis direction. In the phosphor containing portion 29, a red phosphor configured to emit red light (a visible light beam in a specific wavelength region belonging to a red color) by means of the monochromatic blue light from the LEDs 17 as excitation light and a green phosphor configured to emit green light (a visible light beam in a specific wavelength region belonging to a green color) by means of the monochromatic blue light from the LEDs 17 as the excitation light are dispersively mixed. With this configuration, the wavelength converter 20 wavelength-converts the light (the blue light, the primary light) emitted from the LEDs 17 into the secondary light (the green light and the red light) showing a color tone (a yellow color) as a complementary color for the color tone (the blue color) of the light emitted from the LEDs 17. The phosphor containing portion 29 is formed in such a manner that a phosphor solution obtained by dispersively mixing of the red phosphor and the green phosphor in a ultraviolet curable resin material in a liquid form is injected into the container 30, and then, is hardened by irradiation with ultraviolet light, for example.

More specifically, for the phosphor in each color in the phosphor containing portion 29, the excitation light is the blue light, and such a phosphor has the following emission spectrum. That is, the green phosphor uses the blue light as the excitation light, thereby emitting, as fluorescent light, the light in the wavelength region (about 500 nm to 570 nm) belonging to the green color, i.e., the green light. Preferably, the green phosphor has an emission spectrum with a peak wavelength of about 530 nm in the wavelength range of the green light and a half bandwidth of less than 40 nm. The red phosphor uses the blue light as the excitation light, thereby emitting, as fluorescent light, the light in the wavelength region (about 600 nm to 780 nm) belonging to the red color, i.e., the red light. Preferably, the red phosphor has an emission spectrum with a peak wavelength of about 610 nm in the wavelength range of the red light and a half bandwidth of less than 40 nm.

As described above, the phosphor in each color is of a down-conversion type (a downshifting type) with a shorter excitation wavelength than a fluorescence wavelength. The phosphor of this down-conversion type converts high-energy excitation light with a relatively-short wavelength into low-energy fluorescent light with a relatively-long wavelength. Thus, as compared to the case of using an up-conversion type phosphor with a longer excitation wavelength than the fluorescence wavelength (a quantum efficiency of, e.g., about 28%), a quantum efficiency (a light conversion efficiency) is a higher value of about 30% to 50%. The phosphor in each color is a quantum dot phosphor. The quantum dot phosphor has a discrete energy level in such a manner that electrons/electron holes and excitons are confined in all directions of a three-dimensional space in a nanosize (e.g., a diameter of about 2 nm to 10 nm) semiconductor crystal, and the dot size of the quantum dot phosphor is changed so that the peak wavelength (the emission color) of emitted light etc. can be selected as necessary. The light (the fluorescent light) emitted from the quantum dot phosphor has an extremely-high color purity and a wide color gamut because a peak in the emission spectrum of such light is steep and the half bandwidth of such an emission spectrum is narrow. A material of the quantum dot phosphor includes, for example, material combinations (e.g., cadmium selenide (CdSe) and zinc sulfide (ZnS)) of Zn, Cd, Hg, Pb, etc. as divalent cations and O, S, Se, Te, etc. as divalent anions, material combinations (e.g., indium phosphide (InP) and gallium arsenide (GaAs)) of Ga, In, etc. as trivalent cations and P, As, Sb, etc. as trivalent anions, and chalcopyrite compounds (e.g., $CuInSe_2$). Of the above-described materials, CdSe and ZnS are used in combination as the material of the quantum dot phosphor in the present embodiment. Moreover, the quantum dot phosphor used in the present embodiment is a so-called core-shell quantum dot phosphor. The core-shell quantum dot phosphor is configured such that the periphery of a quantum dot is covered with a shell made of a semiconductor substance with a relatively-great bandgap. Specifically, "Lumidot (registered trademark) CdSe/ZnS" as a product of Sigma-Aldrich Japan is preferably used as the core-shell quantum dot phosphor.

As illustrated in FIGS. 7 and 8, the phosphor containing portion 29 is sealed in an internal space of the container 30, and has surfaces along the X-axis direction and the Z-axis direction. A formation area of the phosphor containing portion 29 is set such that the phosphor containing portion 29 overlaps with a large portion of a mounting area of the LEDs 17 on the LED substrate 18 in the X-axis direction and overlaps with the entire area of the light emission surfaces 17a of the LEDs 17 in the Z-axis direction. The thickness dimension (the dimension in the Y-axis direction) of the phosphor containing portion 29 is smaller than the thickness dimension of the container 30 described later, and is specifically about 0.5 mm. Both of the front and back surfaces of the phosphor containing portion 29 along the X-axis direction and the Z-axis direction are formed as flat surfaces, and are parallel with the light emission surfaces 17a of the LEDs 17 and the light entering end surface 19b of the light guide plate 19.

The container 30 is made of a substantially-transparent inorganic glass material (e.g., alkali-free glass or quartz glass) exhibiting excellent light transmission, and the index of refraction of the container 30 is about 1.5, for example. As illustrated in FIGS. 7 and 8, the container 30 surrounds the phosphor containing portion 29 across the entire length thereof, and is in a substantially cylindrical shape having a bottom and extending along the X-axis direction. Moreover, the section of the container 30 perpendicular to the length direction (the extension direction) thereof is in a substantially vertically-elongated oval shape. Both outer surfaces of the container 30 along the length direction thereof are formed as the light entering surface 20a and the light exiting surface 20b described above. The thickness dimension of the container 30 is greater than that of the above-described phosphor containing portion 29, and is specifically about 1 mm. The container 30 is, at one end portion thereof in the length direction, sealed by the sealing member 31. That is, the wavelength converter 20 has a one-sided sealing structure such that only one end side thereof is sealed by the sealing member 31. At a stage before formation of the phosphor containing portion 29 in the course of manufacturing the container 30, the container 30 is in a state in which one end portion opens to the outside and the other end portion is closed by a bottom portion 30a. After formation of the phosphor containing portion 29, the opening is sealed by the sealing member 31. The sealing member 31 is made of the same inorganic glass material as that of the container 30, and therefore, the end portion of the container 30 can be sealed with high sealability. The dimension of the sealing member 31 in the X-axis direction is greater than the thickness dimension of the bottom portion 30a of the container 30. Moreover, such a dimension is substantially equal to or less than the dimension of the LED 17 in the X-axis direction, and is specifically about 5 mm, for example.

Of both end portions 20EP of the wavelength converter 20 with the above-described configuration in the length direction, one end portion 20EP is provided with the sealing member 31, and the other end portion 20EP is not provided with the sealing member 31. Hereinafter, the former will be referred to as a "sealing member disposed end portion 20EP1," and the latter will be referred to as a "sealing member non-disposed end portion (a bottom member disposed end portion) 20EP2. The sealing member disposed end portion 20EP1 of the wavelength converter 20 has the sealing member 31, whereas the sealing member non-disposed end portion 20EP2 does not have the sealing member 31 but the bottom portion 30a of the container 30. Thus, the region provided with no phosphors is present to no small extent at each edge of the wavelength converter 20 in the length direction. Specifically, at the edge of the sealing member disposed end portion 20EP1, the region provided with no phosphors is present to have a dimension corresponding to the sealing member 31 in the X-axis direction, and is larger than an equivalent region (corresponding to the thickness dimension of the bottom portion 30a) of the sealing member non-disposed end portion 20EP2. With advancement of frame-size reduction of the liquid crystal display device 10 and the backlight unit 12, a position relationship in which the region of the wavelength converter 20 provided with no phosphors overlaps with the LED 17 in the X-axis direction is easily brought. Due to such a relationship, the blue light from the LEDs 17 is, without being wavelength-converted by the phosphors, input to the end portion of the light entering end surface 19b of the light guide plate 19 in the length direction, and the light emitted from the end portion of the light guide plate 19 in the X-axis direction is blue-tinged. A situation leading to such color unevenness has been concerned. Specifically, the region provided with no phosphors is large at the edge of the sealing member disposed end portion 20EP1, and therefore, the position relationship in which such a region overlaps with the LED 17 in the X-axis direction is easily brought. Thus, occurrence of color unevenness has been concerned.

Figure 9:
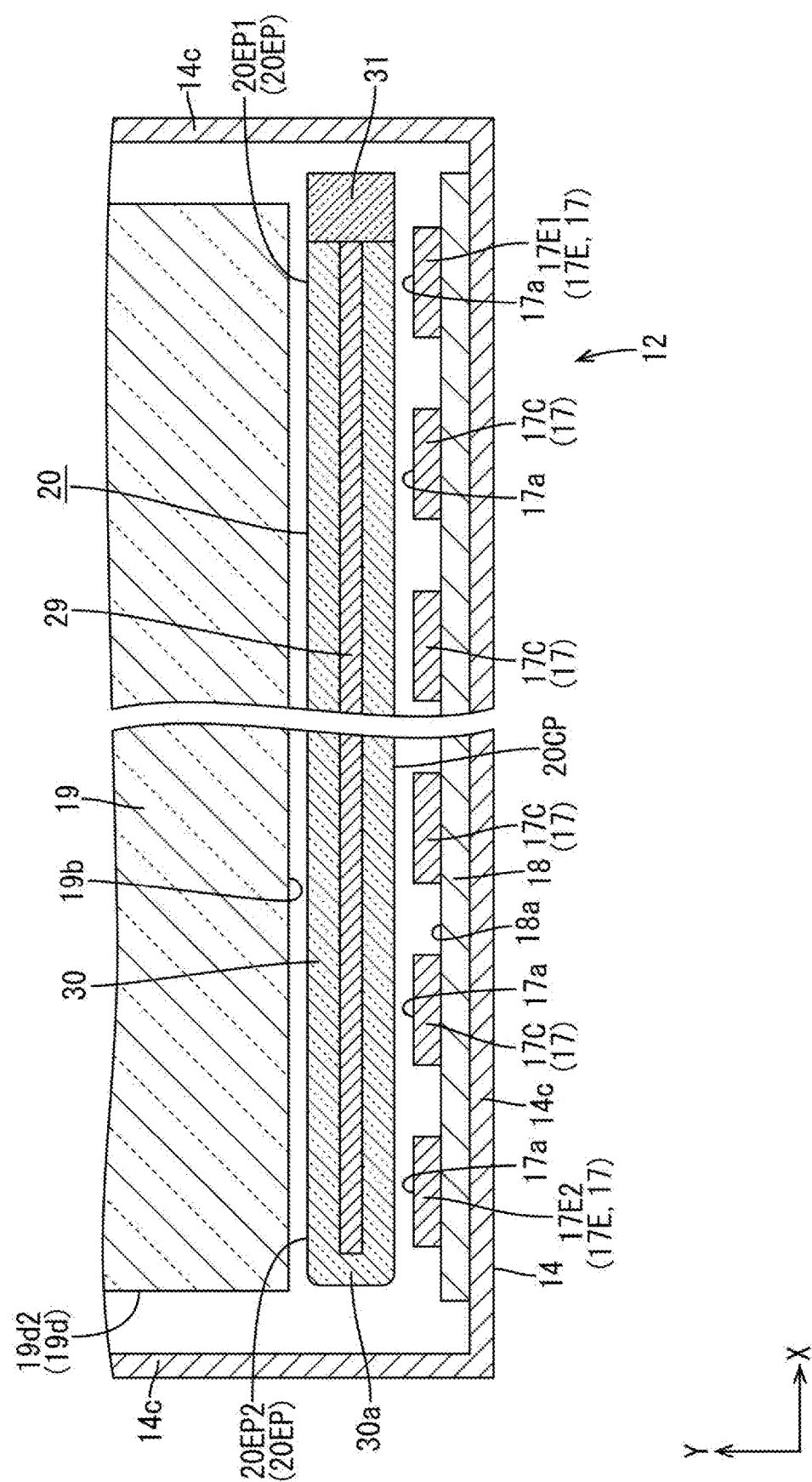
FIG. 9 is an enlarged view of FIG. 8.
Figure 10:
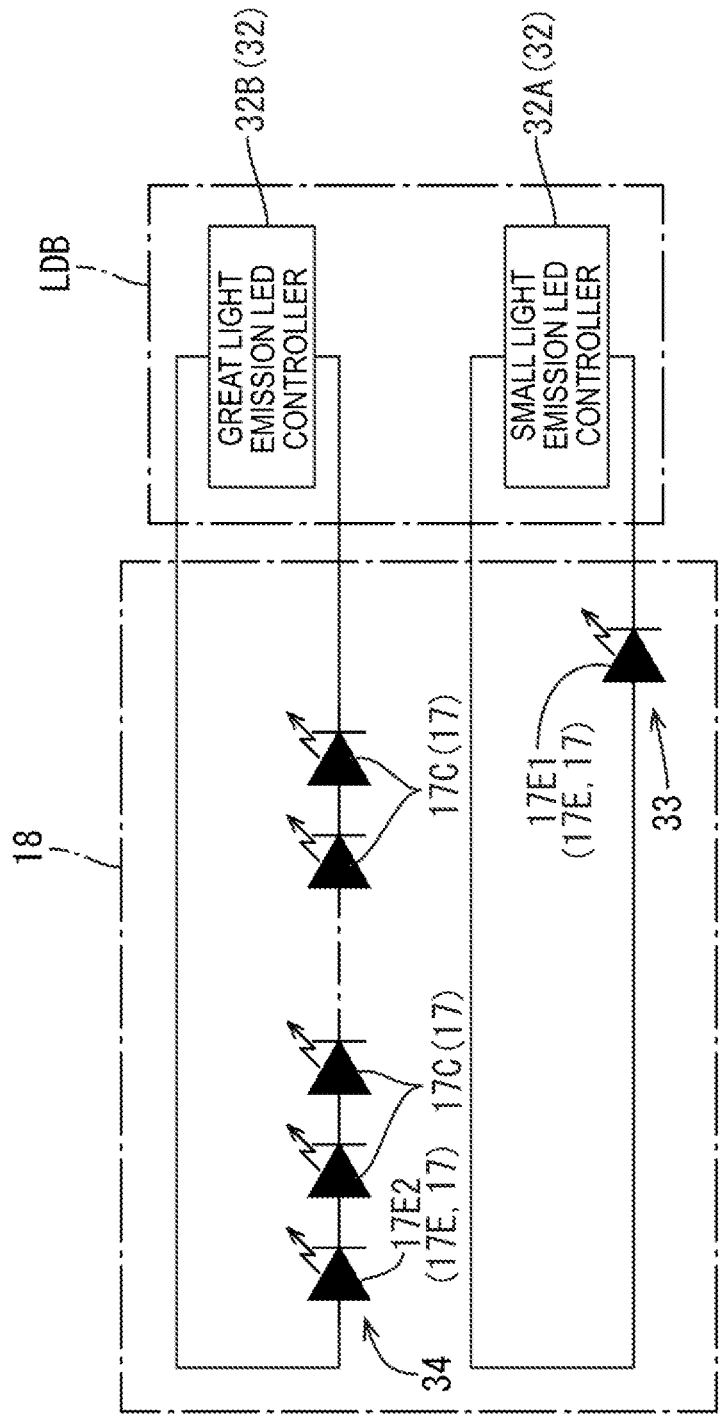
FIG. 10 is a circuit diagram of a circuit configuration for driving each LED.
Figure 11:
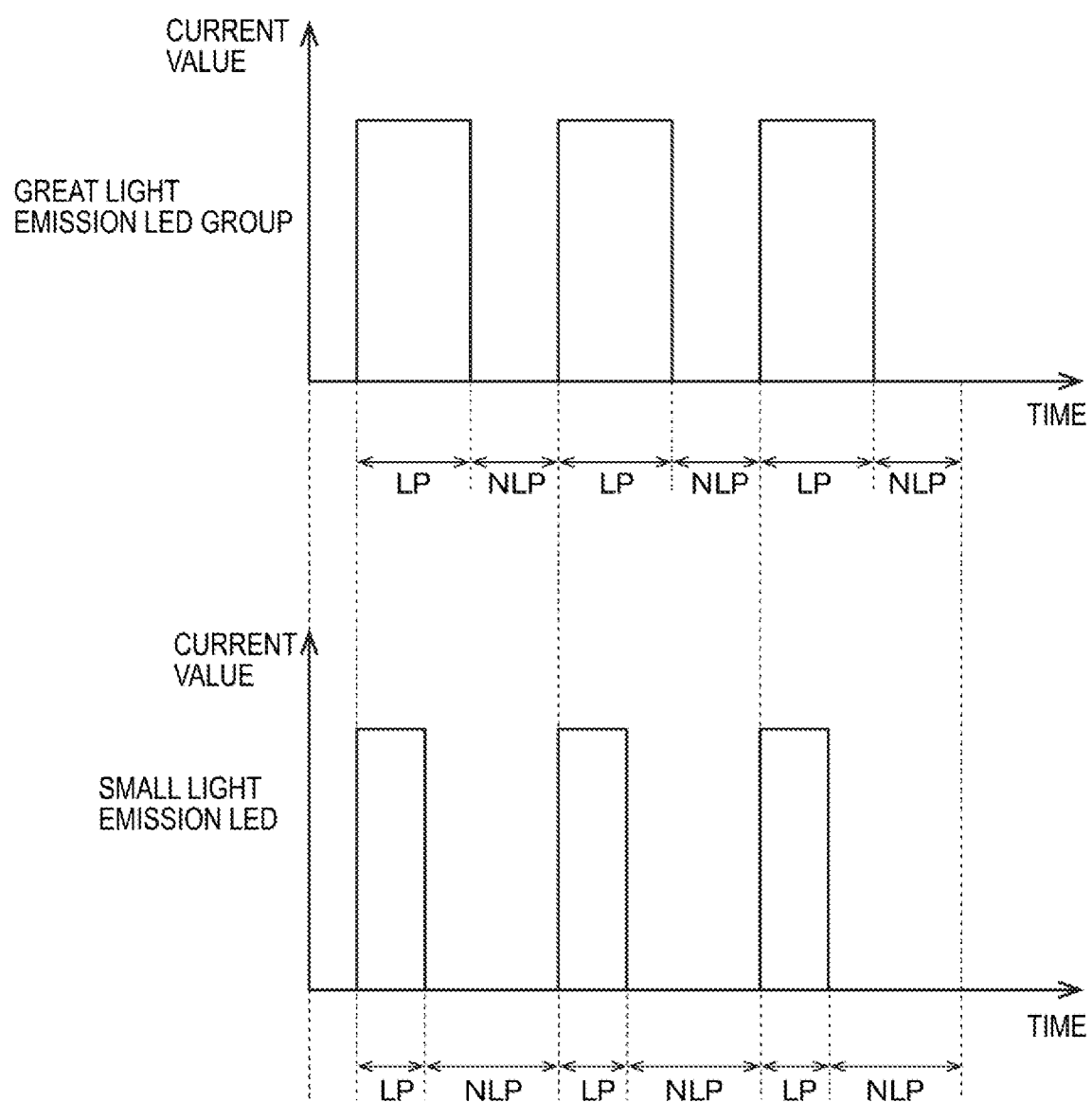
FIG. 11 is a graph of a light-ON period and a light-OFF period of each LED.

For this reason, the LED drive board LDB provided at the backlight unit 12 according to the present embodiment includes, as illustrated in FIGS. 9 to 11, LED controllers 32 configured to control such that the amount of light emitted per unit time from an end-side LED (an end-side light source) 17E (a later-described first end-side LED 17E1) positioned at one end side in the direction (the X-axis direction) of arrangement of the multiple LEDs 17 arranged along the X-axis direction on the LED substrate 18 is less than the amount of light emitted per unit time from a center LED (a center light source) 17C positioned at the center in the direction of arrangement. With this configuration, the amount of light supplied from the end-side LED 17E positioned on one end side to the end portion 20EP of the wavelength converter 20 in the length direction is less than the amount of light supplied from the center LED 17C to the center portion 20CP in the length direction. Thus, even when the region provided with no phosphors is formed at the edge of the wavelength converter 20 in the length direction and the position relationship in which such a region overlaps with the end-side LED 17E positioned on one end side is brought, the amount of light supplied from the end-side LED 17E to the end portion 20EP of the wavelength converter 20 in the length direction is decreased, and therefore, the amount of light input to the light entering end surface 19b of the light guide plate 19 without wavelength conversion by the phosphors is also decreased. Thus, a difference between the color tone of light input to the end portion of the light entering end surface 19b of the light guide plate 19 in the length direction and the color tone of light input to the center portion of the light entering end surface 19b in the length direction is less caused. Even with advancement of frame-size reduction, color unevenness is less caused in the light output from the light exiting plate surface 19a. Note that in a case where the LEDs 17 are distinguished from each other, an index "C" is assigned to the reference numeral of the center LED, and an index "E" is assigned to the reference numeral of the end-side LED. In a case where the LEDs 17 are collectively referred without distinction, no index is assigned to the reference numeral.

Specifically, as illustrated in FIG. 9, ones of the multiple LEDs 17 positioned at both ends in the direction of arrangement of the LEDs 17 are referred to as a pair of "end-side LEDs 17E," and multiple LEDs sandwiched between both end-side LEDs 17E are referred to as "center LEDs 17C." Of both end-side LEDs 17E, the right end-side LED 17E as viewed in FIG. 9 is formed as the first end-side LED 17E1 facing the sealing member disposed end portion 20EP1 of the wavelength converter 20, and the left end-side LED 17E as viewed in FIG. 9 is formed as a second end-side LED 17E2 facing the sealing member non-disposed end portion 20EP2. Moreover, the LED controllers 32 control such that the amount of light emitted per unit time from the first end-side LED 17E1 facing the sealing member disposed end portion 20EP1 is less than the amount of light emitted per unit time from the center LED 17C positioned at the center in the direction of arrangement. Note that in a case where both end-side LEDs 17E are distinguished from each other, an index "1" is assigned to the reference numeral of the first end-side LED facing the sealing member disposed end portion 20EP1, and an index "2" is assigned to the reference numeral of the second end-side LED facing the sealing member non-disposed end portion 20EP2. In a case where the end-side LEDs 17E are collectively referred without distinction, no index is assigned to the reference numeral.

As illustrated in FIGS. 10 and 11, the LED controllers 32 include a small light emission LED controller (a small light emission light source controller) 32A connected to the first end-side LED 17E1 to control driving such that the amount of light emitted per unit time from the first end-side LED 17E1 is relatively decreased, and a great light emission LED controller (a great light emission light source controller, a reference light emission light source controller) 32B connected to the multiple center LEDs 17C and the second end-side LED 17E2 to control driving such that the amount of light emitted per unit time from the multiple center LEDs 17C and the second end-side LED 17E2 is relatively increased. That is, the amount of light emitted per unit time becomes, by the great light emission LED controller 32B, equal among the multiple center LEDs 17C and the second end-side LED 17E2, and is controlled to be relatively greater than that of the first end-side LED 17E1. As described above, the amount of light emitted per unit time is equal among the multiple center LEDs 17C and the second end-side LED 17E2, and therefore, control of the light emission amount for the multiple center LEDs 17C and the second end-side LED 17E2 is facilitated. Thus, the configuration of a member such as a line for electrically connecting the multiple center LEDs 17C and the second end-side LED 17E2 with the great light emission LED controller 32B is simplified. Note that in a case where the LED controllers 32 are distinguished from each other, an index "A" is assigned to the reference numeral of the small light emission LED controller, and an index "B" is assigned to the reference numeral of the great light emission LED controller. In a case where the LED controllers 32 are collectively referred without distinction, no index is assigned to the reference numeral.

The amount, which is controlled by the great light emission LED controller 32B, of light emitted per unit time from the multiple center LEDs 17C and the second end-side LED 17E2 is the reference light emission amount of the LED 17 at the backlight unit 12. On the other hand, the amount, which is controlled by the small light emission LED controller 32A, of light emitted per unit time from the first end-side LED 17E1 is less than the above-described reference light emission amount. Thus, the amount of light input to the sealing member disposed end portion 20EP1 of the wavelength converter 20 facing the first end-side LED 17E1 per unit time is less than the amount of light input to the center portion 20CP and the sealing member non-disposed end portion 20EP2 facing the multiple center LEDs 17C and the second end-side LED 17E2 per unit time. Thus, even when the region not provided with the phosphor containing portion 29 is formed at the edge of the sealing member disposed end portion 20EP1 and the position relationship in which such a region overlaps with the first end-side LED 17E1 is brought, the amount of light supplied from the first end-side LED 17E1 to the sealing member disposed end portion 20EP1 is decreased, and therefore, the amount of light input to the light entering end surface 19b of the light guide plate 19 without wavelength conversion by the phosphors of the phosphor containing portion 29 is also decreased. Thus, occurrence of color unevenness is reduced. Note that as illustrated in FIG. 10, the first end-side LED 17E1 connected to the small light emission LED controller 32A will be hereinafter referred to as a "small light emission LED (a small light emission light source) 33," and the multiple center LEDs 17C and the second end-side LED 17E2 connected to the great light emission LED controller 32B will be hereinafter referred to as a "great light emission LED group (a great light emission light source group, a reference light emission light source group) 34."

Regarding specific driving of each LED 17, the LED controllers 32 supply, as illustrated in FIGS. 10 and 11, pulse signals to each LED 17 and adjust a time ratio (a duty ratio) between a light-ON period LP and a light-OFF period (a non-lighting period) NLP at each LED 17, thereby controlling the amount of light emitted per unit time. That is, the LED controllers 32 perform pulse width modulation (PWM) light adjustment driving for blinking ON and OFF each LED 17 periodically to change the time ratio between the light-ON period LP and the light-OFF period NLP. Specifically, the small light emission LED controller 32A supplies the pulse signal to the small light emission LED 33 (the first end-side LED 17E1), thereby performing light adjustment driving of the small light emission LED 33 such that the light-ON period LP of the small light emission LED 33 is relatively shorter and the light-OFF period NLP of the small light emission LED 33 is relatively longer than those of the great light emission LED group 34 (the multiple center LEDs 17C and the second end-side LED 17E2). On the other hand, the great light emission LED controller 32B supplies the pulse signal to the great light emission LED group 34 (the multiple center LEDs 17C and the second end-side LED 17E2), thereby performing light adjustment driving of the great light emission LED group 34 such that the light-ON period LP of the great light emission LED group 34 is relatively longer and the light-OFF period NLP of the great light emission LED group 34 is relatively shorter than those of the small light emission LED 33 (the first end-side LED 17E1).

The present embodiment employs the above-described structure, and subsequently, features of such a structure will be described. When the liquid crystal display device 10 is powered ON, driving of the liquid crystal panel 11 is controlled by a panel control circuit of a not-shown control board. Moreover, drive power is supplied from the LED controllers 32 of the LED drive board LDB to each LED 17 of the LED substrate 18, and in this manner, driving of each LED 17 is controlled. The light from each LED 17 is guided by the light guide plate 19 such that the liquid crystal panel 11 is irradiated with such light through the optical members 15. Thus, a predetermined image is displayed on the liquid crystal panel 11. Hereinafter, features of the backlight unit 12 will be described in detail.

When each LED 17 is turned on, the blue light (the primary light) emitted from the light emission surface 17a of each LED 17 enters to the light entering surface 20a of the wavelength converter 20, and then, is wavelength-converted into the green light and the red light (the secondary light) by the green phosphor and the red phosphor contained in the phosphor containing portion 29 in the container 30 as illustrated in FIGS. 7 and 8. The substantially white illumination light is obtained from the wavelength-converted green and red light and the blue light from the LEDs 17. The green and red light wavelength-converted by the phosphor containing portion 29 and the blue light not wavelength-converted by the phosphor containing portion 29 are output from the light exiting surface 20b of the wavelength converter 20, and then, are input to the light entering end surface 19b of the light guide plate 19. The light input to the light entering end surface 19b is totally reflected by an interface between the light guide plate 19 and an external air layer, or is reflected by the reflection sheet 25 to propagate in the light guide plate 19 while being scattered and reflected by the light reflector of the light reflection pattern. This prompts output of the light from the light exiting plate surface 19a as light whose incident angle with respect to the light exiting plate surface 19a does not exceed a critical angle. The light output from the light exiting plate surface 19a of the light guide plate 19 receives optical action in the course of transmitting through each optical member 15, and then, the liquid crystal panel 11 is irradiated with such light.

Features of the wavelength converter 20 will be described in detail. As illustrated in FIGS. 7 and 8, when the blue light (the primary light) emitted from the LEDs 17 enters to the light entering surface 20a of the wavelength converter 20, part of the blue light is, by the green phosphor and the red phosphor dispersively mixed in the phosphor containing portion 29 charged into the container 30, utilized as the excitation light to emit the green light and the red light (the secondary light) from the green phosphor and the red phosphor. The wavelength-converted green and red light and the non-converted blue light are output from the light exiting surface 20b of the wavelength converter 20, and then, are input to the light entering end surface 19b of the light guide plate 19. In this state, the sealing member 31 and the bottom portion 30a of the container 30 are each present at the edges of both end portions 20EP of the wavelength converter 20 in the length direction, and therefore, no green and red phosphors are arranged at such spots. With advancement of frame-size reduction of the liquid crystal display device 10 and the backlight unit 12, the sealing member 31 and the bottom portion 30a of the wavelength converter 20 as the portions provided with no green and red phosphors are easily brought into the position relationship in which the sealing member 31 and the bottom portion 30a overlap with the end-side LEDs 17E positioned at the ends of the LED substrate 18 in the direction (the X-axis direction) of arrangement of the LEDs 17. Due to such a position relationship, input of the light from the LEDs 17 to the end portions of the light entering end surface 19b of the light guide plate 19 in the length direction without wavelength conversion of the light by the green and red phosphors has been concerned. Specifically, the dimension of the sealing member 31 of the sealing member disposed end portion 20EP1 in the X-axis direction is greater than that of the bottom portion 30a of the container 30 of the sealing member non-disposed end portion 20EP2. Thus, the position relationship in which the sealing member 31 overlaps with the first end-side LED 17E1 in the X-axis direction is more easily brought. Due to such a relationship, the following situation has been concerned: the blue light from the first end-side LED 17E1 enters to the end portion, which faces the sealing member disposed end portion 20EP1, of the light entering end surface 19b of the light guide plate 19 in the length direction without wavelength conversion by the green and red phosphors, and then, the blue-tinged light exits from part of the light exiting plate surface 19a.

On this point, the amount of light emitted per unit time from each LED 17 is, according to the present embodiment, controlled by the LED controllers 32 as illustrated in FIGS. 9 to 11, and the first end-side LED 17E1 is controlled by the small light emission LED controller 32A such that the amount of light emitted per unit time is relatively less than that of the center LED 17C. Thus, the amount of light supplied from the first end-side LED 17E1 to the sealing member disposed end portion 20EP1 of the wavelength converter 20 is less than the amount of light supplied from the center LED 17C to the center portion 20CP. Consequently, even when the region provided with no phosphors is formed at the edge of the wavelength converter 20 in the length direction and the position relationship in which such a region overlaps with the first end-side LED 17E1 is brought, the amount of light supplied from the first end-side LED 17E1 to the sealing member disposed end portion 20EP1 of the wavelength converter 20 is decreased, and therefore, the amount of light input to the light entering end surface 19b of the light guide plate 19 without wavelength conversion by the phosphors is also decreased. With this configuration, the difference between the color tone of light input to the end portion of the light entering end surface 19b of the light guide plate 19 in the length direction and the color tone of light input to the center portion of the light entering end surface 19b in the length direction is less caused. Even with advancement of frame-size reduction, color unevenness is less caused in the light output from the light exiting plate surface 19a.

Specifically, the multiple center LEDs 17C and the second end-side LED 17E2 as the great light emission LED group 34 are, as illustrated in FIG. 11, subjected to PWM light adjustment driving by the great light emission LED controller 32B such that the light-ON period LP is relatively longer and the light-OFF period NLP is relatively shorter than those of the first end-side LED 17E1 as the small light emission LED 33. Thus, the multiple center LEDs 17C and the second end-side LED 17E2 are controlled such that the amount of light emitted per unit time is relatively decreased. The amount of light emitted per unit time from the great light emission LED group 34 is the reference light emission amount. The blue light emitted from the great light emission LED group 34 is, at the center portion 20CP and the sealing member non-disposed end portion 20EP2 of the wavelength converter 20, partially whitened by wavelength conversion into the green and red light by the green and red phosphors contained in the phosphor containing portion 29. Thereafter, the resultant light enters to the center portion of the light entering end surface 19b of the light guide plate 19 in the length direction and the end portion, which faces the sealing member non-disposed end portion 20EP2, of the light entering end surface 19b of the light guide plate 19 in the length direction. Thus, the light emitted from the portions of the light exiting plate surface 19a of the light guide plate 19 overlapping with the center portion 20CP and the sealing member non-disposed end portion 20EP2 (the great light emission LED group 34) of the wavelength converter 20 in the X-axis direction shows a white color. Note that the sealing member non-disposed end portion 20EP2 has a relatively-narrower region (the thickness dimension of the bottom portion 30a) provided with no phosphors than that of the sealing member disposed end portion 20EP1, and therefore, the position relationship in which such a region overlaps with the second end-side LED 17E2 in the X-axis direction is less brought. At least in the present embodiment, the blue light emitted from the second end-side LED 17E2 is less directly input to the bottom portion 30a, and therefore, color unevenness is less caused.

On the other hand, the first end-side LED 17E1 as the small light emission LED 33 is, as illustrated in FIG. 11, subjected to PWM light adjustment driving by the small light emission LED controller 32A such that the light-ON period LP is relatively shorter and the light-OFF period NLP is relatively longer than those of the multiple center LEDs 17C and the second end-side LED 17E2 as the great light emission LED group 34. Thus, the first end-side LED 17E1 is controlled such that the amount of light emitted per unit time is relatively decreased. Consequently, even in a case where the position relationship in which the small light emission LED 33 overlaps with the sealing member 31 of the sealing member disposed end portion 20EP1 of the wavelength converter 20 in the X-axis direction is brought, the blue light emitted from the small light emission LED 33 is relatively decreased, and therefore, the blue light directly input to the end portion, which faces the sealing member disposed end portion 20EP1, of the light entering end surface 19b of the light guide plate 19 through the sealing member 31 without wavelength conversion is also decreased. With this configuration, the light output from the portion of the light exiting plate surface 19a of the light guide plate 19 overlapping with the sealing member disposed end portion 20EP1 (the small light emission LED 33) of the wavelength converter 20 in the X-axis direction is less blue-tinged, and a color tone difference from the light emitted from other portions (the portions overlapping with the center portion 20CP and the sealing member non-disposed end portion 20EP2 of the wavelength converter 20 in the X-axis direction) is less caused. Thus, the color tone of the light output from the light exiting plate surface 19a is uniformly set across the light exiting plate surface 19a, and occurrence of color unevenness is suitably reduced. More specifically, the small light emission LED controller 32A decreases the time ratio (the duty ratio) of the light-ON period LP within a range of 3% to 7% as compared to the great light emission LED controller 32B. Thus, the above-described color unevenness improvement effect can be sufficiently provided.

As described above, the backlight unit (the lighting device) 12 of the present embodiment includes the multiple LEDs (the light sources) 17 having the multiple end-side LEDs (the end-side light sources) 17E arranged in line at the ends in the direction of arrangement of the LEDs 17, and the center LEDs (the center light sources) 17C arranged at the center in the direction of arrangement; the light guide plate 19 having the light entering end surface 19b which forms at least part of the outer peripheral end surface to extend along the direction of arrangement and to which the light from the multiple LEDs 17 enters, and the light exiting plate surface 19a which is any of both plate surfaces and from which the light exits; the wavelength converter 20 extending along the direction of arrangement, interposed among the multiple LEDs 17 and the light entering end surface 19b, and having the phosphors configured to wavelength-convert the light from the multiple LEDs 17; and the LED controllers (the light source controllers) 32 configured to control the amount of light emitted per unit time from each LED 17 such that the amount of light emitted from at least any one of the end-side LEDs 17E is less than that of the center LED 17C.

With this configuration, the light emitted from the multiple LEDs 17 is wavelength-converted by the phosphors contained in the wavelength converter 20 interposed among the multiple LEDs 17 and the light entering end surface 19b, and then, enters to the light entering end surface 19b of the light guide plate 19 to propagate in the light guide plate 19. Subsequently, the light exits from the light exiting plate surface 19a. The wavelength converter 20 extends along the direction of arrangement of the multiple LEDs 17, but the region provided with no phosphors is formed at the edge of the wavelength converter 20 in the length direction. With advancement of frame-size reduction of the backlight unit 12, the position relationship in which the region of the wavelength converter 20 provided with no phosphors overlaps with the end-side LED 17E is easily brought. Due to such a relationship, input of the light from the end-side LEDs 17E to the end portions of the light entering end surface 19b of the light guide plate 19 in the length direction without wavelength conversion of the light by the phosphors has been concerned. In response, the amount of light emitted per unit time from each LED 17 is controlled by the LED controllers 32, and at least any one of the end-side LEDs 17E is controlled by the LED controllers 32 such that the amount of light emitted per unit time is relatively less than that of the center LED 17C. Thus, the amount of light supplied from the end-side LED 17E to the end portion of the wavelength converter 20 in the length direction is less than the amount of light supplied from the center LED 17C to the center portion in the length direction. Consequently, even when the region provided with no phosphors is formed at the edge of the wavelength converter 20 in the length direction and the position relationship in which such a region overlaps with the end-side LED 17E is brought, the amount of light supplied from the end-side LED 17E to the end portion of the wavelength converter 20 in the length direction is decreased, and therefore, the amount of light input to the light entering end surface 19b of the light guide plate 19 without wavelength conversion by the phosphors is also decreased. With this configuration, the difference between the color tone of light input to the end portion of the light entering end surface 19b of the light guide plate 19 in the length direction and the color tone of light input to the center portion of the light entering end surface 19b in the length direction is less caused. Even with advancement of frame-size reduction, color unevenness is less caused in the light output from the light exiting plate surface 19a.

Moreover, the wavelength converter 20 is configured such that one of both end portions 20EP in the length direction of the wavelength converter 20 is formed as the sealing member disposed end portion 20EP1 provided with the sealing member 31 and the other end portion 20EP is formed as the sealing member non-disposed end portion 20EP2 not provided with the sealing member 31. The LED controllers 32 control such that the amount of light emitted from the first end-side LED 17E1 as the end-side LED 17E facing the sealing member disposed end portion 20EP1 of the wavelength converter 20 is less than the amount of light emitted from the second end-side LED 17E2 as the end-side LED 17E facing the sealing member non-disposed end portion 20EP2 of the wavelength converter 20. As described above, one of both end portions 20EP of the wavelength converter 20 in the length direction is formed as the sealing member disposed end portion 20EP1 provided with the sealing member 31, and therefore, the area provided with no phosphors tends to be larger than the sealing member non-disposed end portion 20EP2 not provided with the sealing member 31. On this point, the LED controllers 32 control such that the amount of light emitted from the first end-side LED 17E1 facing the sealing member disposed end portion 20EP1 of the wavelength converter 20 is less than the amount of light emitted from the second end-side LED 17E2 facing the sealing member non-disposed end portion 20EP2 of the wavelength converter 20. Thus, a color tone difference among the light reaching the light entering end surface 19b through the sealing member disposed end portion 20EP1, the light reaching the light entering end surface 19b through the center portion, and the light reaching the light entering end surface 19b through the sealing member non-disposed end portion 20EP2 is less caused. Consequently, occurrence of color unevenness is more suitably reduced.

In addition, the LED controllers 32 control such that the amount of light emitted from the second end-side LED 17E2 as the end-side LED 17E facing the sealing member non-disposed end portion 20EP2 of the wavelength converter 20 is equal to the amount of light emitted from the center LED 17C. With this configuration, the amount of light emitted from the multiple LEDs 17C, 17E2 is easily controlled, and the configuration of the member such as the line for electrically connecting the LEDs 17 and the LED controllers 32 is simplified.

Moreover, the LED controllers 32 supply the pulse signals to the multiple LEDs 17, and adjust the time ratio between the light-ON period LP and the light-OFF period NLP at each LED 17 to control the amount of light emitted per unit time. With this configuration, a sufficiently-wide dynamic range of the amount of light emitted per unit time from each LED 17 is provided.

Further, the LEDs 17 emit the blue light, and the wavelength converter 20 has, as the phosphors, the green phosphor configured to wavelength-convert the blue light into the green light and the red phosphor configured to wavelength-convert the blue light into the red light. With this configuration, the blue light emitted from the LEDs 17 is wavelength-converted into the green light and the red light by the green phosphor and the red phosphor contained in the wavelength converter 20. In this state, even when the region provided with no phosphors is formed at the edge of the wavelength converter 20 in the length direction and the position relationship in which such a region overlaps with the end-side LED 17E is brought, the amount of blue light supplied from the end-side LED 17E to the end portion 20EP of the wavelength converter 20 in the length direction is decreased, and therefore, the light input to the light entering end surface 19b of the light guide plate 19 without wavelength conversion by the phosphors is less blue-tinged. Thus, occurrence of color unevenness is suitably reduced.

Further, the wavelength converter 20 contains the quantum dot phosphors as the phosphors. With this configuration, the efficiency of wavelength conversion of the light by the wavelength converter 20 is enhanced, and the color purity of the wavelength-converted light is enhanced.

The liquid crystal display device 10 according to the present embodiment includes the above-described backlight unit 12 and the liquid crystal panel (the display panel) 11 configured to utilize the light emitted from the backlight unit 12 to display an image. According to the liquid crystal display device 10 with such a configuration, color unevenness is less caused in the light from the backlight unit 12, and therefore, displaying can be realized with excellent display quality.

The television device 10TV according to the present embodiment includes the above-described liquid crystal display device 10. According to such a television device 10TV, the liquid crystal display device 10 exhibits excellent display quality, and therefore, displaying of a television image can be realized with excellent display quality.

Second Embodiment

A second embodiment of the present invention will be described with reference to FIGS. 12 to 14. In the second embodiment, the amount of light emitted per unit time from a second end-side LED 117E2 is changed. Note that overlapping description of structures, features, and advantageous effects similar to those of the above-described first embodiment will not be made.

Figure 12:
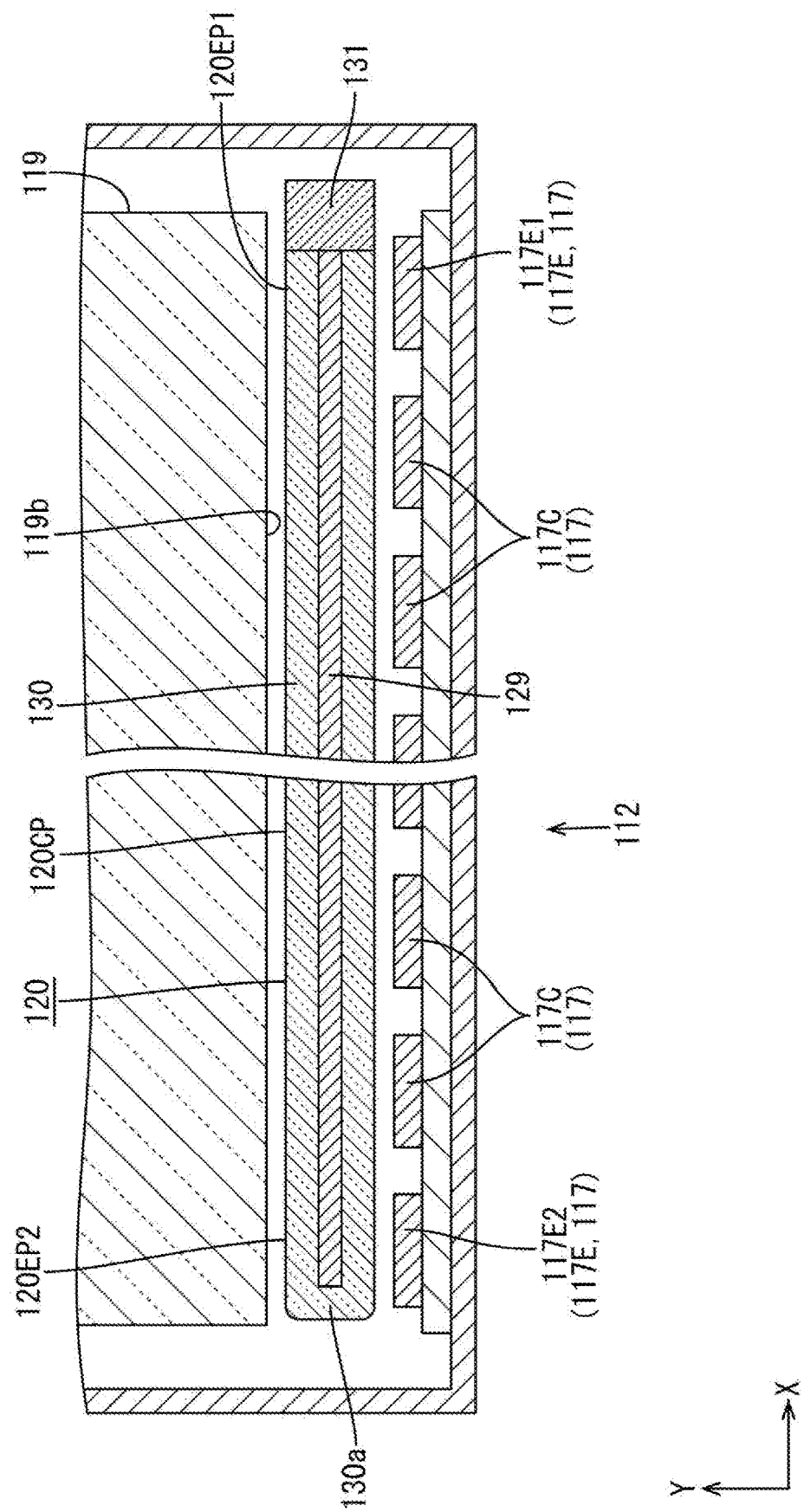
FIG. 12 is an enlarged horizontal sectional view of a backlight unit according to a second embodiment of the present invention.

As illustrated in FIG. 12, the second end-side LED 117E2 according to the present embodiment is arranged such that part of the second end-side LED 117E2 overlaps, in the X-axis direction, with a bottom portion 130a of a container 130 as a region, which is not provided with a phosphor containing portion 129, of a sealing member non-disposed end portion 120EP2 of a wavelength converter 120. Such an arrangement configuration can be employed in a case where frame-size reduction of a backlight unit 112 more advances than that described in the above-described first embodiment. In such an arrangement configuration, LED controllers 132 include, as illustrated in FIG. 13, a first small light emission LED controller (a first small light emission light source controller) 132A1 connected to a first end-side LED 117E1 to control driving such that the amount of light emitted per unit time from the first end-side LED 117E1 is decreased to the minimum, a second small light emission LED controller (a second small light emission light source controller) 132A2 connected to the second end-side LED 117E2 to control driving such that the amount of light emitted per unit time from the second end-side LED 117E2 is decreased to the second minimum, and a great light emission LED controller 132B connected to multiple center LEDs 117C to control driving such that the amount of light emitted per unit time from the multiple center LEDs 117C is increased to the maximum. That is, the LED controllers 132 include two small light emission LED controllers 132A1, 132A2, and the amount of light emitted per unit time is different between the two end-side LEDs 117E1, 117E2 controlled by the small light emission LED controllers 132A1, 132A2.

The amount, which is controlled by the great light emission LED controller 132B, of light emitted per unit time from the multiple center LEDs 117C is the reference light emission amount of the LED 117 at the backlight unit 112. On the other hand, the amount, which is controlled by the first small light emission LED controller 132A1 and the second small light emission LED controller 132A2, of light emitted per unit time from the first end-side LED 117E1 and the second end-side LED 117E2 is less than the above-described reference light emission amount as shown in FIG. 14. In addition, the amount, which is controlled by the first small light emission LED controller 132A1, of light emitted per unit time from the first end-side LED 117E1 is less than the amount, which is controlled by the second small light emission LED controller 132A2, of light emitted per unit time from the second end-side LED 117E2. Thus, the amount of light input to the wavelength converter 120 per unit time is increased in the order of a sealing member disposed end portion 120EP1 facing the first end-side LED 117E1, the sealing member non-disposed end portion 120EP2 facing the second end-side LED 117E2, and a center portion 120CP facing the multiple center LEDs 117C. The first end-side LED 117E1 connected to the first small light emission LED controller 132A is formed as a first small light emission LED (a first small light emission light source) 133A, the second end-side LED 117E2 connected to the second small light emission LED controller 132A2 is formed as a second small light emission LED (a second small light emission light source) 133B, and the multiple center LEDs 117C connected to the great light emission LED controller 132B are formed as a great light emission LED group 134.

Of the wavelength converter 120, the sealing member disposed end portion 120EP1 facing the first end-side LED 117E1 has, as illustrated in FIG. 12, a sealing member 131 as the region not provided with the phosphor containing portion 129, whereas the sealing member non-disposed end portion 120EP2 has the bottom portion 130a of the container 130 as the region not provided with the phosphor containing portion 129. An area occupied by these portions in the X-axis direction is relatively larger in the sealing member 131 (the sealing member disposed end portion 120EP1) than in the bottom portion 130a (the sealing member non-disposed end portion 120EP2). Thus, it can be said that the amount of light emitted per unit time from the first end-side LED 117E1 and the second end-side LED 117E2 is set to be in an inverse correlation with the X-axis-direction size of each region, which are not provided with the phosphor containing portion 129, of the sealing member disposed end portion 120EP1 and the sealing member non-disposed end portion 120EP2 of the wavelength converter 120 facing the first end-side LED 117E1 and the second end-side LED 117E2.

More specifically, in a case where a position relationship in which the region not provided with the phosphor containing portion 129 at each edge of the sealing member disposed end portion 120EP1 and the sealing member non-disposed end portion 120EP2 overlaps, in the X-axis direction, with a corresponding one of the first end-side LED 117E1 and the second end-side LED 117E2 is brought, such an overlapping area tends, as illustrated in FIG. 12, to be larger in the overlapping area between the first end-side LED 117E1 and the sealing member disposed end portion 120EP1 than in the overlapping area between the second end-side LED 117E2 and the sealing member non-disposed end portion 120EP2. On the other hand, the first end-side LED 117E1 is controlled by the first small light emission LED controller 132A1 such that the amount of light emitted per unit time is less than those of the center LEDs 117C and the second end-side LED 117E2. Thus, even when the area overlapping with the sealing member disposed end portion 120EP1 in the X-axis direction is relatively large, the amount of blue light having transmitted through the sealing member disposed end portion 120EP1 without wavelength conversion is sufficiently decreased. Moreover, the second end-side LED 117E2 has a greater amount of light emitted per unit time than that of the first end-side LED 117E1, but is controlled by the second small light emission LED controller 132A2 such that the amount of light emitted per unit time is less than that of the center LED 117C. Thus, the second end-side LED 117E2 is configured properly by narrowing of the area overlapping with the sealing member non-disposed end portion 120EP2 in the X-axis direction. Thus, the amount of blue light having transmitted through the sealing member disposed end portion 120EP1 without wavelength conversion is sufficiently decreased, and becomes equal to that of the sealing member disposed end portion 120EP1. With the above-described configuration, a color tone difference among the light reaching a light entering end surface 119b of a light guide plate 119 through the sealing member disposed end portion 120EP1 of the wavelength converter 120, the light reaching the light entering end surface 119*b* through the center portion 120CP, and the light reaching the light entering end surface 119*b* through the sealing member non-disposed end portion 120EP2 is less caused, and therefore, occurrence of color unevenness is more suitably reduced.

Figure 13:
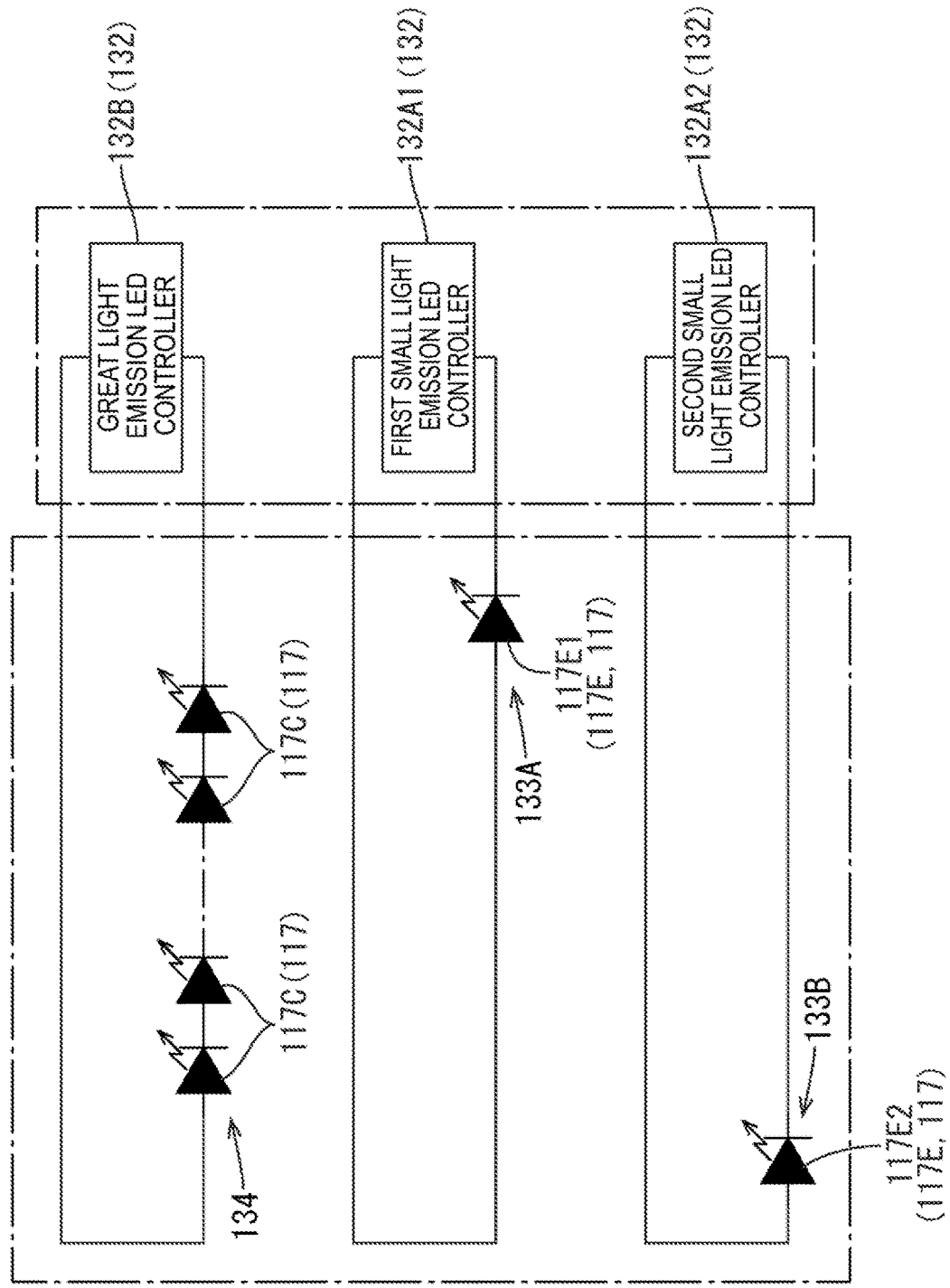
FIG. 13 is a circuit diagram of a circuit configuration for driving each LED.
Figure 14:
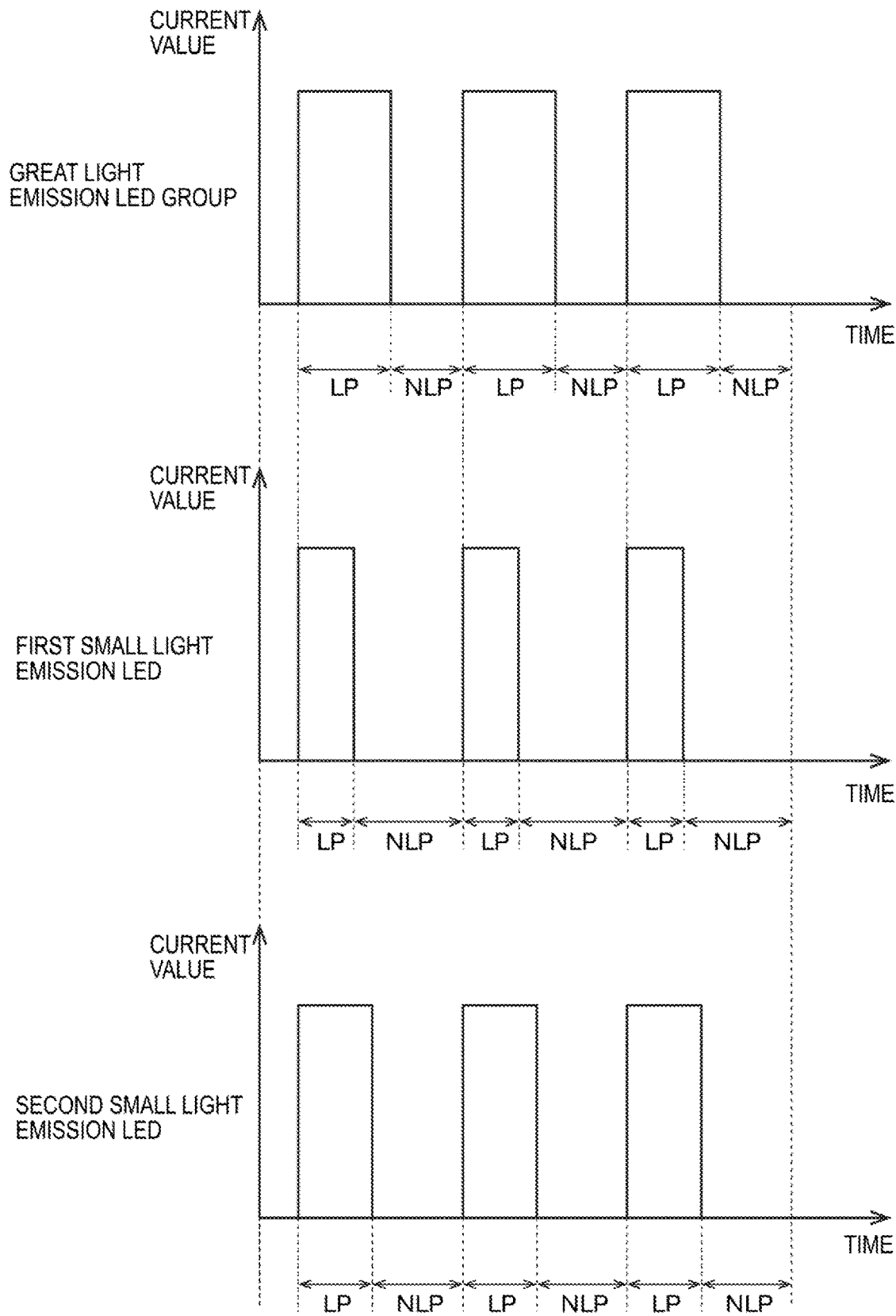
FIG. 14 is a graph of a light-ON period and a light-OFF period of each LED.

Note that regarding specific driving of each LED 117, the first small light emission LED controller 132A1 supplies, as illustrated in FIGS. 13 and 14, a pulse signal to the first small light emission LED 133A (the first end-side LED 117E1) to perform light adjustment driving of the first small light emission LED 133A such that a light-ON period LP of the first small light emission LED 133A is shortest and a light-OFF period NLP of the first small light emission LED 133A is longest as compared to those of other LEDs 133B, 134. The second small light emission LED controller 132A2 supplies a pulse signal to the second small light emission LED 133B (the second end-side LED 117E2) to perform light adjustment driving of the second small light emission LED 133B such that a light-ON period LP of the second small light emission LED 133B is relatively longer and a light-OFF period NLP of the second small light emission LED 133B is relatively shorter than those of the first small light emission LED 133A and that the light-ON period LP of the second small light emission LED 133B is relatively shorter and the light-OFF period NLP of the second small light emission LED 133B is relatively longer than those of the great light emission LED group 134 (the multiple center LEDs 117C) controlled by the great light emission LED controller 132B. The great light emission LED controller 132B supplies a pulse signal to the great light emission LED group 134 (the multiple center LEDs 117C) to perform light adjustment driving of the great light emission LED group 134 such that a light-ON period LP of the great light emission LED group 134 is longest and a light-OFF period NLP of the great light emission LED group 134 is shortest as compared to those of the first small light emission LED 133A and the second small light emission LED 133B.

As described above, according to the present embodiment, the LED controllers 132 control such that the amount of light emitted from the second end-side LED 117E2 as an end-side LED 117E facing the sealing member non-disposed end portion 120EP2 of the wavelength converter 120 is less than that of the center LED 117C. With this configuration, even when the region provided with no phosphors is formed at the edge of the sealing member non-disposed end portion 120EP2 of the wavelength converter 120, and the position relationship in which such a region overlaps with the second end-side LED 117E2 is brought, the amount of light supplied from the second end-side LED 117E2 facing the sealing member non-disposed end portion 120EP2 is decreased, and therefore, the amount of light input to the light entering end surface 119*b* of the light guide plate 119 without wavelength conversion by the phosphors is also decreased. Thus, occurrence of color unevenness is more suitably reduced.

Third Embodiment

A third embodiment of the present invention will be described with reference to FIG. 15 or 16. In the third embodiment, the number of installed wavelength converters 220 is changed from that of the above-described first embodiment. Note that overlapping description of structures, features, and advantageous effects similar to those of the above-described first embodiment will not be made.

Figure 15:
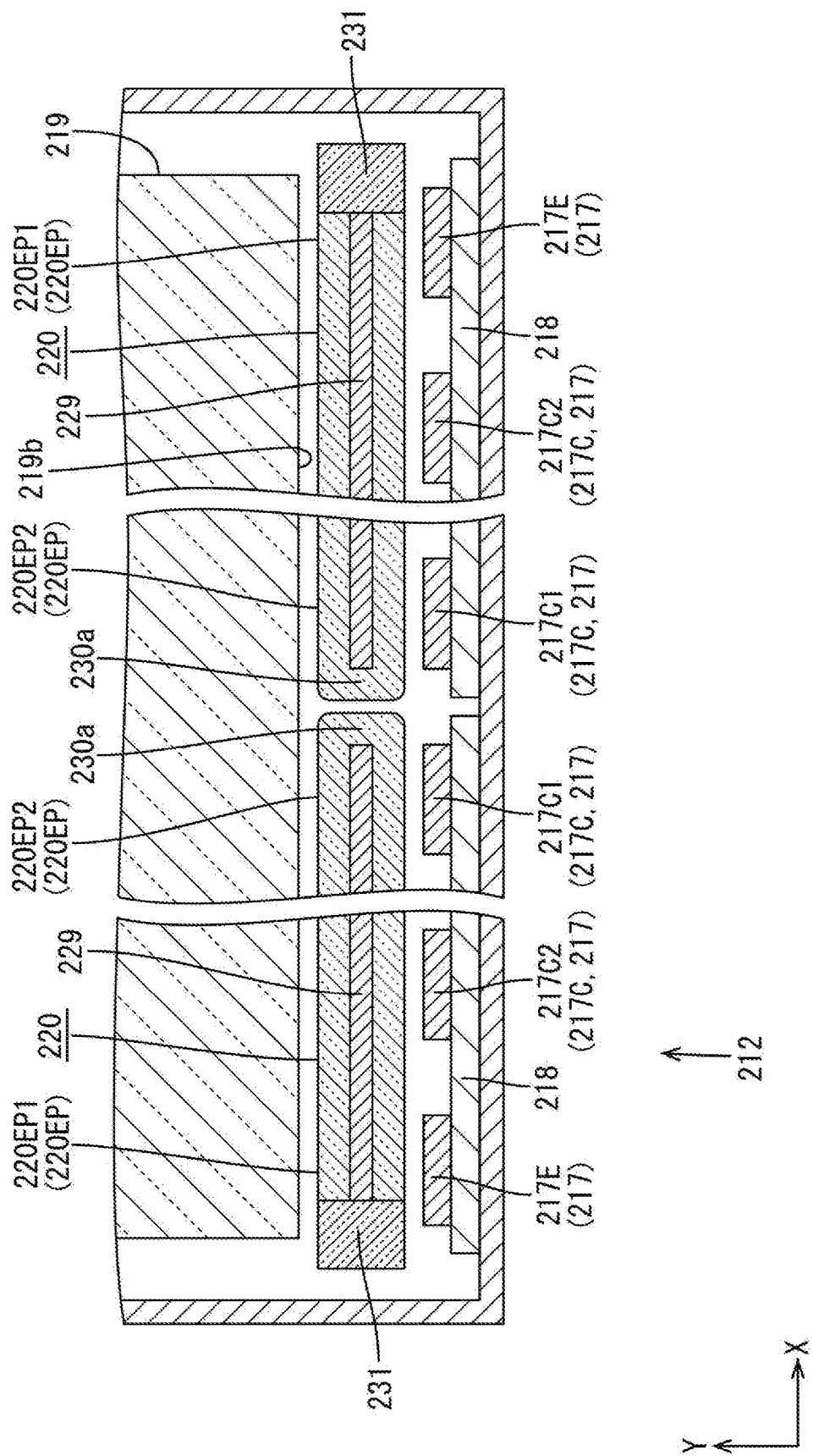
FIG. 15 is an enlarged horizontal sectional view of a backlight unit according to a third embodiment of the present invention.

As illustrated in FIG. 15, two wavelength converters 220 are, according to the present embodiment, arranged adjacent to each other along the length direction (the X-axis direction) of a light entering end surface 219*b* of a light guide plate 219. The two wavelength converters 220 are arranged linearly along the X-axis direction at a space among LEDs 217 and the light guide plate 219 such that the axes thereof are substantially coincident with each other. Such use of the two wavelength converters 220 as described above is suitable for a larger backlight unit 212. Both non-adjacent end portions 220EP of the two wavelength converters 220 are formed as sealing member disposed end portions 220EP1, and are each arranged on both outer sides (both ends) of the backlight unit 212 in the X-axis direction (the length direction of the light entering end surface 219*b*). On the other hand, both adjacent end portions 220EP of the two wavelength converters 220 are formed as sealing member non-disposed end portions 220EP2, and are arranged at the center of the backlight unit 212 in the X-axis direction. Moreover, as in the wavelength converters 220, two LED substrates 218 are arranged adjacent to each other along the length direction of the light entering end surface 219*b*. The length dimension of each LED substrate 218 is the substantially same as that of each wavelength converter 220, and each LED substrate 218 is separately arranged to face a corresponding one of the wavelength converters 220. Thus, light emitted from the multiple LEDs 217 mounted on each LED substrate 218 enters to the wavelength converter 220 facing such a LED substrate 218.

Figure 16:
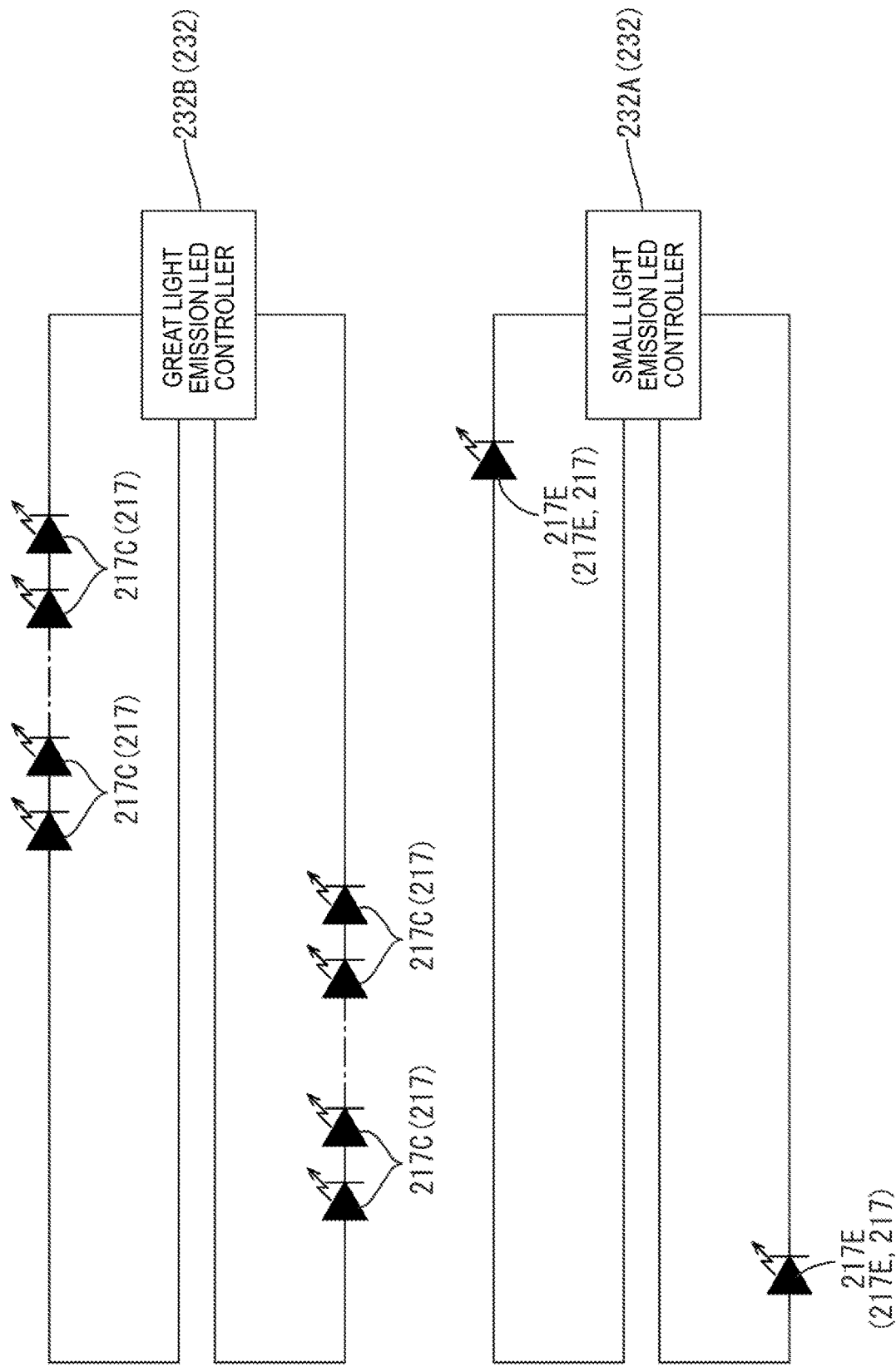
FIG. 16 is a circuit diagram of a circuit configuration for driving each LED.

As illustrated in FIG. 16, a small light emission LED controller 232A of LED controllers 232 controls such that the amount of light emitted per unit time from a pair of end-side LEDs 217E facing the pair of sealing member disposed end portions 220EP1 as the pair of non-adjacent end portions 220EP of the two wavelength converters 220 is less than that of a center LED 217C. Moreover, both end-side LEDs 217E partially overlap, in the X-axis direction, with sealing members 231 at the sealing member disposed end portions 220EP1 of the two wavelength converters 220, and such an overlapping area is equal between the end-side LEDs 217E. Thus, the small light emission LED controller 232A controls such that the amount of light emitted per unit time is equal between both end-side LEDs 217E. According to such a configuration, even when a position relationship in which the sealing member 231 of the wavelength converter 220 as the region not provided with a phosphor containing portion 229 overlaps with the end-side LED 217E on each end side of the light entering end surface 219*b* of the light guide plate 219 in the length direction is brought due to frame-size reduction of the backlight unit 212, the amount of blue light input to the light entering end surface 219*b* of the light guide plate 219 without wavelength conversion by phosphors is decreased. Thus, color unevenness is less caused even with frame-size reduction. Note that a relationship of a light-ON period and a light-OFF period of the LEDs 217C, 217E controlled by the small light emission LED controller 232A and a great light emission LED controller 232B is similar to that of FIG. 11 of the above-described first embodiment, and therefore, is not shown in the figure in the present embodiment.

As in the above-described first embodiment, the LED controllers 232 control such that the amount of light emitted per unit time is equal among the multiple center LEDs 217C and the amount of light emitted per unit time from the center LED 217C is greater than that of the end-side LED 217E. The multiple center LEDs 217C according to the present embodiment include two first center LEDs 217C1 facing the sealing member non-disposed end portions 220EP2 as the pair of adjacent end portions 220EP of the two wavelength converters 220, and two or more second center LEDs 217C2 facing the center portions 220CP of the two wavelength converters 220. Note that in a case where the center LEDs 217C are distinguished from each other, an index "1" is assigned to the reference numeral of the first center LED, and an index "2" is assigned to the reference numeral of the second center LED. In a case where the center LEDs 217C are collectively referred without distinction, no index is assigned to the reference numeral. Thus, the LED controllers 232 control such that the amount of light emitted per unit time from the first center LED 217C1 facing the sealing member non-disposed end portion 220EP2 as each of the adjacent end portions 220EP of the two wavelength converters 220 is equal to that of the second center LED 217C2. With this configuration, control of the light emission amount for the multiple center LEDs 217C is facilitated, and therefore, the configuration of a member such as a line for electrically connecting the LEDs 217 and the LED controllers 232 is simplified. Moreover, in the present embodiment, each first center LED 217C1 is arranged not to overlap, in the X-axis direction, with a bottom portion 230a of a container 230 provided at a corresponding one of the sealing member non-disposed end portions 220EP2 of the two wavelength converters 220. Thus, even when the amount of light emitted per unit time from the first center LED 217C1 is equal to that of the second center LED 217C2, the blue light is less transmitted through each bottom portion 230a of the two wavelength converters 220, and therefore, occurrence of color unevenness is less caused.

As described above, according to the present embodiment, the multiple wavelength converters 220 are arranged in line along the direction of arrangement, and the LED controllers 232 control such that the amount of light emitted from the multiple end-side LEDs 217E each facing both sealing member disposed end portions 220EP1 as the pair of non-adjacent end portions 220EP of the multiple wavelength converters 220 is less than that of the center LEDs 217C. With advancement of frame-size reduction of the backlight unit 212, the position relationship in which the region of the wavelength converter 220 provided with no phosphors overlaps with the end-side LED 217E on each end side of the light entering end surface 219b of the light guide plate 219 in the length direction is easily brought. On this point, the LED controllers 232 control such that the amount of light emitted from the multiple end-side LEDs 217E each facing both sealing member disposed end portions 220EP1 as the pair of non-adjacent end portions 220EP of the multiple wavelength converters 220 is less than that of the center LEDs 217C. Thus, even in the position relationship in which the region of the wavelength converter 220 provided with no phosphors overlaps with the end-side LED 217E on each end side of the light entering end surface 219b of the light guide plate 219 in the length direction, the amount of light input to the light entering end surface 219b of the light guide plate 219 without wavelength conversion by the phosphors is decreased. Thus, color unevenness is less caused even with advancement of frame-size reduction.

The multiple center LEDs 217C are arranged along the direction of arrangement, and the LED controllers 232 control such that the amount of light emitted from the center LEDs 217C each facing both adjacent end portions 220EP of the multiple wavelength converters 220 is equal to that of other center LEDs 217C. With this configuration, control of the light emission amount for the multiple center LEDs 217C is facilitated, and therefore, the configuration of the member such as the line for electrically connecting the LEDs 217 and the LED controllers 232 is simplified.

Fourth Embodiment

A fourth embodiment of the present invention will be described with reference to FIGS. 17 and 18. In the fourth embodiment, the amount of light emitted per unit time from a first center LED 317C1 is changed from that of the above-described third embodiment. Note that overlapping description of structures, features, and advantageous effects similar to those of the above-described third embodiment will not be made.

Figure 17:
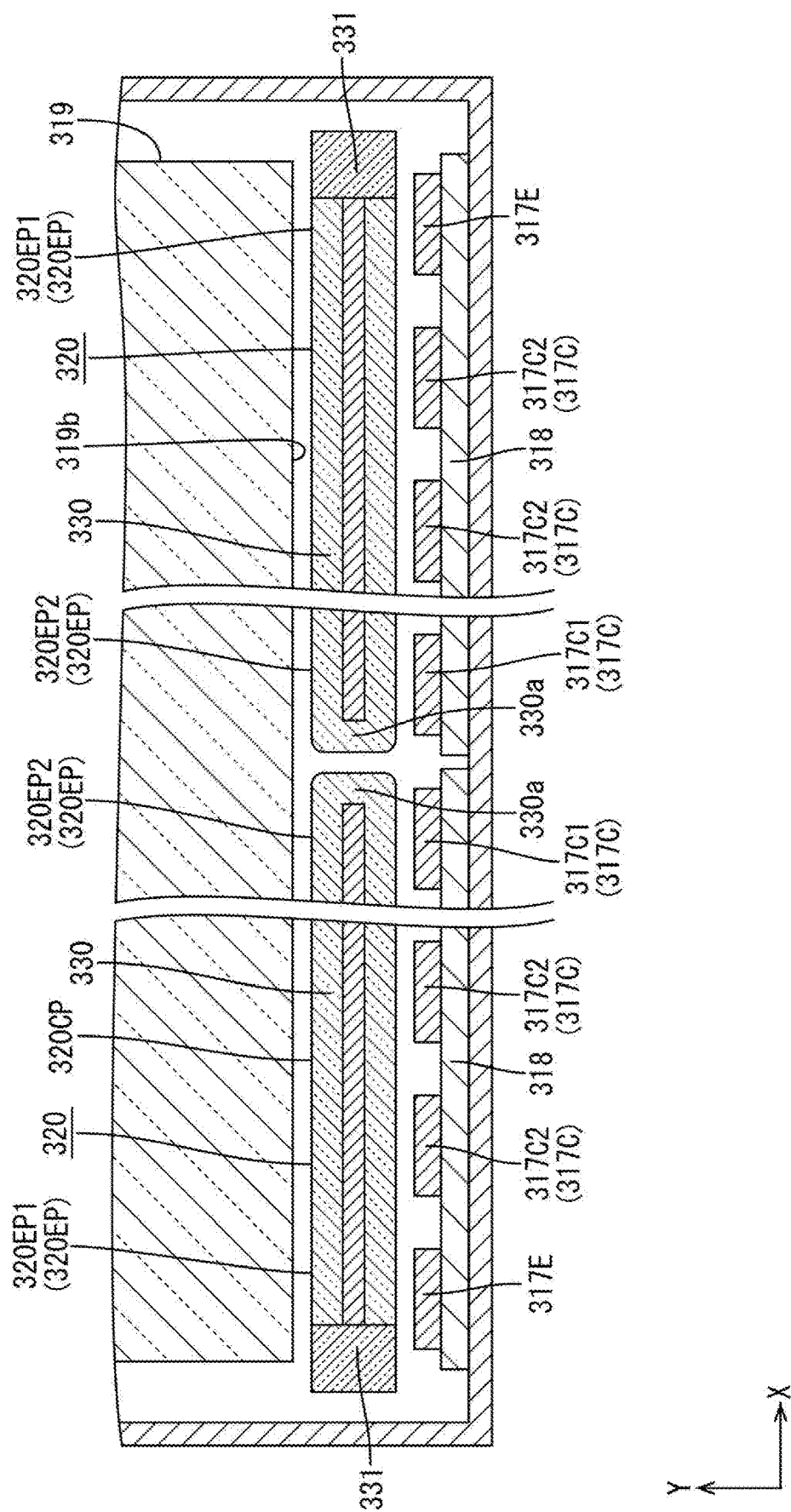
FIG. 17 is an enlarged horizontal sectional view of a backlight unit according to a fourth embodiment of the present invention.

As illustrated in FIG. 17, center LEDs 317C according to the present embodiment include a pair of first center LEDs 317C1 each facing sealing member non-disposed end portions 320EP2 as a pair of adjacent end portions 320EP of two wavelength converters 320, and multiple second center LEDs 317C2 each facing center portions 320CP of the two wavelength converters 320. Both first center LEDs 317C1 are arranged to overlap, in the X-axis direction, with bottom portions 330a of containers 330 as regions, which are not provided with a phosphor containing portion 329, of the sealing member non-disposed end portions 320EP2 of the two wavelength converters 320. An integrated value of the area where both first center LEDs 317C1 each overlap, in the X-axis direction, with the bottom portions 330a of the containers 330 of the sealing member non-disposed end portions 320EP2 of the two wavelength converters 320 is greater than that of the area where each end-side LED 317E overlaps, in the X-axis direction, with a corresponding one of sealing members 331 of sealing member disposed end portions 320EP1 of the wavelength converters 320. Both first center LEDs 317C1 are each arranged at adjacent end portions of two LED substrates 318.

Figure 18:
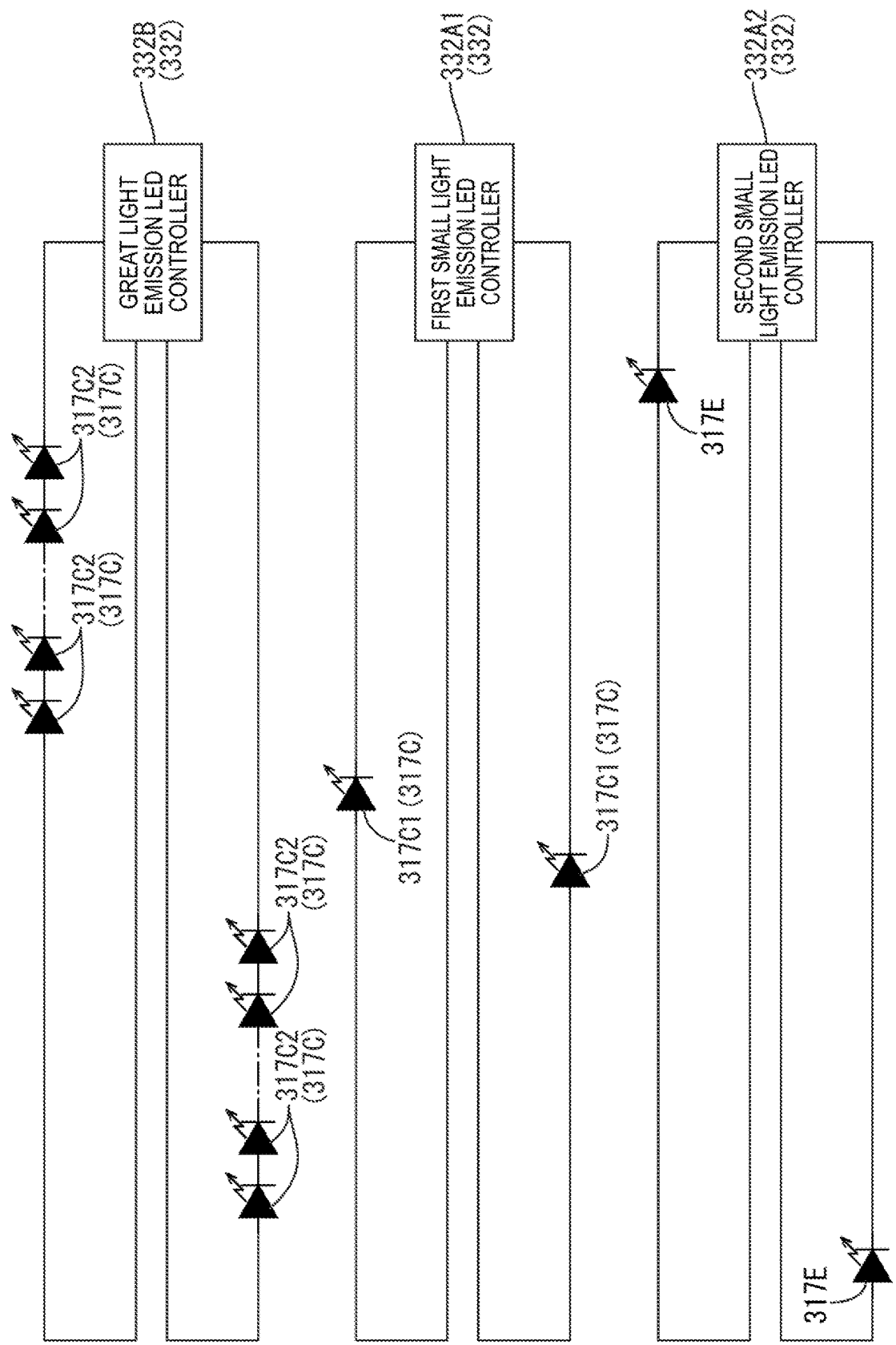
FIG. 18 is a circuit diagram of a circuit configuration for driving each LED.

In such an arrangement configuration, LED controllers 332 include, as illustrated in FIG. 18, a first small light emission LED controller 332A1 connected to the pair of first center LEDs 317C1 to control driving such that the amount of light emitted per unit time from the first center LEDs 317C1 is decreased to the minimum, a second small light emission LED controller (a second small light emission light source controller) 332A2 connected to a pair of end-side LEDs 317E to control driving such that the amount of light emitted per unit time from the end-side LEDs 317E is decreased to the second minimum, and a great light emission LED controller 332B connected to the multiple second center LEDs 317C2 to control driving such that the amount of light emitted per unit time from the multiple second center LEDs 317C2 is increased to the maximum. That is, the LED controllers 332 include two small light emission LED controllers 332A1, 332A2, and the amount of light emitted per unit time is different between the pair of end-side LEDs 317E and the pair of first center LEDs 317C1 controlled by the small light emission LED controllers 332A1, 332A2, respectively. A magnitude relationship of the light emission amount is set to be in an inverse correlation with the size of the X-axis-direction overlapping area of each LED 317C1, 317E with the region, which is not provided with the phosphor containing portion 329, of a corresponding one of the two wavelength converters 320. With this configuration, a color tone difference among the light reaching a light entering end surface 319b of a light guide plate 319 through each sealing member disposed end portion 320EP1 of the two wavelength converters 320, the light reaching the light entering end surface 319b through the center portion 320CP, and the light reaching the light entering end surface 319b through each sealing member non-disposed end portion 320EP2 is less caused, and therefore, occurrence of color unevenness is more suitably reduced. Note that a relationship of a light-ON period and a light-OFF period of the LEDs 317C1, 317C2, 317E controlled by the small light emission LED controllers 332A1, 332A2 and the great light emission LED controller 332B is similar to that of FIG. 14 of the above-described second embodiment, and therefore, is not shown in the figure in the present embodiment.

As described above, according to the present embodiment, the multiple center LEDs 317C are arranged along the direction of arrangement, and the LED controllers 332 control such that the amount of light emitted from the first center LED 317C1 as the center LED 317C facing a corresponding one of both sealing member non-disposed end portions 320EP2 as the pair of adjacent end portions 320EP of the multiple wavelength converters 320 is less than that of the second center LED 317C2 as another center LED 317C. When the region provided with no phosphors is formed at each edge of the wavelength converter 320 in the length direction thereof, a position relationship in which the edges of both adjacent sealing member non-disposed end portions 320EP2 of the multiple wavelength converters 320 are adjacent to each other is brought, and therefore, the region provided with no phosphors is expanded. Thus, the position relationship in which such a region and the first center LED 317C1 overlap with each other is easily brought. Due to such a relationship, input of the light from the first center LED 317C1 to a center portion of the light entering end surface 319b of the light guide plate 319 in the length direction without wavelength conversion by the phosphors has been concerned. Even in such a case, the LED controllers 332 control such that the amount of light emitted from the first center LEDs 317C1 each facing both the adjacent sealing member non-disposed end portions 320EP2 of the multiple wavelength converters 320 is less than that of the second center LEDs 317C2. Thus, the amount of light supplied from the first center LEDs 317C1 each facing both adjacent sealing member non-disposed end portions 320EP2 to these sealing member non-disposed end portions 320EP2 is less than the amount of light supplied from the second center LEDs 317C2 to the center portion. Thus, even in the position relationship in which the edges of both adjacent sealing member non-disposed end portions 320EP2 of the multiple wavelength converters 320 are adjacent to each other and each overlap with the first center LEDs 317C1, the amount of light supplied from the first center LEDs 317C1 to both adjacent sealing member non-disposed end portions 320EP2 is decreased, and therefore, the amount of light input to the light entering end surface 319b of the light guide plate 319 without wavelength conversion by the phosphors is also decreased. With this configuration, occurrence of color unevenness can be more suitably reduced.

Fifth Embodiment

A fifth embodiment of the present invention will be described with reference to FIG. 19. In the fifth embodiment, the method for adjusting LED light by an LED controller is changed from that of the above-described first embodiment. Note that overlapping description of structures, features, and advantageous effects similar to those of the above-described first embodiment will not be made.

Figure 19:
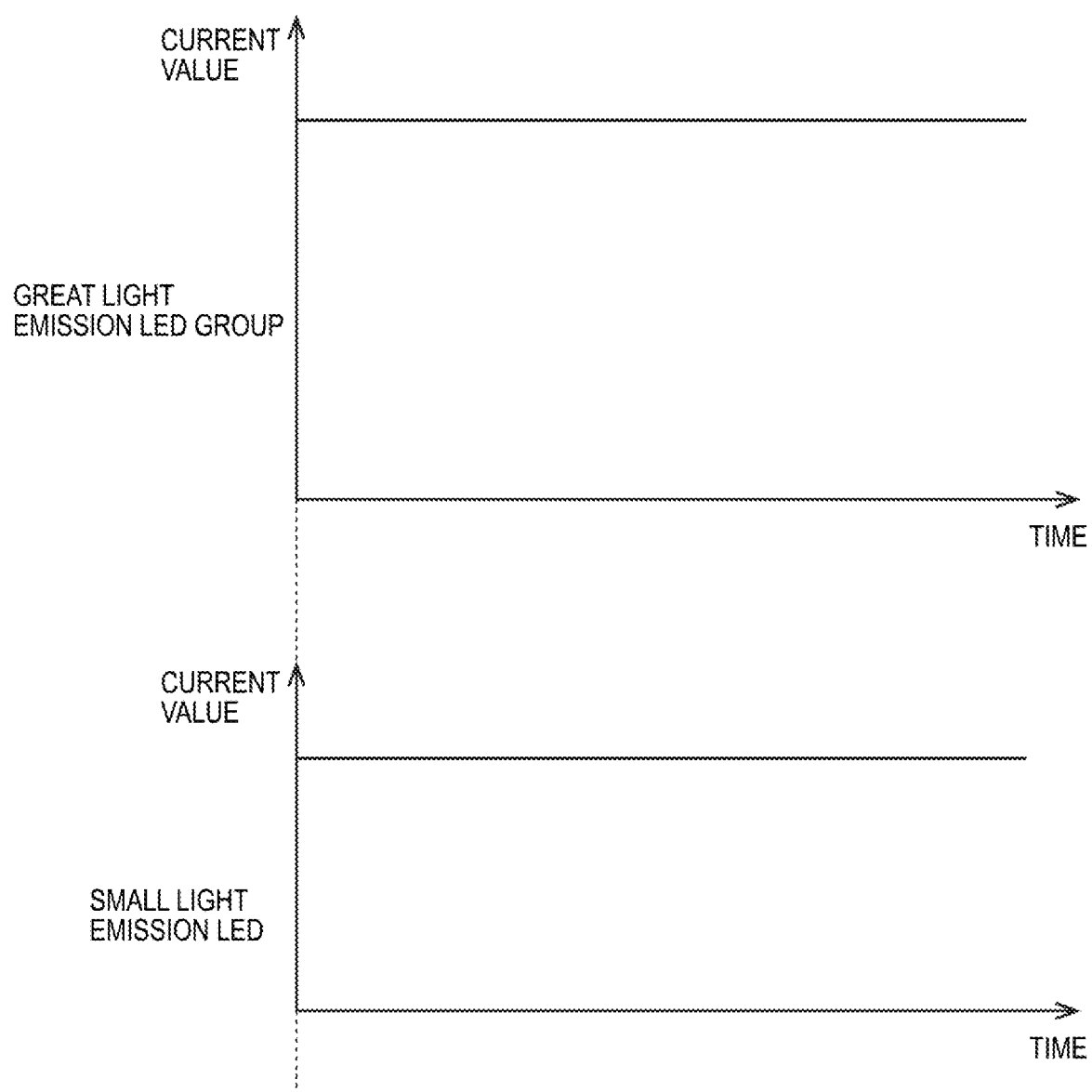
FIG. 19 is a graph of a light-ON period and a light-OFF period of each LED according to a fifth embodiment of the present invention.

As shown in FIG. 19, the LED controller according to the present embodiment is configured to drive multiple LEDs with constant current and to differentiate the value of current supplied to each LED to control the amount of light emitted per unit time. Specifically, a great light emission LED controller forming the LED controller is configured to drive a great light emission LED group such that the value of constant current supplied to the great light emission LED group is relatively increased, thereby controlling such that the amount of light emitted per unit time from the great light emission LED group is relatively increased. On the other hand, a small light emission LED controller forming the LED controller is configured to drive a small light emission LED such that the value of constant current supplied to the small light emission LED is relatively decreased, thereby controlling such that the amount of light emitted per unit time from the small light emission LED is relatively decreased. According to such a configuration, a cost can be easily reduced upon control of the amount of light emitted per unit time from each LED. Moreover, noise is less caused upon the above-described light emission amount control.

As described above, according to the present invention, the LED controller drives the multiple LEDs with the constant current, and differentiates the value of current supplied to each LED to control the amount of light emitted per unit time. With this configuration, the cost can be easily reduced upon control of the amount of light emitted per unit time from each LED. Moreover, noise is less caused upon the above-described light emission amount control.

Sixth Embodiment

A sixth embodiment of the present invention will be described with reference to FIGS. 20 to 22. In the sixth embodiment, the structure for holding a wavelength converter 520 is added to the above-described first embodiment. Note that overlapping description of structures, features, and advantageous effects similar to those of the above-described first embodiment will not be made.

Figure 20:
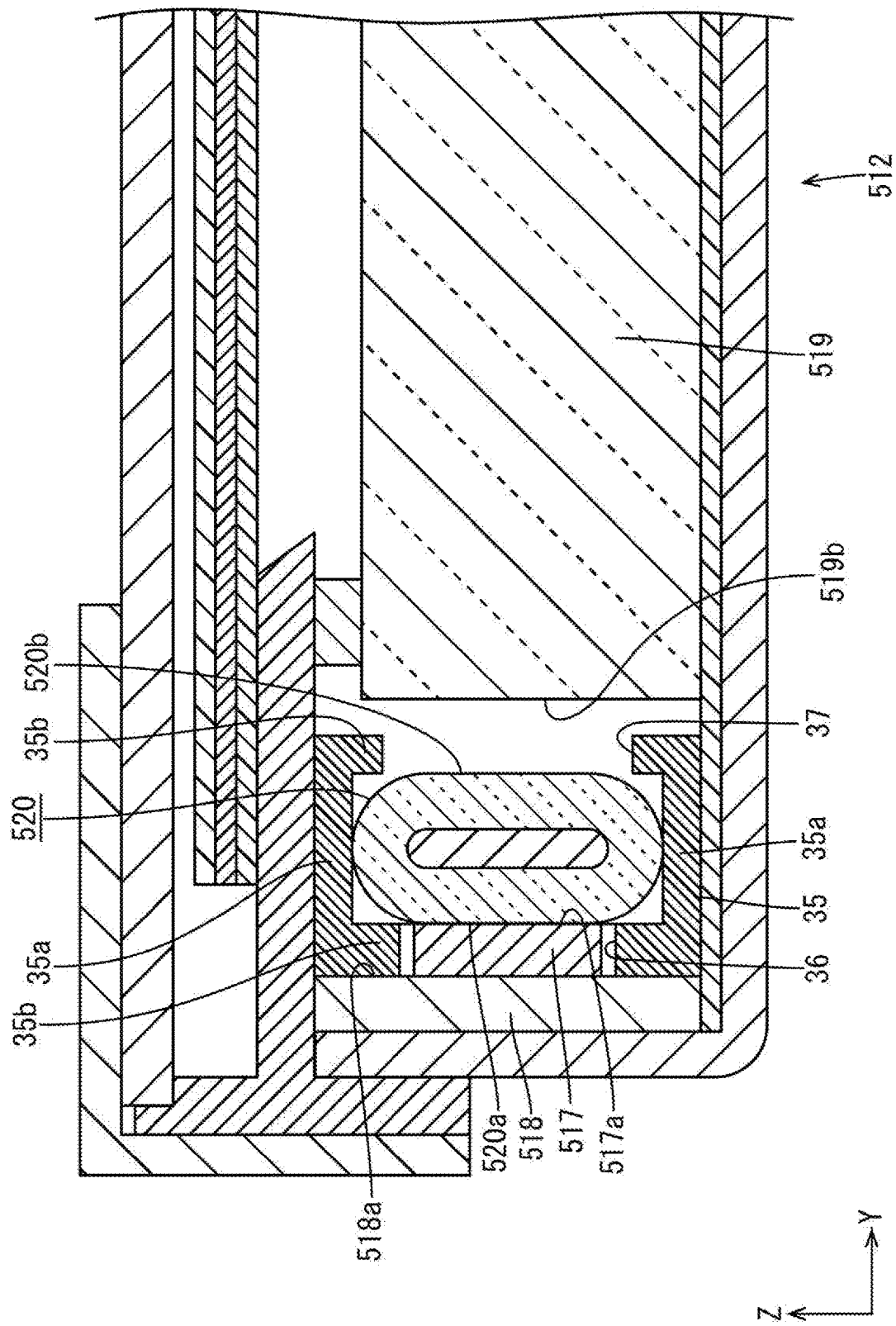
FIG. 20 is an enlarged side sectional view of a backlight unit according to a sixth embodiment of the present invention.

As illustrated in FIG. 20, the wavelength converter 520 according to the present embodiment is held by a holder 35 at a position between a LED 517 and a light entering end surface 519b of a light guide plate 519 in a backlight unit 512. The holder 35 is made of synthetic resin exhibiting excellent light reflectivity and showing a white color, and is in a substantially cylindrical shape housing the wavelength converter 520 to surround the wavelength converter 520 across the substantially entire length thereof. The holder 35 has a pair of first wall portions 35a sandwiching the wavelength converter 520 in an upper-to-lower direction, i.e., in the Z-axis direction, as viewed in FIG. 20, and a pair of second wall portions 35b sandwiching the wavelength converter 520 in a right-to-left direction (a front-to-back direction), i.e., the Y-axis direction, as viewed in FIG. 20. The wavelength converter 520 is, across the substantially entire length thereof, surrounded and held by these wall portions 35a, 35b.

Figure 21:
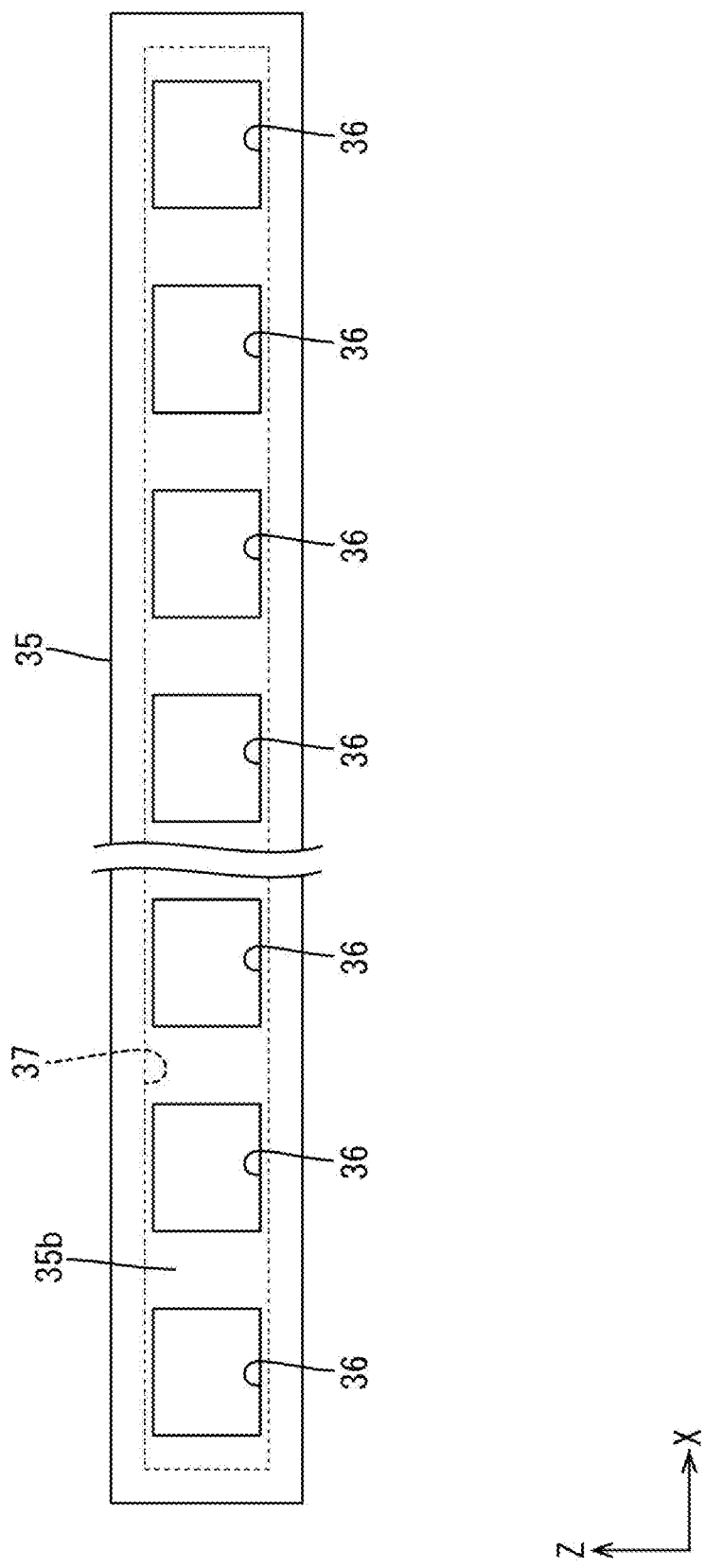
FIG. 21 is a front view of a holder.

Of both second wall portions 35b forming the holder 35, the left (the LED substrate 518 side) second wall portion 35b as viewed in FIG. 20 is provided with LED housing openings 36 each housing the LEDs 517 as illustrated in FIGS. 20 and 21. The multiple LED housing openings 36 are provided as independent openings at the second wall portion 35b such that each LED 517 mounted on a LED substrate 518 is separately housed. The multiple (the same number as that of the LEDs 517) LED housing openings 36 are arranged along the X-axis direction at the second wall portion 35b, and the interval of array of the LED housing openings 36 is coincident with the interval of array of the LEDs 517 on the LED substrate 518. The second wall portion 35b provided with the LED housing openings 36 is, at an outer surface thereof, fixed in contact with a mounting surface 518a of the LED substrate 518. The LEDs 517 each housed in the LED housing openings 36 are held in a position relationship in which light emission surfaces 517a of the LEDs 517 substantially contact a light entering surface 520a of the wavelength converter 520. With this configuration, light emitted from the light emission surfaces 517a of the LEDs 517 is more efficiently input to the light entering surface 520a of the wavelength converter 520.

Figure 22:
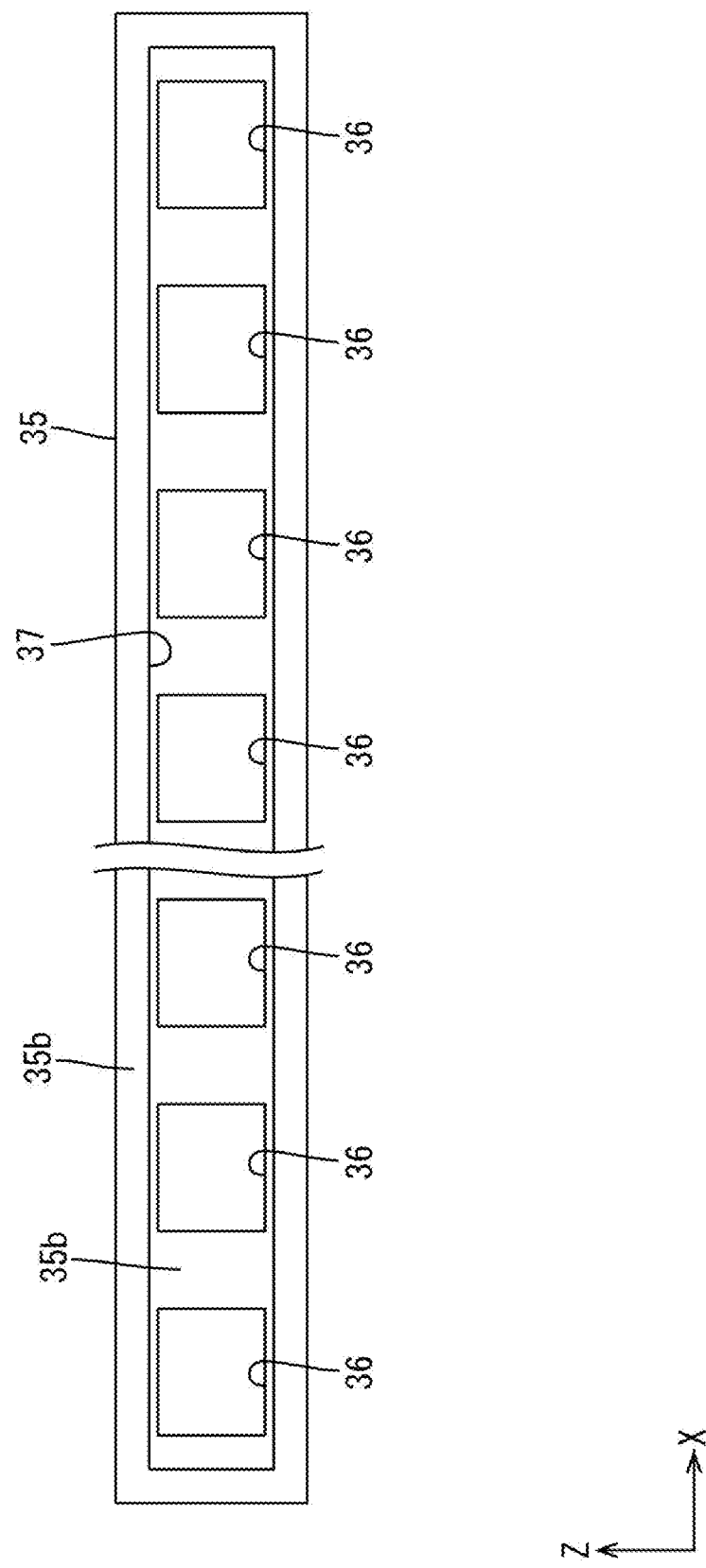
FIG. 22 is a back view of the holder.

Of both second wall portions 35b forming the holder 35, the right (the light guide plate 519 side) second wall portion 35b as viewed in FIG. 20 is, as illustrated in FIGS. 20 and 22, provided with a light transmission opening 37 for allowing passage of light output from a light exiting surface 520b of the wavelength converter 520 and inputting the light to the light entering end surface 519b of the light guide plate 519. The light transmission opening 37 is, as an elongated opening extending along the X-axis direction, provided at the second wall portion 35b, and a formation area of the light transmission opening 37 is set to a size such that the light transmission opening 37 includes a formation area of all of the LED housing openings 36. With this configuration, the light having transmitted through the wavelength converter 520 from each LED 517 can be efficiently input to the light entering end surface 519b of the light guide plate 519. The second wall portion 35b provided with the light transmission opening 37 is arranged such that an outer surface thereof faces the light entering end surface 519b of the light guide plate 519 with a predetermined clearance in the Y-axis direction. Thus, in a case where the temperature of environment in the backlight unit 512 is increased and the light guide plate 519 is thermally expanded accordingly, the thermally-expanded light guide plate 519 comes into contact with the second wall portion 35b provided with the light transmission opening 37 before coming into contact with the wavelength converter 520. That is, displacement of the thermally-expanded light guide plate 519 can be restricted by the second wall portion 35b provided with the light transmission opening 37, and therefore, direct of stress to be acted from the light guide plate 519 on the wavelength converter 520 and the LEDs 517 can be avoided.

Seventh Embodiment

A seventh embodiment of the present invention will be described with reference to FIG. 23. In the seventh embodiment, the number of installed LED substrates 618 and the number of installed wavelength converters 620 are changed from those of the above-described first embodiment. Note that overlapping description of structures, features, and advantageous effects similar to those of the above-described first embodiment will not be made.

Figure 23:
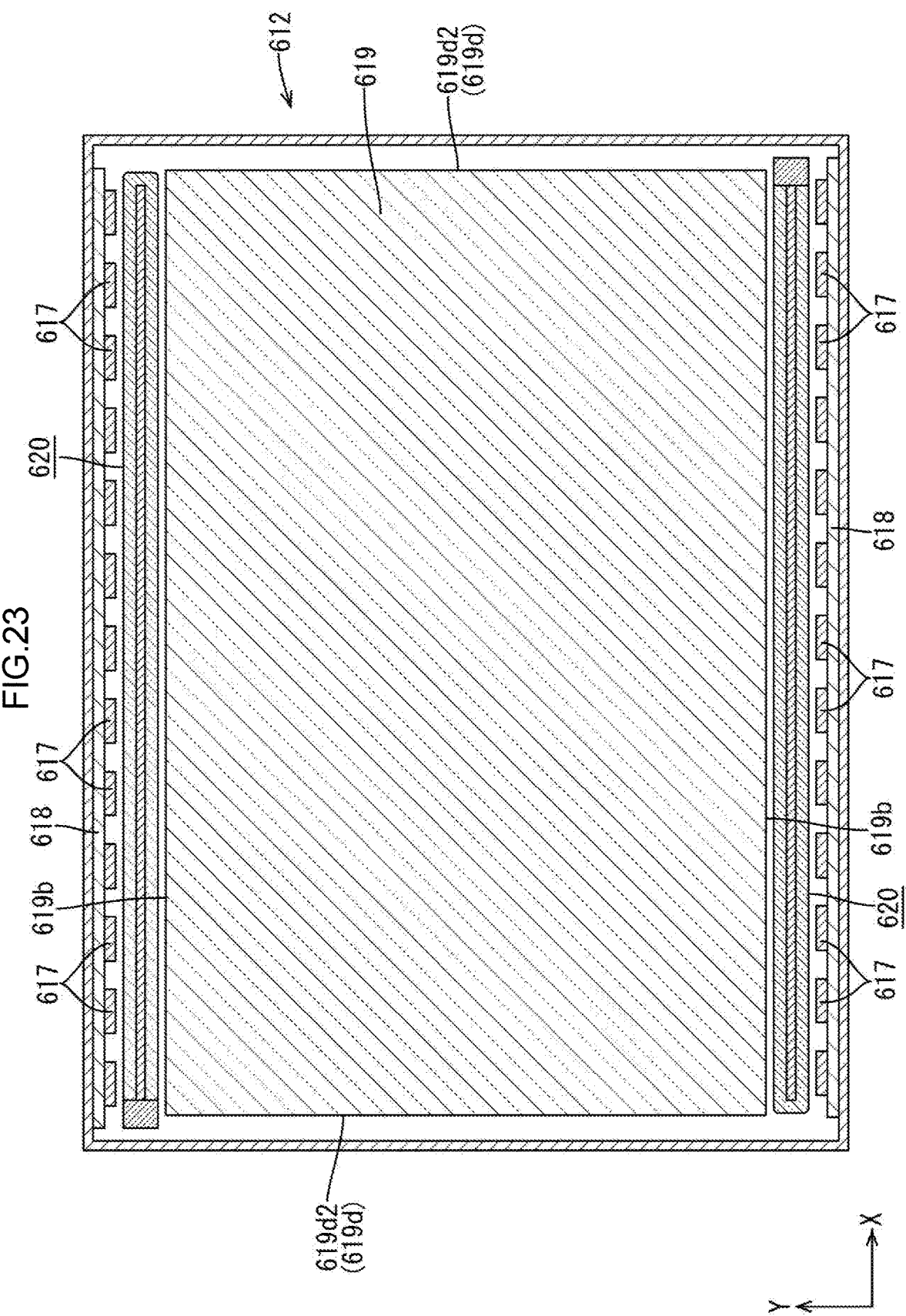
FIG. 23 is a horizontal sectional view of a backlight unit according to a seventh embodiment of the present invention.

As illustrated in FIG. 23, a backlight unit 612 according to the present embodiment is configured such that LEDs 617 and the LED substrates 618 are arranged at both long-side end portions. Specifically, the pair of LED substrates 618 is arranged such that the mounted LEDs 617 each face both long-side end surfaces of an outer peripheral end surface of a light guide plate 619. Thus, in the present embodiment, both long-side end surfaces of the outer peripheral end surface of the light guide plate 619 are each formed as light entering end surfaces 619b to which light from the LEDs 617 enters. On the other hand, the remaining short-side end surfaces are each formed as non-light-entering end surfaces 619d. Thus, the non-light-entering end surfaces 619d according to the present embodiment do not include the non-light-input opposite end surface 19dl (see FIG. 3) as in the above-described first embodiment, but include only both non-light-input-side end surfaces 619d2 adjacent to the light entering end surfaces 619b. As described above, the backlight unit 612 according to the present embodiment is of a both-sided light input type such that the light guide plate 619 is sandwiched from both sides in the short-side direction (the Y-axis direction) of the light guide plate 619 by both LED substrates 618 and the LEDs 617 mounted on the LED substrates 618.

Moreover, the pair of wavelength converters 620 is interposed among the LED substrates 618 and the light entering end surfaces 619b. With this configuration, the light emitted from each LED 617 of the LED substrates 618 is wavelength-converted by each wavelength converter 620, and then, enters to each light entering end surface 619b of the light guide plate 619.

Eighth Embodiment

An eighth embodiment of the present invention will be described with reference to FIG. 24. In the eighth embodiment, the number of installed LED substrates 718 and the number of installed wavelength converters 720 are changed from those of the above-described seventh embodiment. Note that overlapping description of structures, features, and advantageous effects similar to those of the above-described seventh embodiment will not be made.

Figure 24:
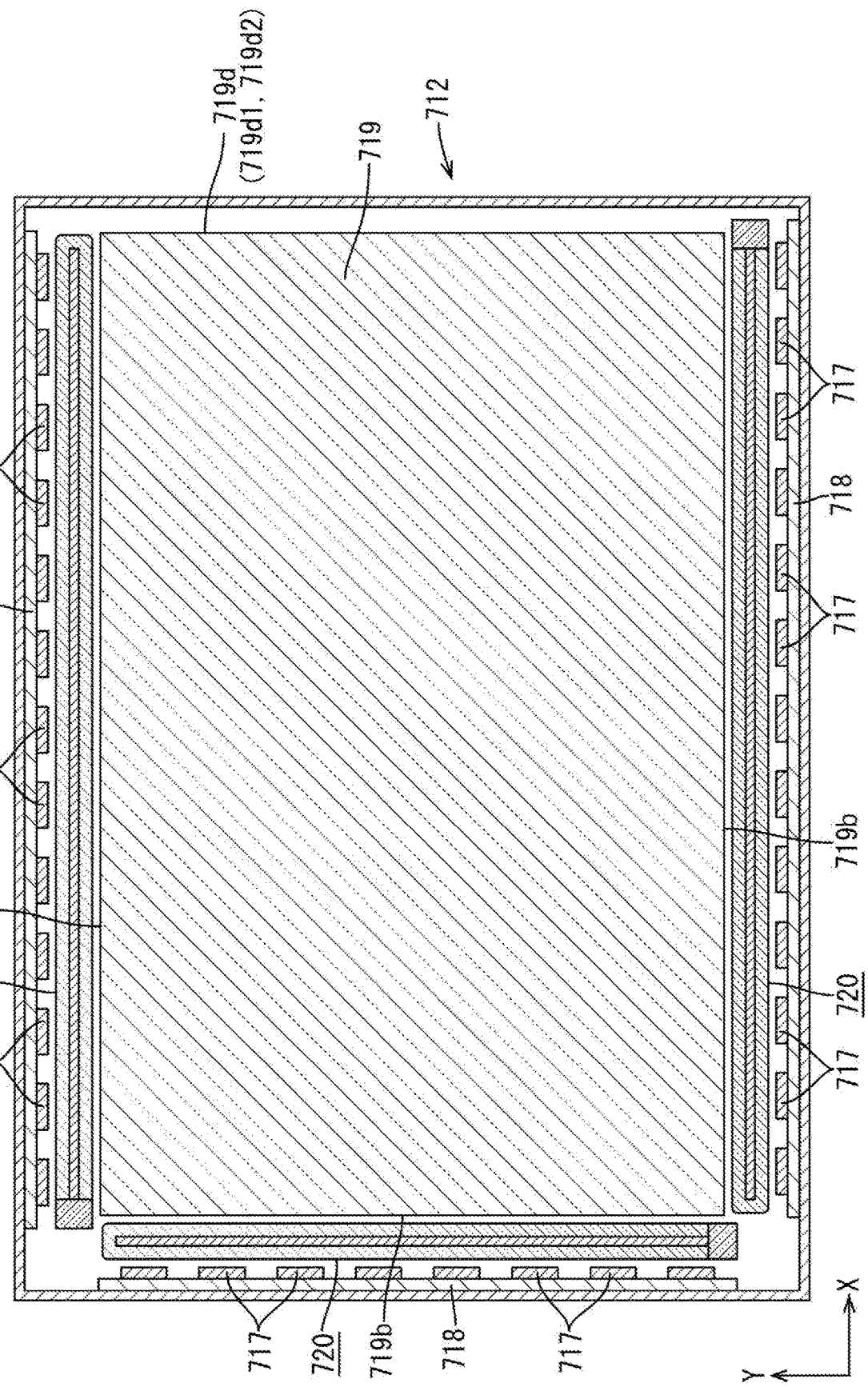
FIG. 24 is a horizontal sectional view of a backlight unit according to an eighth embodiment of the present invention.

As illustrated in FIG. 24, a backlight unit 712 according to the present embodiment is configured such that LEDs 717 and the LED substrates 718 are arranged at both long-side end portions and one (the left as viewed in FIG. 24) short-side end portion. Specifically, each LED substrate 718 is arranged such that each mounted LED 717 faces a corresponding one of both long-side end surfaces and one short-side end surface of an outer peripheral end surface of a light guide plate 719. Thus, in the present embodiment, each of both long-side end surfaces and one short-side end surface of the outer peripheral end surface of the light guide plate 719 is formed as a light entering end surface 719b to which light from the LEDs 717 enters. On the other hand, the remaining other short-side end surface is formed as a non-light-entering end surface 719d. The non-light-entering end surface 719d according to the present embodiment serves as a non-light-input opposite end surface 719d1 for the short-side light entering end surfaces 719b, and serves as a non-light-input-side end surface 719d2 for the pair of long-side light entering end surfaces 719b. As described above, the backlight unit 712 according to the present embodiment is of a three-sided light input type such that the light enters to the light guide plate 719 from the three LED substrates 718 arranged along three sides of the light guide plate 719 and each LED 717 mounted on the LED substrates 718.

Moreover, three wavelength converters 720 are interposed among the LED substrates 718 and the light entering end surfaces 719b. With this configuration, the light emitted from each LED 717 of the LED substrates 718 is wavelength-converted by the wavelength converters 720, and then, enters to the light entering end surfaces 719b of the light guide plate 719.

Ninth Embodiment

A ninth embodiment of the present invention will be described with reference to FIG. 25. In the ninth embodiment, the number of installed LED substrates 818 and the number of installed wavelength converters 820 are changed from those of the above-described seventh embodiment. Note that overlapping description of structures, features, and advantageous effects similar to those of the above-described seventh embodiment will not be made.

Figure 25:
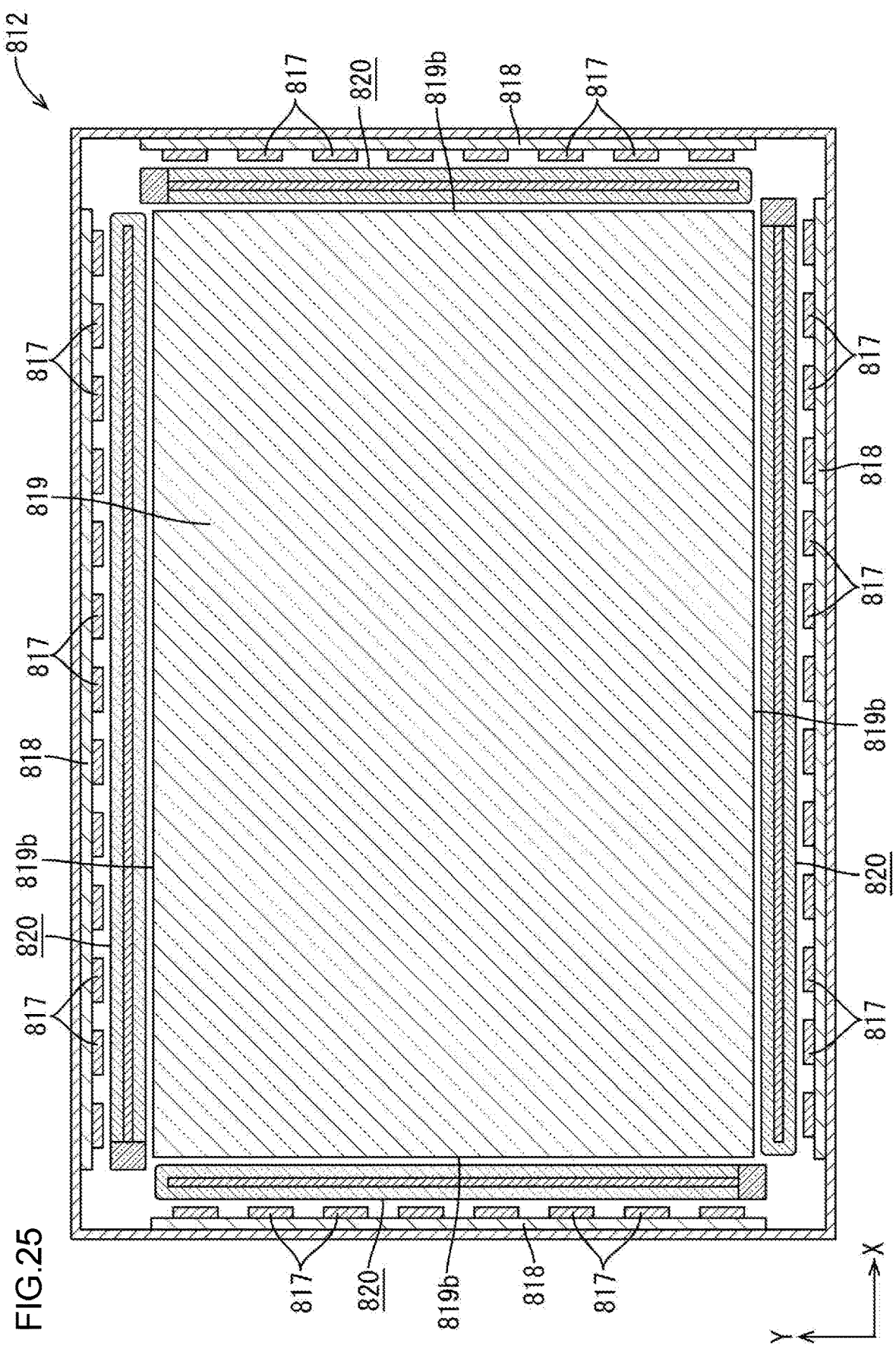
FIG. 25 is a horizontal sectional view of a backlight unit according to a ninth embodiment of the present invention.

As illustrated in FIG. 25, a backlight unit 812 according to the present embodiment is configured such that LEDs 817 and the LED substrates 818 are arranged at both long-side end portions and both short-side end portions, i.e., are formed across the entire circumference of an outer peripheral end portion. Specifically, the LED substrates 818 are arranged such that the mounted LEDs 817 face the entire circumference of an outer peripheral end surface of a light guide plate 819. Thus, in the present embodiment, it is configured such that the entire circumference of the outer peripheral end surface of the light guide plate 819 is formed as light entering end surfaces 819b to which light from the LEDs 817 enters and no non-light-entering end surface is formed at the outer peripheral end surface of the light guide plate 819. As described above, the backlight unit 812 according to the present embodiment is of a four-sided light input type such that the light enters to the light guide plate 819 from the four LED substrates 818 arranged along the four sides of the light guide plate 819 and the LEDs 817 mounted on the LED substrates 818.

Moreover, four wavelength converters 820 are interposed among the LED substrates 818 and the light entering end surfaces 819b. With this configuration, the light emitted from each LED 817 of the LED substrates 818 is wavelength-converted by the wavelength converters 820, and then, enters to the light entering end surfaces 819b of the light guide plate 819.

Tenth Embodiment

A tenth embodiment of the present invention will be described with reference to FIG. 26. In the tenth embodiment, the number of installed LED substrates 918 is changed from those of the above-described third embodiment. Note that overlapping description of structures, features, and advantageous effects similar to those of the above-described third embodiment will not be made.

Figure 26:
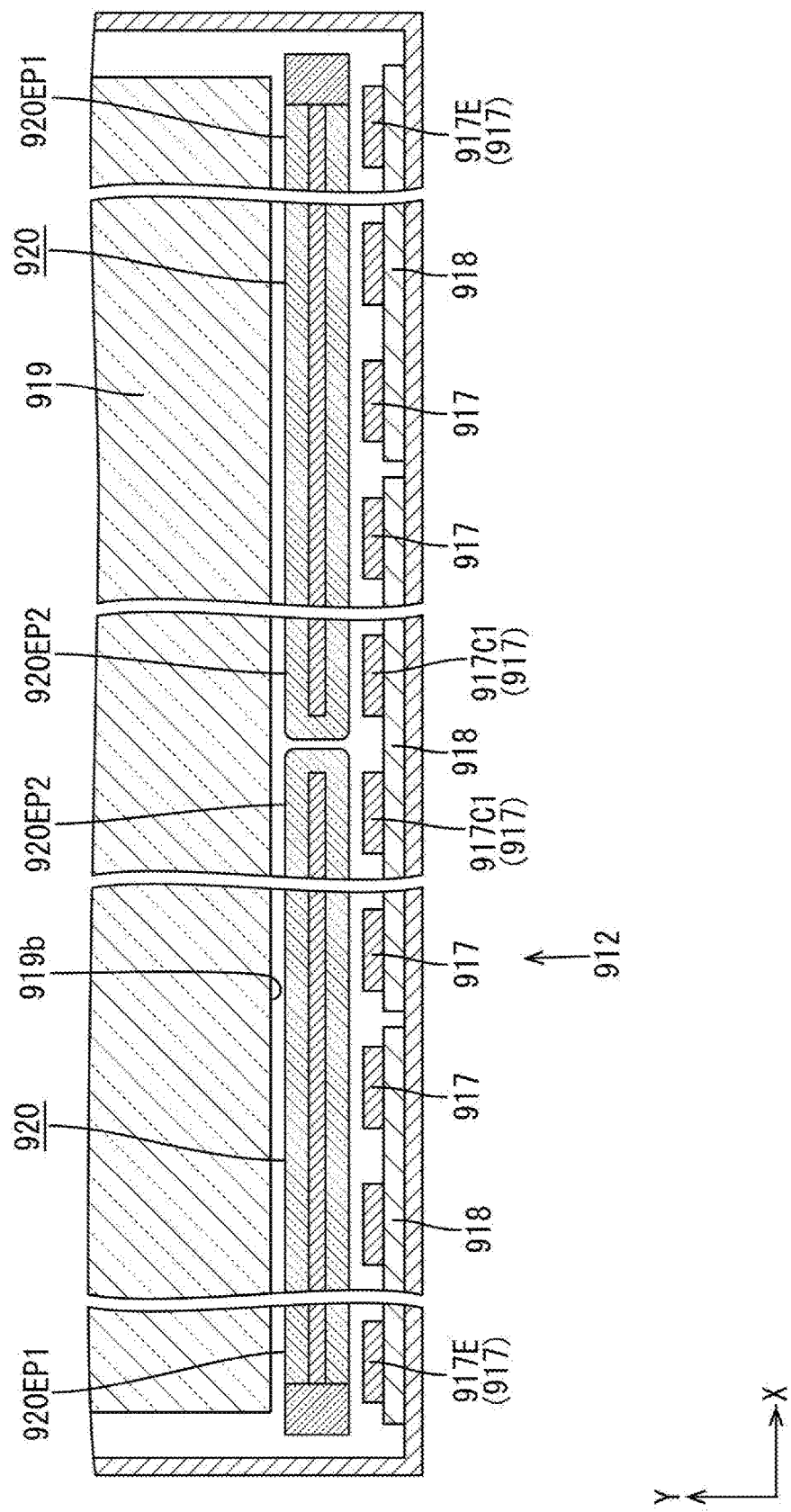
FIG. 26 is an enlarged horizontal sectional view of a backlight unit according to a tenth embodiment of the present invention.

As illustrated in FIG. 26, three LED substrates 918 according to the present embodiment are arranged adjacent to each other along the length direction (the X-axis direction) of a light entering end surface 919b of a light guide plate 919. The length dimension of each LED substrate 918 is shorter than that of each main wavelength converter 920. Some (end-side LEDs 917E positioned at ends of a backlight unit 912 in the X-axis direction) of multiple LEDs 917 mounted on the pair of LED substrates 918 positioned at both ends in the X-axis direction are arranged to overlap with sealing member disposed end portions 920EP1 of the main wavelength converters 920 in the X-axis direction. On the other hand, some (first center LEDs 917C1 positioned at the center of the backlight unit 912 in the X-axis direction) of the multiple LEDs 917 positioned at the center in the X-axis direction and mounted on the LED substrates 918 are arranged to overlap with sealing member non-disposed end portions 920EP2 of the main wavelength converters 920 in the X-axis direction. Such a configuration is suitable for a larger backlight unit 912 (e.g., a device with a size of 70-inch or more).

Eleventh Embodiment

Figure 27:
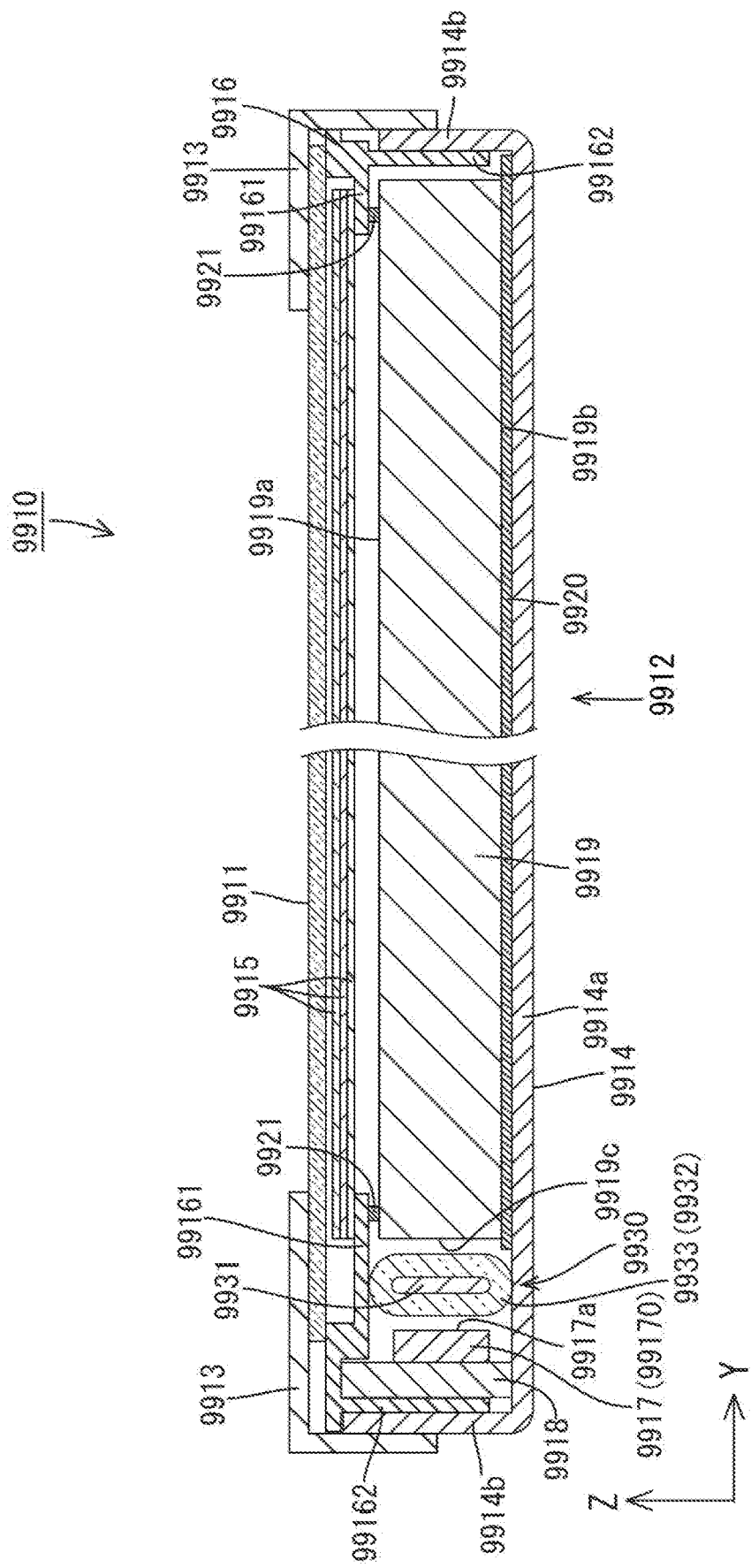
FIG. 27 is a sectional view of a sectional configuration of a liquid crystal display device along a short-side direction according to an eleventh embodiment of the present invention.

An eleventh embodiment of the present invention will be described with reference to FIGS. 27 to 32. A liquid crystal display device 9910 of the present embodiment is, as in the first embodiment, entirely formed in a horizontally-elongated rectangular shape extending long in a right-to-left direction. As illustrated in FIG. 27, the liquid crystal display device 9910 mainly includes a liquid crystal panel 9911 utilized as a display panel, a lighting device (a backlight unit) 9912 as an external light source configured to supply light to the liquid crystal panel 9911, and a frame-shaped bezel 9913 configured to hold the liquid crystal panel 9911, the lighting device 9912, etc., for example. Note that the configuration of the liquid crystal panel is similar to that of the first embodiment, and therefore, description thereof will not be repeated.

As in the first embodiment, an outline configuration of the lighting device 9912 includes a chassis 9914, optical members 9915, a frame 9916, LEDs 9917, a LED substrate 9918, a light guide plate 9919, a reflection sheet 9920, a phosphor tube 9930, etc. Of these components, other configurations than the phosphor tube 9930 are, unless otherwise described, similar to those of the first embodiment, and description thereof will not be repeated.

The light guide plate 9919 is housed in the chassis 9914 such that a front surface 9919a thereof faces the liquid crystal panel 9911 and a back surface 9919b thereof faces the reflection sheet 9920. The front surface 9919a of the light guide plate 9919 is formed as a light exiting surface 9919a configured to output light toward the liquid crystal panel 9911. The optical members 9915 are arranged between the light exiting surface 9919a and the liquid crystal panel 9911 with the optical members 9915 being supported by the frame 9916. One long-side end surface 9919c of the light guide plate 9919 is formed as a light entering surface 9919c to which light from the LEDs 9917 enters through the phosphor tube 9930. Note that the other long-side end surface 9919d of the light guide plate 9919 and two short-side end surfaces 9919e, 9919f of the light guide plate 9919 do not face the LEDs 9917 and light sources (the LEDs 9917). Thus, these surfaces will be sometimes referred to as "non-light-source-facing surfaces." Specifically, the non-light-source-facing surface (the long-side end surface 9919d) on the opposite side of the light entering surface 9919c will be sometimes referred to as an "opposite non-light-source-facing surface."

Figure 28:
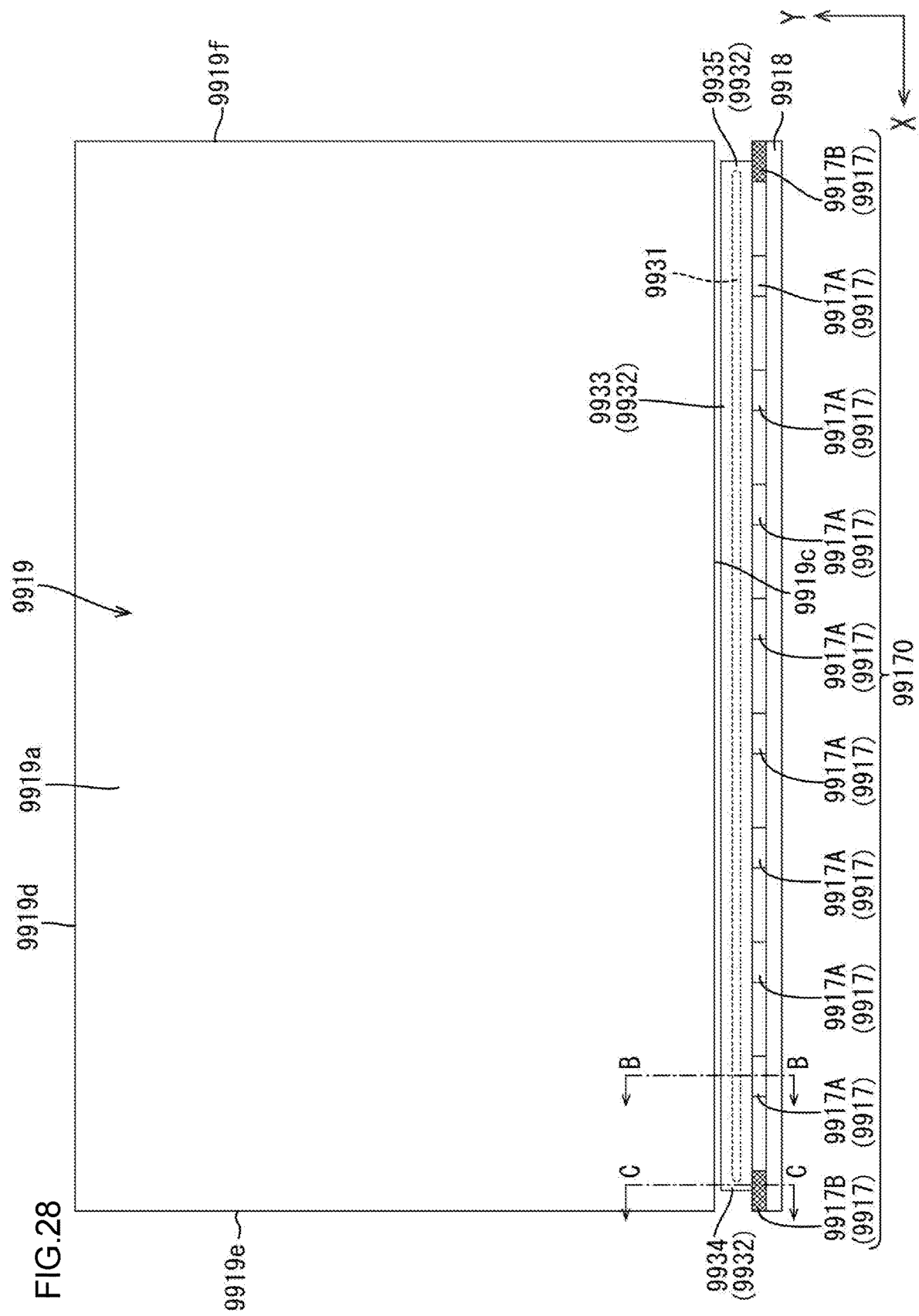
FIG. 28 is a schematic plan view of an arrangement relationship among an LED line, a phosphor tube, and a light guide plate viewed from a front side in the eleventh embodiment.

The LEDs 9917 are utilized as the light sources configured to irradiate the light entering surface 9919c of the light guide plate 9919 with the light through the phosphor tube 9930. The LED 9917 is of a so-called top-emitting type, and the multiple LEDs 9917 are utilized. The multiple LEDs 9917 are mounted on the LED substrate 9918 with the LEDs 9917 being arranged in line with a clearance. Note that in the present specification, the line of the multiple LEDs 9917 will be referred to as an "LED line (an example of a light source line) 99170." FIG. 28 is a schematic plan view of an arrangement relationship among the LED line 99170, the phosphor tube 9930, and the light guide plate 9919 viewed from a front side. As illustrated in FIG. 28, the multiple LEDs 9917 forming the LED line 99170 are arranged along the light entering surface (the long-side end surface) 9919c of the light guide plate 9919. In the case of the present embodiment, an interval between adjacent ones of the LEDs 9917 is set constant. Note that as will be described later, the phosphor tube 9930 is arranged between the LED line 99170 and the light entering surface 9919c of the light guide plate 9919.

Two types of LEDs with different output light colors are utilized as the LEDs 9917. Specifically, an LED (an example of a reference color light source) 9917A configured to output blue light from a light emission surface 9917Aa and an LED (an example of a mixed color light source) 9917B configured to output white light from a light emission surface 9917Ba are utilized as the LEDs 9917. Note that in the present specification, light (the blue light in the case of the present embodiment) emitted from the LEDs 9917 such as the LEDs 9917A and exciting a phosphor (a first phosphor) contained in the phosphor tube 9930 will be referred to as "primary light." The LED (the example of the mixed color light source) 9917B is configured to output blue light and light (i.e., yellow light) showing a yellow color in a complementary color relationship with a blue color. Such an LED 9917B together outputs the blue light and the yellow light (an example of complementary color light), and as a result, outputs the white light in a mixed color of these types of light. Multiple LEDs 9917A configured to output the blue light (the primary light) are, as illustrated in FIG. 28, arranged in line at the center of the LED line 99170, and a single LED 9917B configured to output the white light is arranged at each end of the LED line 99170. Note that the LEDs 9917 (the LEDs 9917A, 9917B) will be described later in detail.

Figure 29:
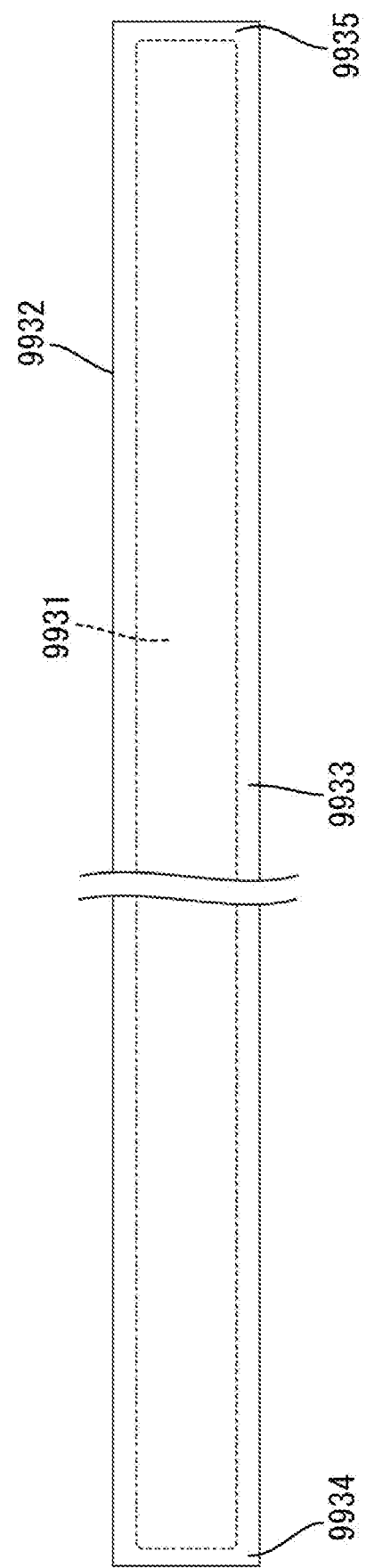
FIG. 29 is a plan view of the phosphor tube in the eleventh embodiment.

FIG. 29 is a plan view of the phosphor tube 9930. The phosphor tube (a wavelength conversion member) 9930 is entirely formed in an elongated shape, and is arranged in a clearance between the light emission surfaces 9917a of the LEDs 9917 and the light entering surface 9919c of the light guide plate 9919 along the direction (the long-side direction of the light guide plate 19 in the case of the present embodiment) of the line of the multiple LEDs 9917. The phosphor tube 9930 has the function of allowing part of the light from the LEDs 9917 to directly transmit toward the light entering surface 9919c and absorbing part of the light from the LEDs 9917 to convert such light into light in another wavelength region and release the resultant light. The length of the phosphor tube 9930 in the longitudinal direction thereof is set shorter than that of the LED line 99170. Moreover, the length of the phosphor tube 9930 in the longitudinal direction thereof is set shorter than the length of the light entering surface 9919c in the longitudinal direction (the long-side direction) thereof. The phosphor tube 9930 includes a wavelength converter (a first wavelength converter) 9931 containing quantum dot phosphors (an example of the phosphors), and an elongated housing 9932 housing to surround the wavelength converter 9931 and exhibiting light transmittance.

The wavelength converter 9931 has the function of converting the primary light (the blue light in the case of the present embodiment) output from the LEDs 9917 into secondary light (green light and red light in the case of the present embodiment) in other wavelength regions different from that of the primary light and releasing the resultant light. Of the primary light input to the wavelength converter 9931, the light exciting the quantum dot phosphors contained in the wavelength converter 9931 is wavelength-converted into the secondary light, and the primary light not exciting the quantum dot phosphors is directly transmitted through the wavelength converter 9931. The wavelength converter 9931 is made of a resin hardened material to which the quantum dot phosphors are added. Examples of the resin to which the quantum dot phosphors are added include transparent ultraviolet curable resin. Note that the wavelength converter 9931 of the present embodiment is in a form extending along the longitudinal direction of the elongated housing 9932 with the wavelength converter 9931 being housed in the housing 9932.

The quantum dot phosphor is a phosphor exhibiting an excellent quantum efficiency. The quantum dot phosphor has a discrete energy level in such a manner that electrons/electron holes and excitons are confined in all directions of a three-dimensional space in a nanosize (e.g., a diameter of about 2 nm to 10 nm) semiconductor crystal, and the dot size of the quantum dot phosphor is changed so that the peak wavelength (the emission color) of emitted light, etc. can be selected freely. In the case of the present embodiment, a green quantum dot phosphor configured to emit green light (a wavelength region of about 500 nm to 570 nm) and a red quantum dot phosphor configured to emit red light (a wavelength region of about 600 nm to 780 nm) are mixed as the quantum dot phosphors in the wavelength converter 9931. The emission spectra of the green and red light emitted from the green and red quantum dot phosphors each show sharp peaks, and the half bandwidths thereof are narrow. Thus, the purity of each of the green light and the red light is extremely high, and the color gamut thereof is also wide.

The green quantum dot phosphor is excited by absorbing the light (the blue light, the primary light) from the LEDs 9917, thereby releasing the green light (a wavelength region of about 500 nm to 570 nm). That is, the green quantum dot phosphor has the function of converting the light (the blue light, the primary light) from the LEDs 9917 into another type of light (the green light, the secondary light) with a different wavelength region. The red quantum dot phosphor is excited by absorbing the light (the blue light, the primary light) from the LEDs 9917, thereby releasing the red light (a wavelength region of about 600 nm to 780 nm). That is, the red quantum dot phosphor has the function of converting the light (the blue light, the primary light) from the LEDs 9917 into another type of light (the red light, the secondary light) with a different wavelength region. A material used for the quantum dot phosphor includes, for example, material combinations (e.g., CdCe (cadmium selenide) and ZnS (zinc sulfide)) of Zn, Cd, Pb, etc. as divalent cations and O, S, Se, Te, etc. as divalent anions, material combinations (e.g., indium phosphide (InP) and gallium arsenide (GaAs)) of Ga, In, etc. as trivalent cations and P, As, Sb, etc. as trivalent anions, and chalcopyrite compounds (e.g., $CuInSe_2$). In the present embodiment, CdSe is used as an example of the material of the quantum dot phosphor.

In the present embodiment, the quantum dot phosphors (the green quantum dot phosphor and the red quantum dot phosphor) are substantially uniformly and dispersively mixed in the resin forming the wavelength converter 9931. Note that other components such as a scattering agent may be contained in the wavelength converter 9931. The housing 9932 is entirely formed in an elongated shape, and is in a cylindrical shape closed at both ends with the wavelength converter 9931 being housed in the housing 9932 and exhibiting light transmittance. For example, the housing 9932 is, for example, configured such that a glass cylindrical body (e.g., a glass tube) opening at one end portion and closed at the other end portion is closed at the one end portion with the wavelength converter 9931 being housed in the cylindrical body. The housing 9932 includes an elongated cylindrical main body 9933 including a transparent cylindrical wall surrounding the wavelength converter 9931 and having a space for housing the wavelength converter 9931, and sealing end portions (non-wavelength-converter portions) 9934, 9935 closing (sealing) both ends of the cylindrical main body 9933 in the longitudinal direction thereof. Note that the sealing end portions (non-wavelength-converter portions) 9934, 9935 are each end portions of the housing 9932 in the longitudinal direction thereof, and are each also end portions of the phosphor tube 9930.

For example, the phosphor tube 9930 is manufactured in such a manner that quantum dot phosphors are added to and mixed with non-hardened ultraviolet curable resin exhibiting fluidity and the resultant resin mixture is, after an opening end of a glass tube has been sealed (closed) with the resultant resin mixture being housed in the glass tube, irradiated with ultraviolet light and is hardened in the glass tube. While a not-shown holding member is utilized, the phosphor tube 9930 is fixed at a predetermined position among the LEDs 9917 (the LED line 99170) and the light entering surface 9919c with the phosphor tube 9930 being sandwiched between a bottom plate 9914a of the chassis 9914 and a frame main body 99161 of the frame 9916.

Of the LED line 99170, each LED 9917A is placed in the lighting device 9912 such that the light emission surface 9917Aa faces the wavelength converter 9931 housed in the housing 9932. Moreover, each LED 9917A is set to overlap with the light entering surface 9919c through the wavelength converter 9931 in the light output direction (the optical axis direction L of the LED 9917) of the LED 9917.

Both end portions 9934, 9935 of the phosphor tube 9930 in the longitudinal direction thereof are formed of only members (e.g., glass) exhibiting light transmittance, and do not have a wavelength conversion function. Both end portions 9934, 9935 of the phosphor tube 9930 as described above are arranged to overlap with the light entering surface 9919c in the light output direction (the optical axis direction L of the LED 9917) of the LED 9917, thereby not protruding to the outside of the light entering surface 9919c. The LED 9917B arranged at each end of the LED line 99170 is placed in the lighting device 9912 such that part of the light emission surface 9917Ba faces a corresponding one of the end portions (the non-wavelength-converter portions) 9934, 9935 and the remaining portion of the light emission surface 9917Ba directly faces the light entering surface 9919c of the light guide plate 9919.

Each LED 9917A arranged at the center of the LED line 99170 mainly outputs the light to a center portion (a portion including the wavelength converter 31) of the phosphor tube 9930. Then, the wavelength converter 9931 mainly wavelength-converts the primary light (the blue light) output from each LED 9917A into the secondary light (the green light and the red light). Part of the primary light output from each LED 9917A is wavelength-converted into the secondary light by the wavelength converter 9931 while being transmitted through the phosphor tube 9930 from a back side (a LED 9917 side) to the front side (a light guide plate 9919 side). Other part of the primary light output from each LED 9917A is, as the primary light, directly transmitted through the phosphor tube 9930 from the back side (the LED 9917 side) to the front side (the light guide plate 9919 side). As described above, when the primary light output from each LED 9917A is partially wavelength-converted while being transmitted through the phosphor tube 9930 from the back side (the LED 9917 side) to the front side (the light guide plate 9919 side), white transmitted light mainly including the primary light and the secondary light exits from the center portion (the portion including the wavelength converter 9931) of the phosphor tube 9930 toward the light entering surface 9919c of the light guide plate 9919.

Figure 30:
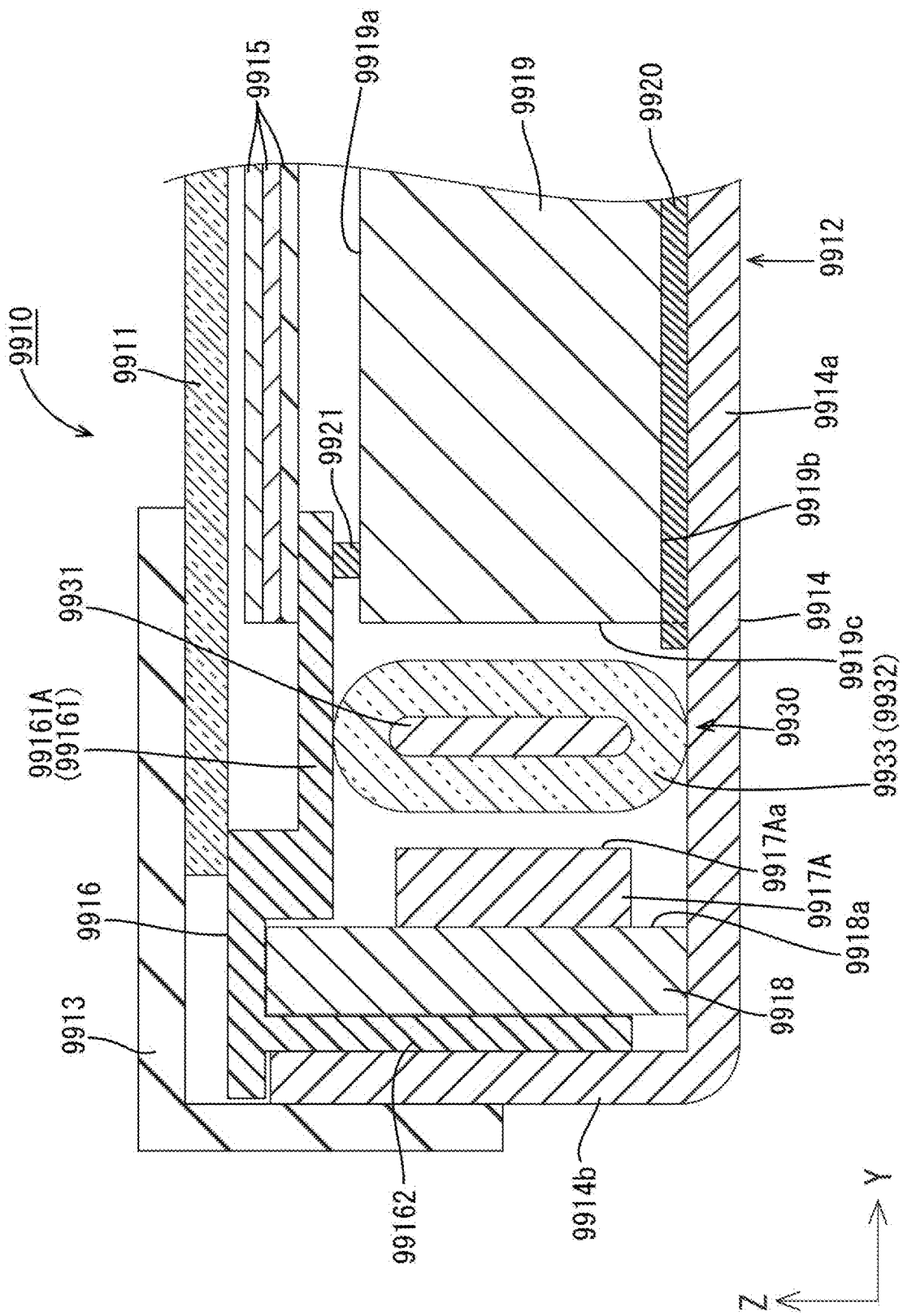
FIG. 30 is an enlarged sectional view of the liquid crystal display device in the vicinity of an LED configured to output blue light in the eleventh embodiment.

FIG. 30 is an enlarged sectional view of the liquid crystal display device 9910 in the vicinity of the LED 9917A configured to output the blue light. FIG. 30 illustrates a sectional view of a portion corresponding to a B-B line of FIG. 28. As illustrated in FIG. 30, the LED 9917A is mounted on a mounting surface 9918a of the flat plate-shaped LED substrate 9918 such that the light emission surface (a light output portion) 9917Aa thereof faces the wavelength converter 9931 of the phosphor tube 9930 and faces the light entering surface 9919c of the light guide plate 9919 through the phosphor tube 9930.

The LED (the example of the reference color light source) 9917A includes a chip-shaped blue LED element (a blue light emitting element) as a light source, a transparent sealing material configured to seal the blue LED element, and a substantially box-shaped case housing the blue LED element and the sealing material. The LED 9917A is configured to emit the blue light. Note that the blue LED element is, for example, a semiconductor made of InGaN, and is configured to output light (i.e., the blue light) in a blue light wavelength region (about 420 nm to 500 nm) when voltage is applied in a forward direction.

On the other hand, the LED 9917B arranged at each end of the LED line 99170 is configured to mainly output the light toward a corresponding one of the end portions 9934, 9935 of the phosphor tube 9930. Part of the white light output from each LED 9917B is transmitted through a corresponding one of the end portions 9934, 9935 of the phosphor tube 9930 not provided with the wavelength conversion function, and then, is directly output toward the light entering surface 9919c. Thus, as in the center portion (including the wavelength converter 9931) of the phosphor tube 9930, each of the end portions 9934, 9935 of the phosphor tube 9930 outputs the white light toward the light entering surface 9919c. Note that in a case where part of the white light output from each LED 9917B enters to the wavelength converter 9931, part of the blue light (the primary light) in the white light excites the quantum dot phosphors in the wavelength converter 9931, and therefore, is wavelength-converted into the secondary light. Moreover, part of the white light output from each LED 9917B is directly supplied to the light entering surface 9919c of the light guide plate 9919.

Figure 31:
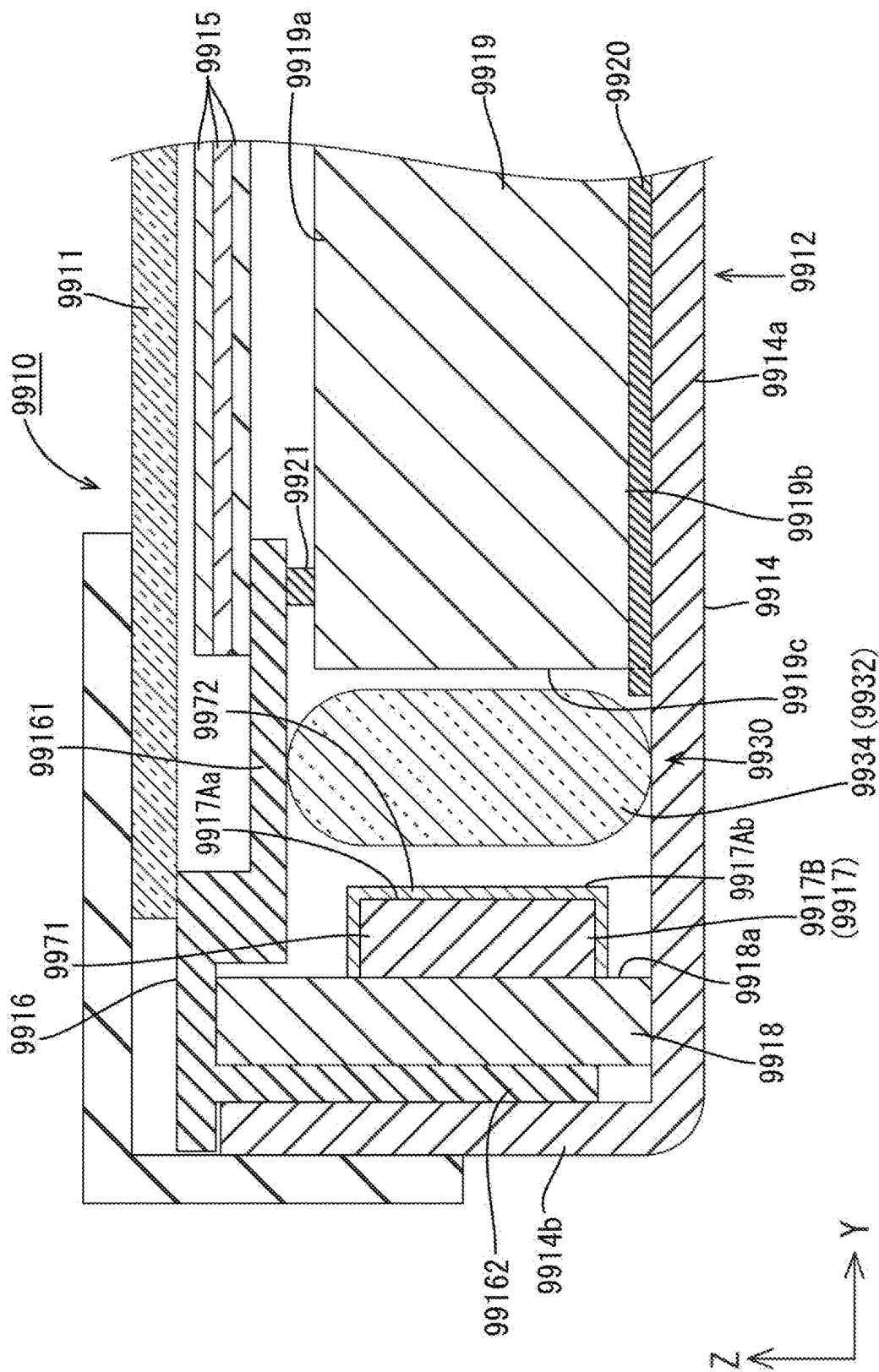
FIG. 31 is an enlarged sectional view of the liquid crystal display device in the vicinity of an LED configured to output white light in the eleventh embodiment.

FIG. 31 is an enlarged sectional view of the liquid crystal display device 9910 in the vicinity of the LED 9917B configured to output the white light. FIG. 31 illustrates a sectional view of a portion corresponding to a C-C line of FIG. 28. As illustrated in FIG. 31, the LED 9917B is mounted on the mounting surface 9918a of the flat plate-shaped LED substrate 9918 such that part of the light emission surface 9917Ba faces the end portion (the non-wavelength-converter portion) 9934 of the phosphor tube 9930 not provided with the wavelength conversion function and faces the light entering surface 9919c of the light guide plate 9919 through the phosphor tube 9930.

The LED 9917B of the present embodiment is configured such that a wavelength converter (an example of a second wavelength converter) 9972 showing a yellow color is formed on a surface (including the light emission surface (the light output portion) 9917Aa) of a main body (an example of a primary light source) 9971 to cover the surface of the main body formed of the above-described LED 9917A. The wavelength converter 9972 is formed of a coating film obtained in such a manner that phosphors (an example of a second phosphor) showing the yellow color is dispersed in transparent binder resin such as acrylic resin. For example, the wavelength converter 9972 includes, as the above-described phosphors, a green phosphor (an example of a second green phosphor) made of $SrGa_2S_4:Eu^{2+}$, and a red phosphor (an example of a second red phosphor) made of $(Ca,Sr,Ba)S:Eu^{2+}$.

As in the LED 9917A, the main body 9971 (the primary light source) of the LED 9917B outputs the blue light (a wavelength region of about 420 nm to 500 nm) as the primary light. Of the blue light output from the main body 9971, part of the blue light is wavelength-converted by the phosphors in the wavelength converter 9972 and exits as the yellow light (the complementary color light), and the remaining blue light is directly transmitted as the blue light through the wavelength converter 9972.

The green phosphor in the wavelength converter 9972 is excited by absorbing the blue light (the primary light) from the main body 9971, and releases the green light (a wavelength region of about 500 nm to 570 nm). Moreover, the red phosphor in the wavelength converter 9972 is excited by absorbing the blue light (the primary light) from the main body 9971, and releases the red light (a wavelength region of about 600 nm to 780 nm). That is, when absorbing the blue light from the main body 9971, the wavelength converter 9972 releases the yellow light as a light mixture of the green light and the red light. As described above, the LED 9917B releases not only the blue light but also the yellow light, and as a result, outputs the white light (an example of whitened light) as a light mixture of the blue light and the yellow light.

Figure 32:
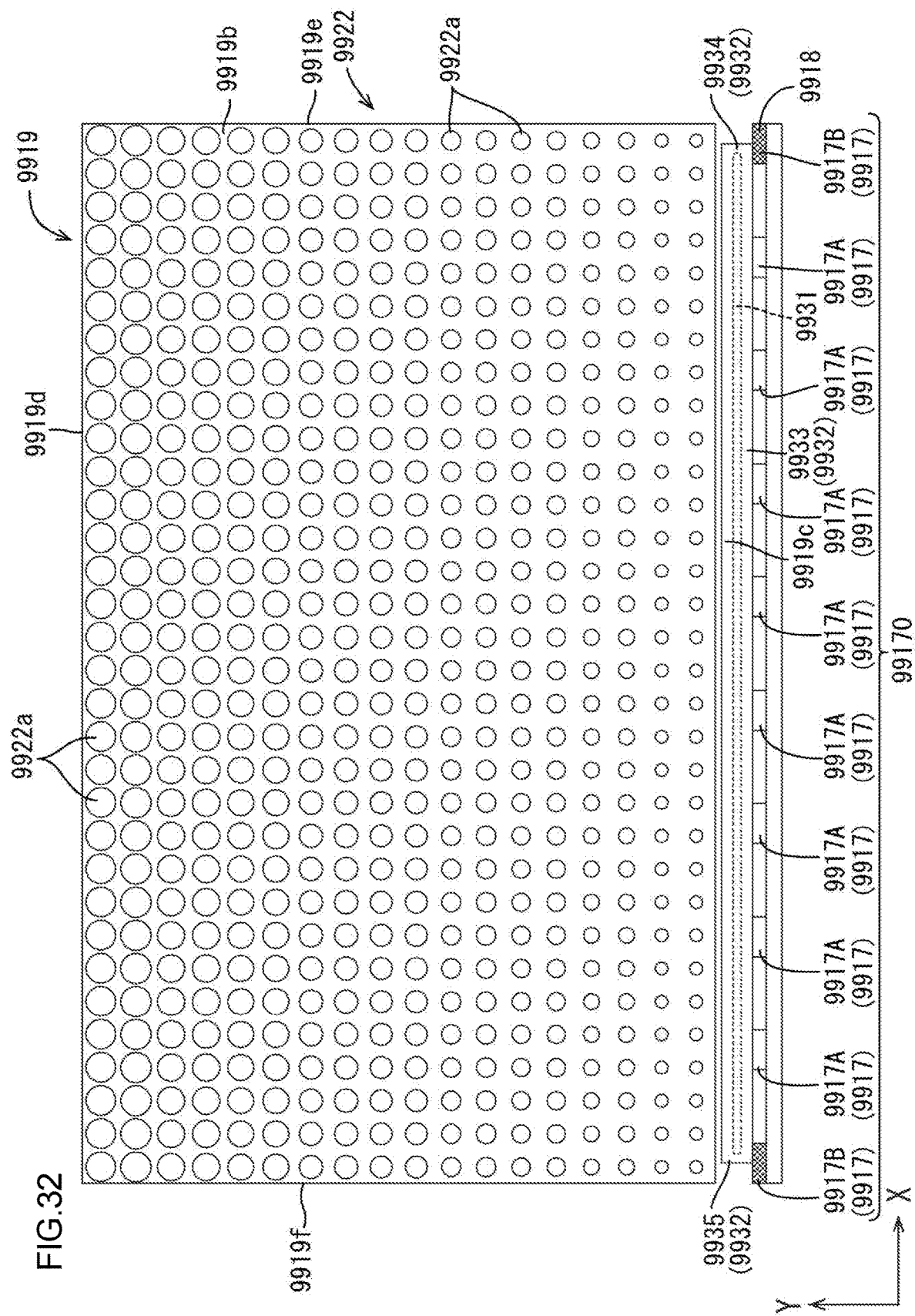
FIG. 32 is a schematic plan view of the arrangement relationship among the LED line, the phosphor tube, and the light guide plate viewed from a back side in the eleventh embodiment.

FIG. 32 is a schematic plan view of an arrangement relationship between the LED line 99170 and the light guide plate 9919 viewed from the back side. As illustrated in FIG. 32, a light reflection/scattering pattern 9922 including the group of multiple dot portions 9922a each exhibiting light reflectivity and scattering properties is formed on the back surface 9919b of the light guide plate 9919. Each dot portion 9922a is formed of a substantially circular white coating film, and is formed on the back surface 9919b of the light guide plate 9919 by a well-known method such as a printing technique. The light reflection/scattering pattern 9922 is set as follows: the size of the dot portion 9922a decreases toward the LEDs 9917 (i.e., toward the light entering surface 9919c), and the density (the density per unit area) of the dot portions 9922a decreases toward the LEDs 9917; and the size of the dot portion 9922a increases with distance from the LEDs 9917, and the density (the density per unit area) of the dot portions 9922a increases with distance from the LEDs 9917. When the light input to the light entering surface 9919c of the light guide plate 9919 contacts the dot portions 9922a, the light is reflected or scattered by the dot portions 9922a, and then, exits from the light exiting surface 9919a.

In the lighting device 9912 described above, when power is supplied to each LED 9917 forming the LED line 99170, each LED 9917 is turned on, and the light output from each LED 9917 enters into the light guide plate 9919 through the light entering surface 9919c. At this point, the white light is, in response to the blue light from each LED 9917A, output from the portion of the phosphor tube 9930 including the wavelength converter 9931. Meanwhile, the white light is, in response to the white light from each LED 9917B, also output from both end portions 9934, 9935 of the phosphor tube 9930. As a result, the white light is supplied into the light guide plate 9919 across the entire area thereof, and therefore, white planar light exits from the light exiting surface 9919a.

If the entirety of the LED line 99170 is formed of the LEDs 9917A, the blue light is, through each of the end portions 9934, 9935 of the phosphor tube 9930, supplied from the phosphor tube 9930 to a portion of the light guide plate 9919 linearly extending along the light output direction of the LED 9917A, and planar light (partially-blue-tinged planar light) partially colored in the color (the blue color) of the primary light exits from the light exiting surface 9919a. However, in the lighting device 9912 of the present embodiment, the LED 9917B configured to output the white light is used in advance as the LED 9917 configured to mainly supply the light to each of the end portions 9934, 9935 not provided with the wavelength conversion function, and therefore, coloring of the emitted light (the planar light) in the color (the blue color) of the primary light is reduced.

In the present embodiment, the main body (the primary light source) 9971 of the LED 9917B identical to the LED 9917A is utilized. Thus, the lighting device 9912 of the present embodiment has the following advantages: a common component can be shared between the main body (the primary light source) 9971 of the LED 9917B and the LED (the reference color light source) 9917A; excellent productivity is provided; and control of lighting of each LED 9917 is facilitated. Moreover, in the present embodiment, the LED 9917B including the main body (the primary light source) 9971 and the wavelength converter 9972 formed of the coating film is utilized. Thus, the thickness of the coating film formed on the main body (the primary light source) 9971, the content of each phosphor, etc. are adjusted so that the wavelength conversion function of the wavelength converter 9972 can be easily adjusted. Further, in the present embodiment, it is configured such that part of the LED (the mixed color light source) 9917B directly faces the light entering surface 9919c without facing the end portions (the non-wavelength-converter portions) 9934, 9935 and that part of the light output from the LED (the mixed color light source) 9917B is directly input to the light entering surface 9919c. In addition, in the present embodiment, it is configured such that at least one end portion (the wavelength converter) of the phosphor tube (the wavelength conversion member) 9930 is arranged on the inside with respect to the end portions of the LED line (the light source line) 99170.

Moreover, in the present embodiment, the length of the phosphor tube (the wavelength conversion member) 9930 in the longitudinal direction thereof is set shorter than that of the LED line (the light source line) 99170, and both end portions 9934, 9935 of the phosphor tube (the wavelength conversion member) 9930 are arranged on the inside with respect to both end portions 9934, 9935 of the LED line (the light source line) 99170. Thus, even in a case where the position of the phosphor tube (the wavelength conversion member) 9930 is shifted to some extent in the longitudinal direction thereof, the LED 9917B configured to output the white light is reliably assigned to each of the end portions 9934, 9935.

Twelfth Embodiment

Next, a twelfth embodiment of the present invention will be described with reference to FIG. 33. In the present embodiment, a lighting device 9912A configured such that the LED line 99170 of the above-described eleventh embodiment is replaced with an LED line 99170A and the phosphor tube 9930 is replaced with two phosphor tubes 9930A1, 9930A2 will be described. Note that a basic configuration of the lighting device of the present embodiment is similar to that of the above-described eleventh embodiment. Thus, the same reference numerals as those of the eleventh embodiment are used to represent equivalent configurations, and detailed description thereof will not be repeated.

Figure 33:
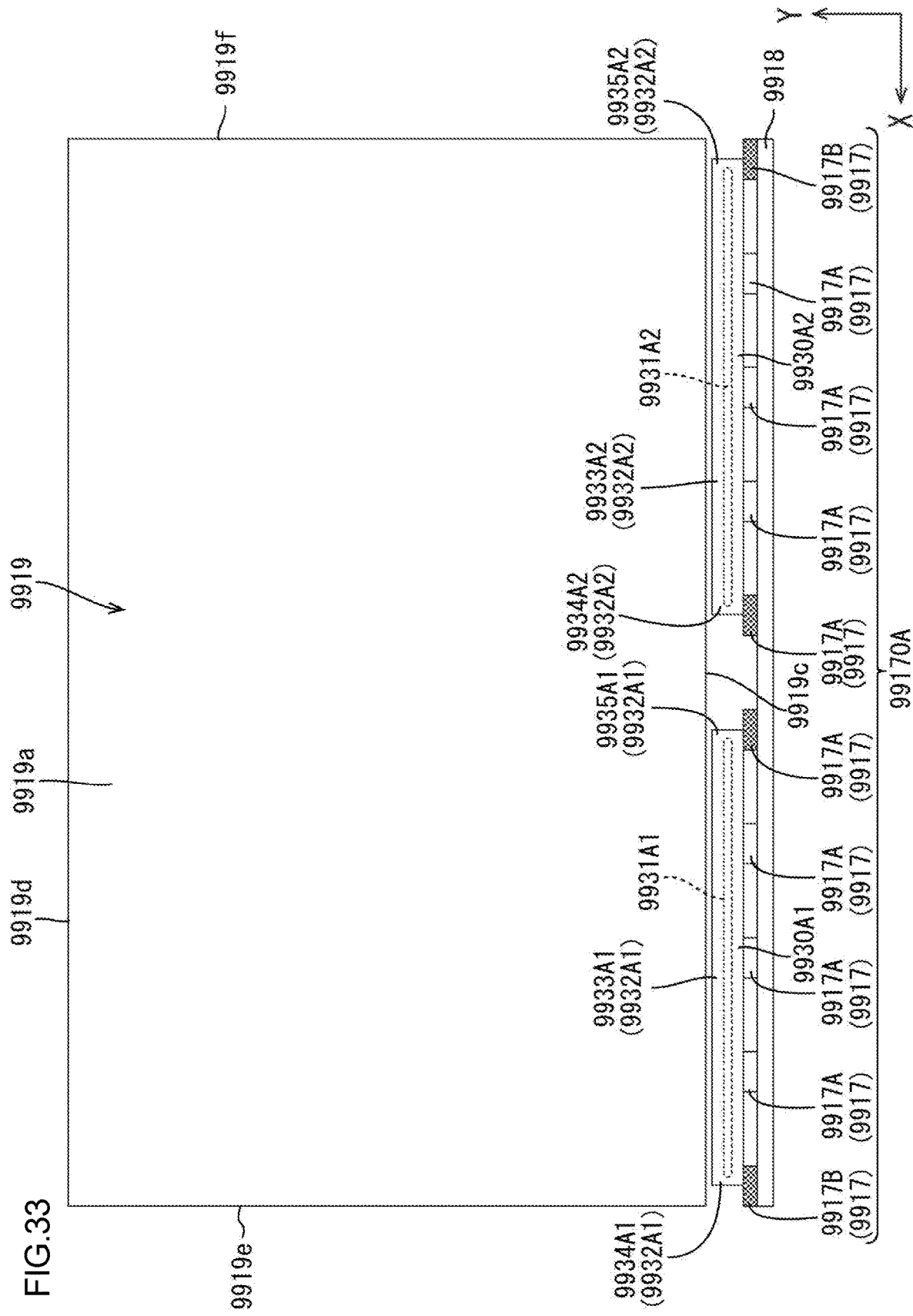
FIG. 33 is a schematic plan view of an arrangement relationship among an LED line, a phosphor tube, and a light guide plate utilized for a lighting device of a twelfth embodiment.

FIG. 33 is a schematic plan view of an arrangement relationship among the LED line 99170A, the phosphor tubes 9930A1, 9930A2, and a light guide plate 9919 utilized for the lighting device of the twelfth embodiment. Unlike the above-described eleventh embodiment, the two (multiple) phosphor tubes 9930A1, 9930A2 are utilized in the case of the present embodiment. Moreover, these phosphor tubes 9930A1, 9930A2 are utilized with the phosphor tubes 9930A1, 9930A2 being arranged in line. Note that the length of each of the phosphor tubes 9930A1, 9930A2 in the longitudinal direction thereof is set shorter than that of the phosphor tube 9930 of the above-described eleventh embodiment. However, a basic configuration of each of the phosphor tubes 9930A1, 9930A2 is similar to that of the phosphor tube 9930 of the above-described eleventh embodiment, and the phosphor tubes 9930A1, 9930A2 each include wavelength converters 9931A, 9931A2 and housings 9932A1, 9932A2. Moreover, the housings 9932A1, 9932A2 each include cylindrical main bodies 9933A1, 9933A2 and sealing end portions (non-wavelength-converter portions 9934A1, 9935A1, 9934A2, 9935A2).

The two phosphor tubes 9930A1, 9930A2 are arranged between a light entering surface 9919c of the light guide plate and the LED line 99170A. In FIG. 33, one phosphor tube 9930A1 is arranged closer to a left end surface (a short-side end surface) 9919e of the light guide plate 9919, and the other phosphor tube 9930A2 is arranged closer to a right end surface (a short-side end surface) 9919f of the light guide plate 9919.

A left end portion 9934A1 of the phosphor tube 9930A1 faces the light entering surface 9919c in a state in which the left end portion 9934A1 is arranged on the inside with respect to the left end surface 9919e not to protrude beyond the light entering surface 9919c. Moreover, a right end portion 9935A1 of the phosphor tube 9930A1 faces the light entering surface 9919c in a state in which the right end portion 9935A1 is arranged at the center of the light entering surface 9919c. Further, a right end portion 9935A2 of the phosphor tube 9930A2 faces the light entering surface 9919c in a state in which the right end portion 9935A2 is arranged on the inside with respect to the right end surface 9919f not to protrude beyond the light entering surface 9919c. In addition, a left end portion 9935A2 of the phosphor tube 9930A2 faces the light entering surface 9919c in a state in which the left end portion 9935A2 is arranged at the center of the light entering surface 9919c. The length of each of the phosphor tubes 9930A1, 9930A2 in the longitudinal direction thereof is set shorter than that of the LED line 99170A. All of the end portions 9934A1, 9935A1, 9934A2, 9935A2 of the phosphor tubes 9930A1, 9930A2 are arranged on the inside with respect to both end portions of the LED line 99170A.

As in the eleventh embodiment, the LED line 99170A of the present embodiment is mounted on an LED substrate 9918 with multiple LEDs 9917 being arranged in line, and a single LED 9917B configured to output white light is arranged at each end of the LED line 99170A. Further, in the present embodiment, two LEDs 9917B configured to output white light are arranged at the center of the LED line 99170. Note that multiple LEDs 9917 configured to output blue light are arranged between the right LED 9917B of the LED line 99170 and the center LED 9917B and between the left LED 9917B of the LED line 99170 and the center LED 9917B.

The LED 9917B arranged at a left end of the LED line 99170A faces the left end portion 9934A1 of the phosphor tube 9930A1. Note that a left portion of the above-described LED 9917B does not face the left end portion 9934A1, but directly faces the light entering surface 9919c. This leads to a configuration in which part of the light output from the LED (a mixed color light source) 9917B is directly input to the light entering surface 9919c. Moreover, the LED 9917B arranged at a right end of the LED line 99170A faces the right end portion 9935A2 of the phosphor tube 9930A2. Note that a right portion of the above-described LED 9917B does not face the end portion 9935A2, but directly faces the light entering surface 9919c. This leads to a configuration in which part of the light output from the LED (the mixed color light source) 9917B is directly input to the light entering surface 9919c.

Of the two LEDs 9917B arranged at the center of the LED line 99170A, one LED 9917B arranged on the left side faces the right end portion 9935A1 of the phosphor tube 9930A1. Note that a right portion of the above-described LED 9917B does not face the end portion 9935A1, but directly faces the light entering surface 9919c. This leads to a configuration in which part of the light output from the LED (the mixed color light source) 9917B is directly input to the light entering surface 9919c. Of the two LEDs 9917B arranged at the center of the LED line 99170A, the other LED 9917B arranged on the right side faces the left end portion 9934A2 of the phosphor tube 9930A2. Note that a left portion of the above-described LED 9917B does not face the end portion 9934A2, but directly faces the light entering surface 9919c. This leads to a configuration in which part of the light output from the LED (the mixed color light source) 9917B is directly input to the light entering surface 9919c. Of the LED line 99170A, each LED 9917A is arranged to face the two wavelength converters 9931A1, 9931A2 of the phosphor tubes 9930A1, 9930A2. Moreover, each LED 9917A is arranged to overlap with the light entering surface 9919c in the light output direction of the LEDs 9917.

In the lighting device described above, when power is supplied to each LED 9917 (the LEDs 9917A, 9917B) forming the LED line 99170A, each LED 9917 is turned on, and the light output from each LED 9917 enters into the light guide plate 9919 through the light entering surface 9919c. At this point, portions of the phosphor tubes 9930A1, 9930A2 including the wavelength converters 9931A1, 9931A2 output the white light in response to the blue light from each LED 9917A. In addition, all of the end portions 9934A1, 9935A1, 9934A2, 9935A2 of the phosphor tubes 9930 also output the white light in response to the white light from each LED 9917B. As a result, the white light is supplied into the light guide plate 9919 across the entire area thereof, and therefore, white planar light exits from the light exiting surface 9919a.

If the entirety of the LED line 99170A is formed of the LEDs 9917A, the blue light is, through each of the end portions 9934A1, 9935A1, 9934A2, 9935A2 of the phosphor tubes 9930A1, 9930A2, supplied from the phosphor tubes 9930A1, 9930A2 to a portion of the light guide plate 9919 linearly extending along the light output direction of the LED 9917A. That is, in the present embodiment, in a case where the entirety of the LED line 99170A is formed of the LEDs 9917A, the blue light is not only supplied along the left and right sides of the light guide plate 9919, but also is supplied across the center of the light guide plate 9919. The planar light (partially-blue-tinged planar light) partially colored in the color (the blue color) of the primary light exits from the light exiting surface 9919a. However, in the lighting device of the present embodiment, the LED 9917B configured to output the white light is used in advance as the LED 9917 configured to mainly supply the light to each of the end portions 9934A1, 9935A1, 9934A2, 9935A2 not provided with the wavelength conversion function, and therefore, coloring of the emitted light (the planar light) in the color (the blue color) of the primary light is reduced.

Thirteenth Embodiment

Figure 34:
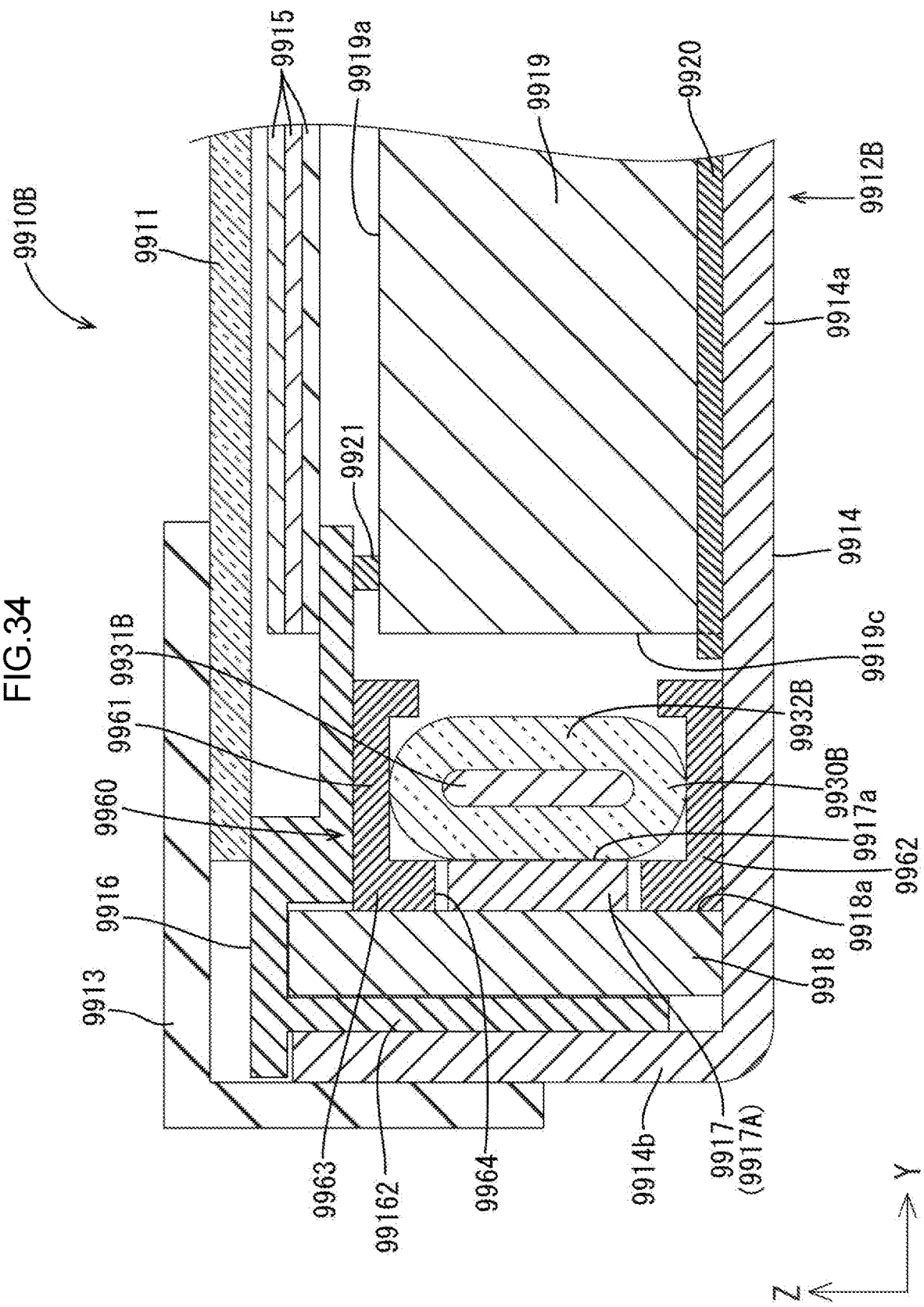
FIG. 34 is an enlarged sectional view of the vicinity of a light entering surface of a liquid crystal display device according to a thirteenth embodiment.
Figure 35:
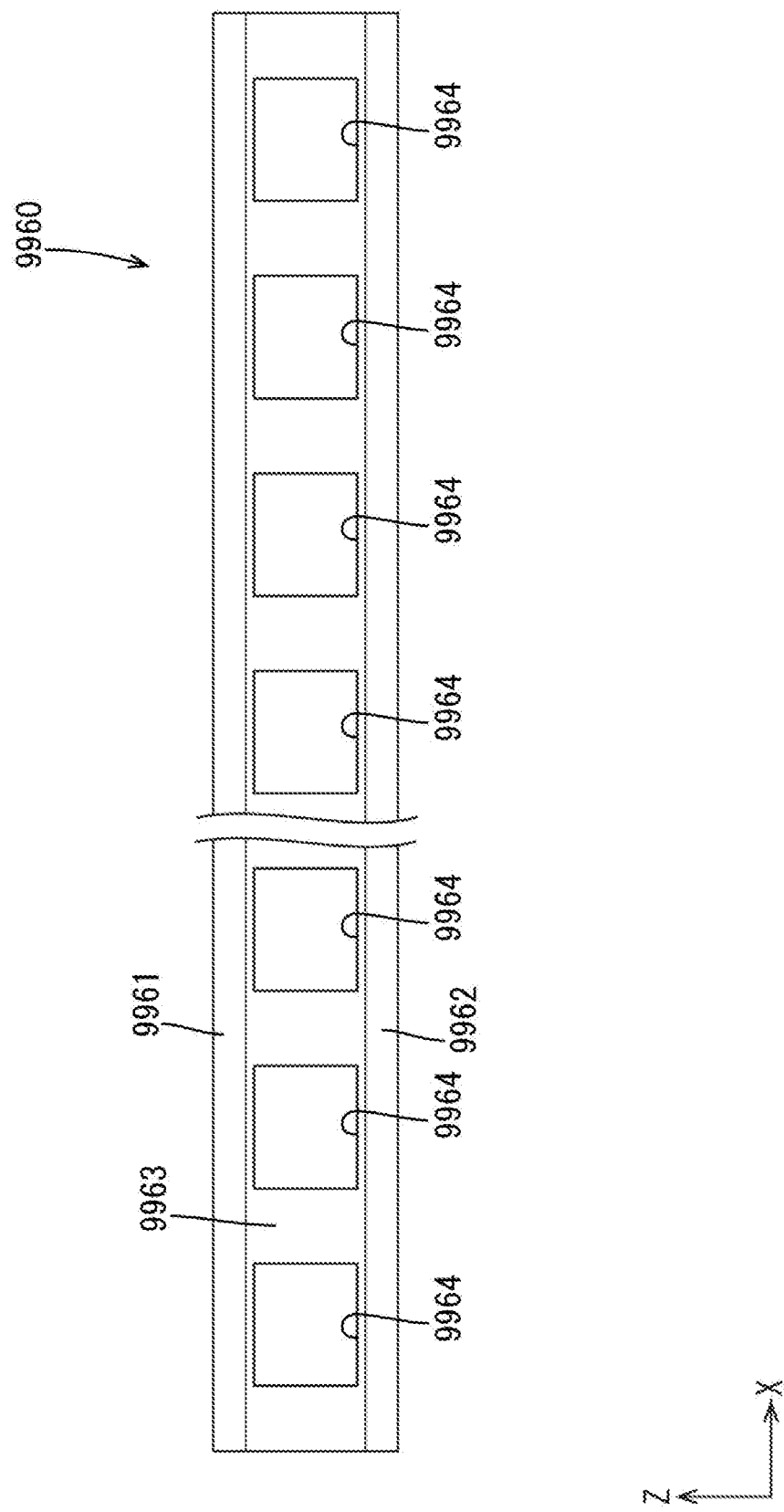
FIG. 35 is a front view of a holder.

Next, a thirteenth embodiment of the present invention will be described with reference to FIGS. 34 and 35. FIG. 34 is an enlarged sectional view of the vicinity of a light entering surface 9919c of a liquid crystal display device 9910B according to the thirteenth embodiment, and FIG. 35 is a front view of a holder. A lighting device 9912B utilized in the liquid crystal display device 9910B of the present embodiment includes a phosphor tube 9930B held by the elongated holder 9960. Note that the configuration of the phosphor tube 9930B itself is similar to that of the above-described eleventh embodiment, and the phosphor tube 9930B includes a wavelength converter 9931B, a housing 9932B, etc.

As illustrated in FIG. 34, the phosphor tube (a wavelength conversion member) 9930B of the present embodiment is arranged in a clearance between an LED 9917 and a light entering surface 9919c of a light guide plate 9919 with the phosphor tube 9930B being held by the holder 9960. The holder 9960 is entirely formed as an elongated member, and is formed of a synthetic resin molded article exhibiting light reflectivity and showing a white color. The holder 9960 has a cross section in a substantially C-shape such that a portion of the phosphor tube 9930B including the wavelength converter is, across the substantially entire length thereof, sandwiched in an upper-to-lower direction (a front-to-back direction). The holder 9960 includes a pair of a front holding wall portion 9961 and a back holding wall portion 9962 sandwiching the phosphor tube 9930B in the upper-to-lower direction, and a coupling wall portion 9963 connecting the front holding wall portion 9961 and the back holding wall portion 9962 in the upper-to-lower direction (the front-to-back direction) and arranged closer to the LED 9917 (closer to an LED substrate 9918) with respect to the phosphor tube 9930B. Note that the holder 9960 is in a shape opening toward the light entering surface 9919c of the light guide plate 9919 with the holder 9960 sandwiching the phosphor tube 9930B in the upper-to-lower direction.

In the case of the present embodiment, the front holding wall portion 9961 and the back holding wall portion 9962 are sandwiched between a frame 9916 and a bottom plate 9914a of a chassis 9914 in a state in which the front holding wall portion 9961 contacts a frame main body 99161 and the back holding wall portion 9962 is placed on the bottom plate 9914a. The coupling wall portion 9963 is in a shape standing along the upper-to-lower direction in the chassis 9914 and extending along the direction of arrangement of the line of the multiple LEDs 9917. Moreover, the coupling wall portion 9963 is provided with multiple openings 9964 through which each LED 9917 is exposed to a light entering surface 9919c side. Note that the coupling wall portion 9963 is placed on a mounting surface 9918a of the LED substrate 9918 with each LED 9917 being exposed through each opening 9964 in the chassis 9914. The phosphor tube 9930B is fixed to the bottom plate 9914a of the chassis 9914 with a not-shown fixing unit in a state in which the phosphor tube 9930B is held by the holder 9960. Note that in the case of the present embodiment, a light emission surface 9917a of the LED 9917 closely contacts a wall surface of the housing 9932 of the phosphor tube 9930B as illustrated in FIG. 34. As in the present embodiment, the phosphor tube 9930B may be arranged at a predetermined spot in the chassis 9914 by means of the holder 9960. With utilization of the holder 9960, the phosphor tube 9930B is easily arranged at the predetermined spot as necessary.

Other Embodiment

The present invention is not limited to the embodiments described above and illustrated in the figures. The following embodiments may be included in the technical scope of the present invention, for example.

(1) Each embodiment described above shows the case where each extreme LED of the multiple LEDs arranged along the X-axis direction is formed as the end-side LED, but each extreme LED and each second LED from the end may be formed as the end-side LEDs. In this case, the amount of light emitted per unit time may be differentiated between the extreme LED and the second LED from the end, but may be equal between these LEDs. Of the multiple LEDs arranged along the X-axis direction, three or more LEDs from the end may be formed as the end-side LEDs. Note that the number of installed center LEDs may be changed as necessary.

(2) The above-described second embodiment shows the case where the amount of light emitted per unit time is different between the first end-side LED and the second end-side LED, but the amount of light emitted per unit time may be equal between the first end-side LED and the second end-side LED. Alternatively, the amount of light emitted per unit time may be less in the second end-side LED than in the first end-side LED.

(3) The above-described third embodiment shows the case where the two first center LEDs are provided, but three or more first center LEDs may be provided.

(4) The above-described fourth embodiment shows the case where the single first center LED is provided, but two or more first center LEDs may be provided.

(5) The above-described fourth embodiment shows the case where the amount of light emitted per unit time is different between the first center LED and the end-side LED, but the amount of light emitted per unit time may be equal between the first center LED and the end-side LED. Alternatively, the amount of light emitted per unit time may be less in the end-side LED than in the first center LED.

(6) The above-described third, fourth, and tenth embodiments show the configuration in which the two wavelength converters are arranged along the length direction of the light entering end surface of the light guide plate, but it may be configured such that three or more wavelength converters are arranged along the length direction. Moreover, the above-described third, fourth, and tenth embodiments show, by way of example, the configuration in which the two or three LED substrates are arranged along the length direction of the light entering surface of the light guide plate, but it may be configured such that four or more LED substrates are arranged along the length direction.

(7) The method for controlling each LED as described above in the fifth embodiment may be combined with the configurations described in the second to fourth embodiments.

(8) The structure of holding the wavelength converter as described above in the sixth embodiment may be combined with the configurations of the second to fourth embodiments.

(9) The configurations described above in the second to sixth embodiments may be combined with the seventh to ninth embodiments, as necessary.

(10) Each embodiment described above shows the configuration in which the LED includes the blue LED element. However, instead of the blue LED element, an LED including a purple LED element configured to emit purple light as a visible light beam or an ultraviolet LED element (a near-ultraviolet LED element) configured to emit ultraviolet light (e.g., near-ultraviolet light) may be used, for example. The wavelength converter used in combination with the LED including the purple LED element or the ultraviolet LED element preferably contains the red phosphor, the green phosphor, and a blue phosphor. As another example, the wavelength converter used in combination with the LED including the purple LED element or the ultraviolet LED element may contain one or two phosphors selected from the red phosphor, the green phosphor, and the blue phosphor, and the remaining one or two phosphors may be contained in a sealing material of the LED. In addition to these case, a specific phosphor color etc. may be changed as necessary.

(11) Each embodiment described above shows, by way of example, the configuration in which the LED has the blue LED element and the wavelength converter has the green phosphor and the red phosphor, but it may be configured such that the LED has, in addition to the blue LED element, a red LED element configured to emit red light to emit magenta light and the wavelength converter used in combination with such an LED has the green phosphor. Instead of the red LED element, the sealing material of the LED may contain the red phosphor configured to emit the red light by means of the blue light as the excitation light.

(12) In addition to (11) described above, it may be configured such that the LED has, in addition to the blue LED element, a green LED element configured to emit green light to emit cyan light and the wavelength converter used in combination with such an LED has the red phosphor. Instead of the green LED element, the sealing material of the LED may contain the green phosphor configured to emit the green light by means of the blue light as the excitation light.

(13) Each embodiment described above shows the case where the wavelength converter contains the green phosphor and the red phosphor, but it may be configured such that the wavelength converter contains only a yellow phosphor or contains the red phosphor or the green phosphor in addition to the yellow phosphor.

(14) Each embodiment described above shows, by way of example, the case where the quantum dot phosphor used as the phosphor contained in the wavelength converter is of the core-shell type made of CdSe and ZnS, but a core quantum dot phosphor configured such that an internal composition is a single composition may be used. For example, material combinations (CdSe, CdS, ZnS) of Zn, Cd, Hg, Pb, etc. as divalent cations and O, S, Se, Te, etc. as divalent anions may be used alone. Further, material combinations (e.g., indium phosphide (InP) and gallium arsenide (GaAs)) of Ga, In, etc. as trivalent cations and P, As, Sb, etc. as trivalent anions, chalcopyrite compounds (e.g., $CuInSe_2$), etc. may be used alone. In addition to the core-shell or core quantum dot phosphor, an alloy quantum dot phosphor may be used. Alternatively, a quantum dot phosphor containing no cadmium may be used.

(15) Each embodiment described above shows, by way of example, the case where the quantum dot phosphor used as the phosphor contained in the wavelength converter is of the core-shell type with CdSe and ZnS, but a core-shell quantum dot phosphor made of a combination of other materials may be used. Alternatively, the quantum dot phosphor used as the phosphor contained in the wavelength converter may be the quantum dot phosphor containing no cadmium (Cd).

(16) Each embodiment described above shows, by way of example, the configuration in which the quantum dot phosphors are contained in the wavelength converter, but the wavelength converter may contain other types of phosphors. For example, a sulfide phosphor may be used as the phosphor contained in the wavelength converter. Specifically, $SrGa_2S_4:Eu^{2+}$ may be used as the green phosphor, and $(Ca,Sr,Ba)S:Eu^+$ may be used as the red phosphor.

(17) In addition to (16) described above, the green phosphor contained in the wavelength converter may be $(Ca,Sr,Ba)_3SiO_4:Eu^{2+}$, $\beta$-$SiAlON:Eu^{2+}$, or $Ca_3Sc_2Si_3O_{12}:Ce^{3+}$, for example. Moreover, the red phosphor contained in the wavelength converter may be $(Ca,Sr,Ba)_2SiOsNe:Eu^{2+}$, $CaAlSiN_3:Eu^{2+}$, or a complex fluoride phosphor (manganese-activated potassium silicofluoride ($K_2TiF_6$)), for example. Further, the yellow phosphor contained in the wavelength converter may be $(Y,Gd)_3(Al, Ga)_5O_{12}:Ce^{3+}$ (commonly known as $YAG:Ce^{3+}$), $\alpha$-$SiAlON:Eu^{2+}$, or $(Ca,Sr,Ba)_3SiO_4:Eu^{2+}$, for example.

(18) In addition to (16) and (17) described above, an organic phosphor may be used as the phosphor contained in the wavelength converter. A low-molecular organic phosphor having triazole or oxadiazole as a basic skeleton may be used as the organic phosphor, for example.

(19) In addition to (16), (17), and (18) described above, a phosphor configured to perform wavelength conversion by energy transfer via dressed photons (near-field light) may be used as the phosphor contained in the wavelength converter. Specifically, a phosphor configured such that DCM dye is dispersively mixed with zinc oxide quantum dots (ZnO-QD) having a diameter of 3 nm to 5 nm (preferably a diameter of about 4 nm) may be preferably used as the phosphor of this type.

(20) Each embodiment described above shows the case where InGaN is used as the material of the blue LED element forming the LED, but GaN, AlGaN, GaP, ZnSe, ZnO, AlGaInP, etc. may be used as other materials of the LED element.

EXPLANATION OF SYMBOLS

10: Liquid crystal display device (Display device)
10TV: Television device
11: Liquid crystal panel (Display panel)
12, 112, 212, 512, 612, 712, 812, 912: Backlight unit (Lighting device)
117, 217, 517, 617, 717, 817, 917: LED (Light source)
17C, 117C, 217C, 317C: Center LED (Center light source)
17E, 117E, 217E, 317E, 917E: End-side LED (End-side light source)
19, 119, 219, 319, 519, 619, 719, 819, 919: Light guide plate
19a: Light exiting plate surface
19b, 119b, 219b, 319b, 519b, 619b, 719b, 819b, 919b: Light entering end surface
20, 120, 220, 320, 520, 620, 720, 820, 920: Wavelength converter
20EP, 220EP, 320EP: End portion
20EP1, 120EP1, 220EP1, 320EP1, 920EP1: Sealing member disposed end portion
20EP2, 120EP2, 220EP2, 320EP2, 920EP2: Sealing member non-disposed end portion
29, 129, 229: Phosphor containing portion (Phosphor)
31, 131, 231, 331: Sealing member
32, 132, 232, 332: LED controller (Light source controller)

The invention claimed is:

1. A lighting device comprising:
a plurality of light sources arranged in line including a plurality of end-side light sources arranged at ends in a direction of arrangement of the light sources and a center light source arranged at a center in the direction of arrangement;
a light guide plate including:
a light entering end surface through which light from the light sources enters, the light entering end surface being at least a section of an outer peripheral end surface of the light guide plate extending along the direction of arrangement; and
a light exiting plate surface through which the light exits, the light exiting plate surface being one of plate surfaces of the light guide plate;
at least one wavelength converter extending along the direction of arrangement and interposed among the light sources and the light entering end surface, the at least one wavelength converter including a phosphor configured to wavelength-convert the light from the light sources; and
a light source controller configured to control an amount of light emitted by each of the light sources per unit time such that the amount of light emitted by at least one of the end-side light sources is less than the amount of light emitted by the center light source, wherein
the at least one wavelength converter is configured such that one of end portions in a length direction of the at least one wavelength converter is defined as a sealing member disposed end portion in which a sealing member is disposed and the other end portion is defined as a sealing member non-disposed end portion not provided with the sealing member, and
the light source controller is configured to control the amount such that the amount of light emitted by one of the end-side light sources facing the sealing member disposed end portion of the at least one wavelength converter is less than the amount of light emitted by the other one of the end-side light sources facing the sealing member non-disposed end portion of the at least one wavelength converter.

2. The lighting device according to claim 1, wherein
the at least one wavelength converter includes a plurality of wavelength converters arranged in line along the direction of arrangement, and
the light source controller is configured to control the amount such that the amount of light emitted by each of the end-side light sources facing a corresponding one of not-adjacent end portions of the wavelength converters than the amount of light emitted by the center light source.

3. The lighting device according to claim 1, wherein the light source controller is configured to supply a pulse signal to the light sources and to adjust a time ratio between a turn-on period and a turn-off period of the light sources to control the amount of light emitted per unit time.

4. The lighting device according to claim 1, wherein the light source controller is configured to drive the light sources with constant current and differentiate a value of current supplied to the light sources to control the amount of light emitted per unit time.

5. A display device comprising:
the lighting device according to claim 1; and
a display panel configured to display an image by means of light emitted by the lighting device.

6. A television device comprising the display device according to claim 5.

* * * * *